(12) United States Patent
Lionberger et al.

(10) Patent No.: US 11,376,591 B2
(45) Date of Patent: Jul. 5, 2022

(54) LIGHT SEQUENCING AND PATTERNS FOR DIELECTROPHORETIC TRANSPORT

(71) Applicant: Berkeley Lights, Inc., Emeryville, CA (US)

(72) Inventors: Troy A. Lionberger, Berkeley, CA (US); Brandon R. Bruhn, San Francisco, CA (US); John A. Tenney, Piedmont, CA (US); Eric D. Hobbs, Livermore, CA (US)

(73) Assignee: Berkeley Lights, Inc., Emeryville, CA (US)

( * ) Notice: Subject to any disclaimer, the term of this patent is extended or adjusted under 35 U.S.C. 154(b) by 0 days.

(21) Appl. No.: 16/893,885

(22) Filed: Jun. 5, 2020

(65) Prior Publication Data

US 2021/0213444 A1    Jul. 15, 2021

Related U.S. Application Data

(63) Continuation of application No. 15/487,795, filed on Apr. 14, 2017, now Pat. No. 10,675,625.
(Continued)

(51) Int. Cl.
*B01L 3/00* (2006.01)
*G01N 27/447* (2006.01)
(Continued)

(52) U.S. Cl.
CPC ..... *B01L 3/50273* (2013.01); *B01L 3/502715* (2013.01); *B01L 3/502761* (2013.01);
(Continued)

(58) Field of Classification Search
CPC ........... B01L 3/50273; B01L 3/502715; B01L 3/502761; B01L 2200/0647;
(Continued)

(56) References Cited

U.S. PATENT DOCUMENTS 6,294,063 B1    9/2001 Becker et al.
6,573,491 B1    6/2003 Marchitto et al.
(Continued)

FOREIGN PATENT DOCUMENTS

CN    101275114 A    10/2008
KR    20100008222 A    1/2010
(Continued)

OTHER PUBLICATIONS

Chiou et al., Massively parallel manipulation of single cells and microparticles using optical images, Nature 436:370-73 (2005).
(Continued)

*Primary Examiner* — Dennis White
(74) *Attorney, Agent, or Firm* — Kenneth E. Horton; Barnes & Thornburg LLP

(57) ABSTRACT

Optically-actuated microfluidic devices permit the use of spatially-modulated light to manipulate micro-objects such as biological cells. Systems and methods are described for providing sequences of light patterns to move and direct a plurality of micro-objects within the environment of a microfluidic device. The sequenced light patterns provide improved efficiency in directing the transport of the plurality of micro-objects. Other embodiments are described.

20 Claims, 33 Drawing Sheets

Related U.S. Application Data

(60) Provisional application No. 62/428,992, filed on Dec. 1, 2016, provisional application No. 62/323,436, filed on Apr. 15, 2016.

(51) Int. Cl.
  *B03C 5/00* (2006.01)
  *B03C 5/02* (2006.01)

(52) U.S. Cl.
  CPC .............. *B03C 5/005* (2013.01); *B03C 5/024* (2013.01); *B03C 5/026* (2013.01); *G01N 27/44791* (2013.01); *B01L 2200/0647* (2013.01); *B01L 2400/0424* (2013.01); *B01L 2400/0454* (2013.01); *B03C 2201/26* (2013.01)

(58) Field of Classification Search
  CPC ..... B01L 2400/0424; B01L 2400/0454; B03C 5/005; B03C 5/024; B03C 5/026; B03C 2201/26; G01N 27/44791
  See application file for complete search history.

(56) References Cited

U.S. PATENT DOCUMENTS

| | | |
|---|---|---|
| 6,942,776 B2 | 9/2005 | Medoro |
| 6,958,132 B2 | 10/2005 | Chiou et al. |
| 7,090,759 B1 | 8/2006 | Seul |
| 7,294,249 B2 | 11/2007 | Gawad et al. |
| 8,581,167 B2 | 11/2013 | Lean et al. |
| 9,144,806 B2 | 9/2015 | Chen et al. |
| 2002/0088712 A1 | 7/2002 | Miles |
| 2003/0008364 A1 | 1/2003 | Wang et al. |
| 2003/0224528 A1 | 12/2003 | Chiou et al. |
| 2004/0072278 A1 | 4/2004 | Chou et al. |
| 2004/0191789 A1 | 9/2004 | Manaresi et al. |
| 2004/0197905 A1 | 10/2004 | Hafeman |
| 2005/0112548 A1 | 5/2005 | Segawa et al. |
| 2005/0129581 A1 | 6/2005 | McBride et al. |
| 2005/0175981 A1 | 8/2005 | Voldman et al. |
| 2006/0091015 A1 | 5/2006 | Lau |
| 2006/0154361 A1 | 7/2006 | Wikswo et al. |
| 2006/0163463 A1 | 7/2006 | Grier |
| 2007/0095669 A1 | 5/2007 | Lau et al. |
| 2007/0183934 A1 | 8/2007 | Diercks et al. |
| 2008/0223721 A1 | 9/2008 | Cohen et al. |
| 2008/0302732 A1 | 12/2008 | Soh et al. |
| 2009/0023608 A1 | 1/2009 | Hung et al. |
| 2009/0170186 A1 | 7/2009 | Wu et al. |
| 2010/0000620 A1 | 1/2010 | Fouillet et al. |
| 2010/0003666 A1 | 1/2010 | Lee et al. |
| 2010/0101960 A1 | 4/2010 | Ohta et al. |
| 2010/0273681 A1 | 10/2010 | Cerrina et al. |
| 2011/0053151 A1 | 3/2011 | Hansen et al. |
| 2011/0117634 A1 | 5/2011 | Halamish et al. |
| 2011/0143964 A1 | 6/2011 | Zhou et al. |
| 2011/0262906 A1 | 10/2011 | Dimov et al. |
| 2012/0009671 A1 | 1/2012 | Hansen et al. |
| 2012/0015347 A1 | 1/2012 | Singhal et al. |
| 2012/0024708 A1 | 2/2012 | Chiou et al. |
| 2012/0118740 A1 | 5/2012 | Garcia et al. |
| 2012/0156675 A1 | 6/2012 | Lueerssen et al. |
| 2012/0325665 A1 | 12/2012 | Chiou et al. |
| 2013/0026040 A1 | 1/2013 | Cheng et al. |
| 2013/0115606 A1 | 5/2013 | Hansen et al. |
| 2013/0118905 A1 | 5/2013 | Morimoto et al. |
| 2013/0130232 A1 | 5/2013 | Weibel et al. |
| 2013/0171628 A1 | 7/2013 | Di Carlo et al. |
| 2013/0190212 A1 | 7/2013 | Handique et al. |
| 2013/0204076 A1 | 8/2013 | Han et al. |
| 2013/0261021 A1 | 10/2013 | Bocchi et al. |
| 2014/0116881 A1* | 5/2014 | Chapman ................ B03C 5/026 204/601 |
| 2014/0124370 A1 | 5/2014 | Short et al. |
| 2015/0018226 A1 | 1/2015 | Hansen et al. |
| 2015/0151298 A1 | 6/2015 | Hobbs et al. |
| 2015/0151307 A1 | 6/2015 | Breinlinger et al. |
| 2015/0165436 A1 | 6/2015 | Chapman et al. |
| 2016/0171686 A1 | 6/2016 | Du et al. |
| 2016/0184821 A1 | 6/2016 | Hobbs et al. |
| 2016/0193604 A1 | 7/2016 | McFarland et al. |
| 2016/0199837 A1 | 7/2016 | Breinlinger et al. |
| 2016/0252495 A1 | 9/2016 | Ricicova et al. |
| 2016/0312165 A1 | 10/2016 | Lowe, Jr. et al. |
| 2018/0298318 A1 | 10/2018 | Kurz et al. |
| 2019/0240665 A1 | 8/2019 | Lionberger et al. |
| 2019/0275516 A1 | 9/2019 | Lowe, Jr. et al. |
| 2019/0374944 A1 | 12/2019 | Lundquist et al. |
| 2019/0384963 A1 | 12/2019 | Kim et al. |
| 2020/0371126 A1 | 11/2020 | Thaker et al. |
| 2021/0272654 A1 | 9/2021 | Thaker et al. |

FOREIGN PATENT DOCUMENTS

| | | |
|---|---|---|
| WO | 2002088702 A2 | 11/2002 |
| WO | 2004012848 A2 | 2/2004 |
| WO | 2004089810 A2 | 10/2004 |
| WO | 2005100541 A2 | 10/2005 |
| WO | 2007008609 A2 | 1/2007 |
| WO | 2008119066 A1 | 10/2008 |
| WO | 2009046125 | 4/2009 |
| WO | 2010115167 A2 | 10/2010 |
| WO | 2010147078 A1 | 12/2010 |
| WO | 2012037030 A2 | 3/2012 |
| WO | 2012072823 A1 | 6/2012 |
| WO | 2012162779 A1 | 12/2012 |
| WO | 2013019491 A1 | 2/2013 |
| WO | 2019232473 A2 | 12/2019 |

OTHER PUBLICATIONS

Nevill et al., Integrated microfluidic cell culture and lysis on a chip, Lab on A Chip 7:1689-95 (2007).

Valley et al., Optoelectronic Tweezers as a Tool for Parallel Single-Cell Manipulation and Stimulation, IEEE Transactions on Biomedical Circuits and Systems 3(6):424-30 (2009).

Chung et al., Imaging single-cell signaling dynamics with a deterministic high-density single-cell trap array, Anal. Chem.83(18):7044-7052 (2011).

Vercruysse et al, "A High Speed Miniaturized Cell Sorter with Lens-Free Imaging and Thermal Buble Based Jet Flow Sorting", 18th Intl Conference on Miniaturized Systems for Chemistry and Life Sciences, Oct. 26-30, 2014.

Huang et al "High-Purity and label-free isolation of circulating tumor cells (CTCs) in a microfluidic platform by using opticallyinduced-dielectrophoretic (ODEP) force" Lab Chip, 2013, 13, 1371 (year:2013).

Chiou, Pei-Yu, Massively Parallel Optical Manipulation of Cells, Micro- and Nano-Particles on Optoelectronic devices, Dissertation, University of California at Berkeley, 2005 (147 pages).

CN101275114A, Luo—Machine Translation, Oct. 1, 2008, 8 pages.

Hsu, Hy et al., "Sorting of Differentiated Neurons Using Phototransistor-Based Optoelectronic Tweezers for Cell Replacement Therapy of Neurodegenerative Diseases", Transducers 2009, Denver, CO USA Jun. 2009, download dated Nov. 23, 2009 from IEEE Xplore, 4 pages.

Hung et al., Continuous Perfusion Microfluidic Cell Culture Array for High-Throughput Cell-Based Assays, Biotech and Bioengineering 89(1): 1-8 (2004). Dec. 3, 2004.

Iliescu et al., Continuous Field-Flow Separation of Particle Populations in a Dielectrophoretic Chip with Three Dimensional Electrodes, Applied Physics Letters 90:234104 (2007).

KR20100008222A_Kyun (KIPO computer-generated English language translation), Jan. 25, 2010, 10 pages.

Somaweera H. et al., Generation of a Chemical Gradient Across an Array of 256 Cell Cultures in a Single Chip. Analyst, Oct. 7, 2013, vol. 138, No. 19, pp. 5566-5571.

Valley et al., "A unified platform for optoelectrowetting and optoelectronic tweezers", Lab on a Chip 11:1292-97, Feb. 2, 2011.

(56) References Cited

OTHER PUBLICATIONS

Valley et al., An Integrated Platform for Light-Induced Dielectro-Phoresis and Electrowetting, International Conference on Miniaturized Systems for Chemistry and Life Sciences (2010).
WO2010147078, University of Tokyo, Machine Translation, Dec. 23, 2010, 12 pages.
Xu, Guolin et al,. Recent Trends in Dielectrophoresis, Informacije MIDEM, 2010, vol. 40, Issue No. 4, pp. 253-262.
Yi et al., "Microfluidics technology for manipulation and analysis of biological cells," Analytica Chimica Acta 560 (2006), pp. 1-23.

* cited by examiner

US 11,376,591 B2

LIGHT SEQUENCING AND PATTERNS FOR DIELECTROPHORETIC TRANSPORT

CROSS-REFERENCE TO RELATED APPLICATIONS

This application is a non-provisional application claiming the benefit under 35 U.S.C. 119(e) of U.S. Provisional Application No. 62/323,436, filed on Apr. 15, 2016; and of U.S. Provisional Application No. 62/428,992, filed on Dec. 1, 2016, each of which disclosures is herein incorporated by reference in its entirety.

BACKGROUND

Optically-actuated microfluidic devices allow researchers to use spatially-modulated light to manipulate micro-objects such as biological cells. The present disclosure relates to systems and methods for providing sequences of light to move and direct a plurality of micro-objects.

SUMMARY

In one aspect, a method for re-positioning a plurality of micro-objects in a microfluidic device is provided, the method including: projecting a plurality of light bars on a portion of the microfluidic device, where each light bar has an initial position within the portion of the microfluidic device and the plurality of micro-objects are positioned within the portion of the microfluidic device; and, moving each of the plurality of light bars of the plurality along a common trajectory towards an end position, wherein each of the light bars provides sufficient force to move one or more of the plurality of micro-objects.

In another aspect, a method for transporting one or more micro-objects in a microfluidic device, the method including: identifying one or more micro-objects disposed within an enclosure of the microfluidic device, wherein the enclosure includes a flow region and a substrate including a dielectrophoresis configuration; generating a light cage having a size configured to surround the identified one or more micro-objects, and further wherein a shape of the light cage includes an angled leading edge; and, transporting the one or more micro-objects from a first location to a second location within the enclosure of the microfluidic device.

DETAILED DESCRIPTION

Figure 1A:
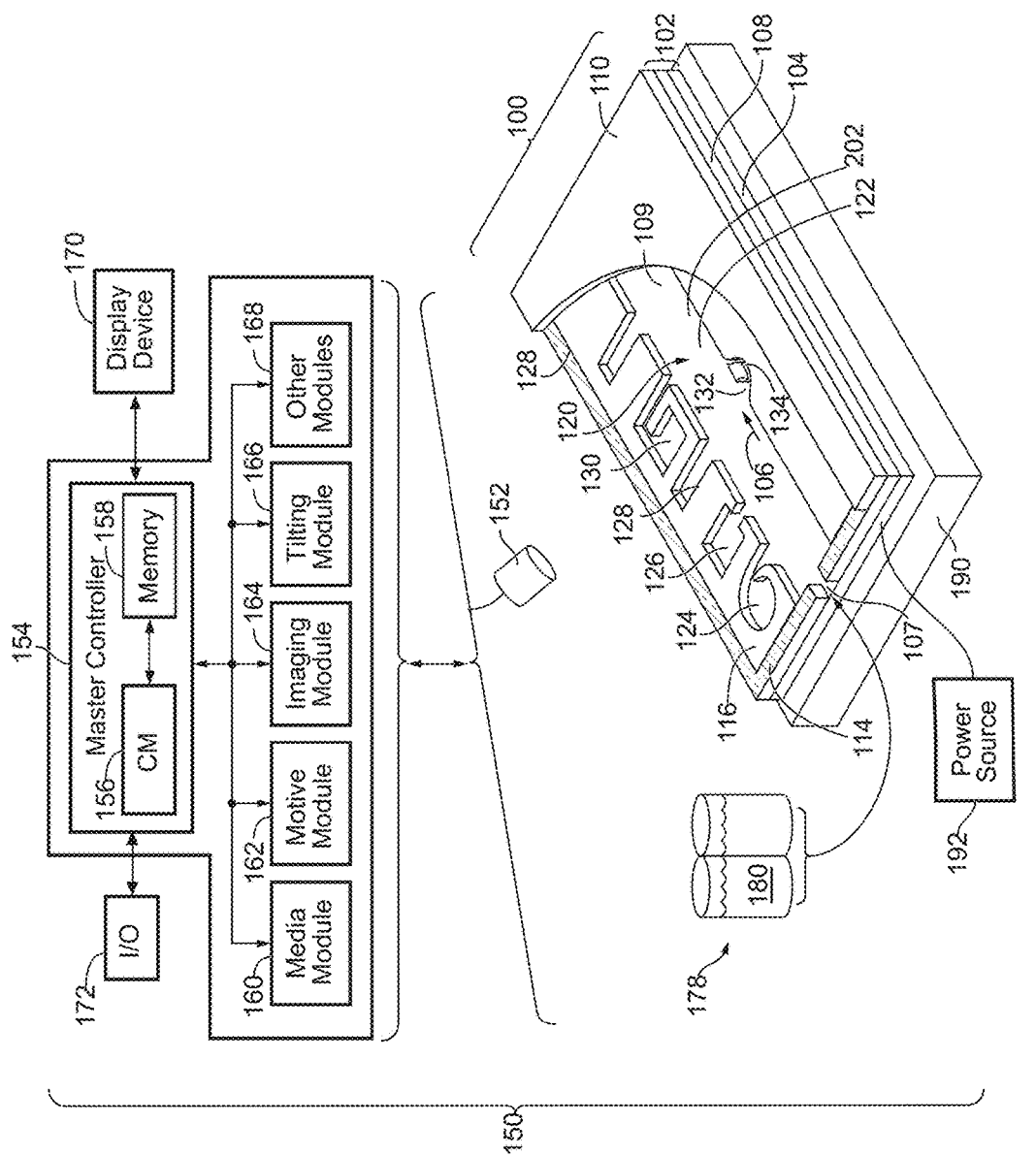
FIG. 1A illustrates an example of a system for use with a microfluidic device and associated control equipment according to some embodiments of the disclosure.

This specification describes exemplary embodiments and applications of the disclosure. The disclosure, however, is not limited to these exemplary embodiments and applications or to the manner in which the exemplary embodiments and applications operate or are described herein. Moreover, the figures may show simplified or partial views, and the dimensions of elements in the figures may be exaggerated or otherwise not in proportion. In addition, as the terms "on," "attached to," "connected to," "coupled to," or similar words are used herein, one element (e.g., a material, a layer, a substrate, etc.) can be "on," "attached to," "connected to," or "coupled to" another element regardless of whether the one element is directly on, attached to, connected to, or coupled to the other element or there are one or more intervening elements between the one element and the other element. Also, unless the context dictates otherwise, directions (e.g., above, below, top, bottom, side, up, down, under, over, upper, lower, horizontal, vertical, "x," "y," "z," etc.), if provided, are relative and provided solely by way of example and for ease of illustration and discussion and not by way of limitation. In addition, where reference is made to a list of elements (e.g., elements a, b, c), such reference is intended to include any one of the listed elements by itself, any combination of less than all of the listed elements, and/or a combination of all of the listed elements. Section divisions in the specification are for ease of review only and do not limit any combination of elements discussed.

Where dimensions of microfluidic features are described as having a width or an area, the dimension typically is described relative to an x-axial and/or y-axial dimension, both of which lie within a plane that is parallel to the substrate and/or cover of the microfluidic device. The height of a microfluidic feature may be described relative to a z-axial direction, which is perpendicular to a plane that is parallel to the substrate and/or cover of the microfluidic device. In some instances, a cross sectional area of a microfluidic feature, such as a channel or a passageway, may be in reference to a x-axial/z-axial, a y-axial/z-axial, or an x-axially-axial area.

As used herein, "substantially" means sufficient to work for the intended purpose. The term "substantially" thus allows for minor, insignificant variations from an absolute or perfect state, dimension, measurement, result, or the like such as would be expected by a person of ordinary skill in the field but that do not appreciably affect overall performance. When used with respect to numerical values or parameters or characteristics that can be expressed as numerical values, "substantially" means within ten percent.

The term "ones" means more than one.

As used herein, the term "plurality" can be 2, 3, 4, 5, 6, 7, 8, 9, 10, or more.

As used herein, the term "disposed" encompasses within its meaning "located."

As used herein, a "microfluidic device" or "microfluidic apparatus" is a device that includes one or more discrete microfluidic circuits configured to hold a fluid, each microfluidic circuit comprised of fluidically interconnected circuit elements, including but not limited to region(s), flow path (s), channel(s), chamber(s), and/or pen(s), and at least one port configured to allow the fluid (and, optionally, micro-objects suspended in the fluid) to flow into and/or out of the microfluidic device. Typically, a microfluidic circuit of a microfluidic device will include a flow region, which may include a microfluidic channel, and at least one chamber, and will hold a volume of fluid of less than about 1 mL, e.g., less than about 750, 500, 250, 200, 150, 100, 75, 50, 25, 20, 15, 10, 9, 8, 7, 6, 5, 4, 3, or 2 µL. In certain embodiments, the microfluidic circuit holds about 1-2, 1-3, 1-4, 1-5, 2-5, 2-8, 2-10, 2-12, 2-15, 2-20, 5-20, 5-30, 5-40, 5-50, 10-50, 10-75, 10-100, 20-100, 20-150, 20-200, 50-200, 50-250, or 50-300 µL. The microfluidic circuit may be configured to have a first end fluidically connected with a first port (e.g., an inlet) in the microfluidic device and a second end fluidically connected with a second port (e.g., an outlet) in the microfluidic device.

As used herein, a "nanofluidic device" or "nanofluidic apparatus" is a type of microfluidic device having a microfluidic circuit that contains at least one circuit element configured to hold a volume of fluid of less than about 1 µL, e.g., less than about 750, 500, 250, 200, 150, 100, 75, 50, 25, 20, 15, 10, 9, 8, 7, 6, 5, 4, 3, 2, 1 nL or less. A nanofluidic device may comprise a plurality of circuit elements (e.g., at least 2, 3, 4, 5, 6, 7, 8, 9, 10, 15, 20, 25, 50, 75, 100, 150, 200, 250, 300, 400, 500, 600, 700, 800, 900, 1000, 1500, 2000, 2500, 3000, 3500, 4000, 4500, 5000, 6000, 7000, 8000, 9000, 10,000, or more). In certain embodiments, one or more (e.g., all) of the at least one circuit elements is configured to hold a volume of fluid of about 100 pL to 1 nL, 100 pL to 2 nL, 100 pL to 5 nL, 250 pL to 2 nL, 250 pL to 5 nL, 250 pL to 10 nL, 500 pL to 5 nL, 500 pL to 10 nL, 500 pL to 15 nL, 750 pL to 10 nL, 750 pL to 15 nL, 750 pL to 20 nL, 1 to 10 nL, 1 to 15 nL, 1 to 20 nL, 1 to 25 nL, or 1 to 50 nL. In other embodiments, one or more (e.g., all) of the at least one circuit elements are configured to hold a volume of fluid of about 20 nL to 200 nL, 100 to 200 nL, 100 to 300 nL, 100 to 400 nL, 100 to 500 nL, 200 to 300 nL, 200 to 400 nL, 200 to 500 nL, 200 to 600 nL, 200 to 700 nL, 250 to 400 nL, 250 to 500 nL, 250 to 600 nL, or 250 to 750 nL.

A microfluidic device or a nanofluidic device may be referred to herein as a "microfluidic chip" or a "chip"; or "nanofluidic chip" or "chip".

A "microfluidic channel" or "flow channel" as used herein refers to flow region of a microfluidic device having a length that is significantly longer than both the horizontal and vertical dimensions. For example, the flow channel can be at least 5 times the length of either the horizontal or vertical dimension, e.g., at least 10 times the length, at least 25 times the length, at least 100 times the length, at least 200 times the length, at least 500 times the length, at least 1,000 times the length, at least 5,000 times the length, or longer. In some embodiments, the length of a flow channel is in the range of from about 100,000 microns to about 500,000 microns, including any range therebetween. In some embodiments, the horizontal dimension is in the range of from about 100 microns to about 1000 microns (e.g., about 150 to about 500 microns) and the vertical dimension is in the range of from about 25 microns to about 200 microns, e.g., from about 40 to about 150 microns. It is noted that a flow channel may have a variety of different spatial configurations in a microfluidic device, and thus is not restricted to a perfectly linear element. For example, a flow channel may be, or include one or more sections having, the following configurations: curve, bend, spiral, incline, decline, fork (e.g., multiple different flow paths), and any combination thereof. In addition, a flow channel may have different cross-sectional areas along its path, widening and constricting to provide a desired fluid flow therein. The flow channel may include valves, and the valves may be of any type known in the art of microfluidics. Examples of microfluidic channels that include valves are disclosed in U.S. Pat. Nos. 6,408,878 and 9,227,200, each of which is herein incorporated by reference in its entirety.

As used herein, the term "obstruction" refers generally to a bump or similar type of structure that is sufficiently large so as to partially (but not completely) impede movement of target micro-objects between two different regions or circuit elements in a microfluidic device. The two different regions/circuit elements can be, for example, the connection region and the isolation region of a microfluidic sequestration pen.

As used herein, the term "constriction" refers generally to a narrowing of a width of a circuit element (or an interface between two circuit elements) in a microfluidic device. The constriction can be located, for example, at the interface between the isolation region and the connection region of a microfluidic sequestration pen of the instant disclosure.

As used herein, the term "transparent" refers to a material which allows visible light to pass through without substantially altering the light as is passes through.

As used herein, the term "micro-object" refers generally to any microscopic object that may be isolated and/or manipulated in accordance with the present disclosure. Non-limiting examples of micro-objects include: inanimate micro-objects such as microparticles; microbeads (e.g., polystyrene beads, Luminex™ beads, or the like); magnetic beads; microrods; microwires; quantum dots, and the like; biological micro-objects such as cells; biological organelles; vesicles, or complexes; synthetic vesicles; liposomes (e.g., synthetic or derived from membrane preparations); lipid nanorafts, and the like; or a combination of inanimate micro-objects and biological micro-objects (e.g., microbeads attached to cells, liposome-coated micro-beads, liposome-coated magnetic beads, or the like). Beads may include moieties/molecules covalently or non-covalently attached, such as fluorescent labels, proteins, carbohydrates, antigens, small molecule signaling moieties, or other chemical/biological species capable of use in an assay. Lipid nanorafts have been described, for example, in Ritchie et al. (2009) "Reconstitution of Membrane Proteins in Phospholipid Bilayer Nanodiscs," Methods Enzymol., 464:211-231.

As used herein, the term "cell" is used interchangeably with the term "biological cell." Non-limiting examples of biological cells include eukaryotic cells, plant cells, animal cells, such as mammalian cells, reptilian cells, avian cells, fish cells, or the like, prokaryotic cells, bacterial cells, fungal cells, protozoan cells, or the like, cells dissociated from a tissue, such as muscle, cartilage, fat, skin, liver, lung, neural tissue, and the like, immunological cells, such as T cells, B cells, natural killer cells, macrophages, and the like, embryos (e.g., zygotes), oocytes, ova, sperm cells, hybridomas, cultured cells, cells from a cell line, cancer cells, infected cells, transfected and/or transformed cells, reporter cells, and the like. A mammalian cell can be, for example, from a human, a mouse, a rat, a horse, a goat, a sheep, a cow, a primate, or the like.

A colony of biological cells is "clonal" if all of the living cells in the colony that are capable of reproducing are daughter cells derived from a single parent cell. In certain embodiments, all the daughter cells in a clonal colony are derived from the single parent cell by no more than 10 divisions. In other embodiments, all the daughter cells in a clonal colony are derived from the single parent cell by no more than 14 divisions. In other embodiments, all the daughter cells in a clonal colony are derived from the single parent cell by no more than 17 divisions. In other embodiments, all the daughter cells in a clonal colony are derived from the single parent cell by no more than 20 divisions. The term "clonal cells" refers to cells of the same clonal colony.

As used herein, a "colony" of biological cells refers to 2 or more cells (e.g. about 2 to about 20, about 4 to about 40, about 6 to about 60, about 8 to about 80, about 10 to about 100, about 20 to about 200, about 40 to about 400, about 60 to about 600, about 80 to about 800, about 100 to about 1000, or greater than 1000 cells).

As used herein, the term "maintaining (a) cell(s)" refers to providing an environment comprising both fluidic and gaseous components and, optionally a surface, that provides the conditions necessary to keep the cells viable and/or expanding.

As used herein, the term "expanding" when referring to cells, refers to increasing in cell number.

A "component" of a fluidic medium is any chemical or biochemical molecule present in the medium, including solvent molecules, ions, small molecules, antibiotics, nucleotides and nucleosides, nucleic acids, amino acids, peptides, proteins, sugars, carbohydrates, lipids, fatty acids, cholesterol, metabolites, or the like.

As used herein, "flowable polymer" is a polymer monomer or macromer that is soluble or dispersible within a fluidic medium (e.g., a pre-polymer solution). The flowable polymer may be input into a microfluidic flow region and flow with other components of a fluidic medium therein.

As used herein, "photoinitiated polymer" refers to a polymer (or a monomeric molecule that can be used to generate the polymer) that upon exposure to light, is capable of crosslinking covalently, forming specific covalent bonds, changing regiochemistry around a rigidified chemical motif, or forming ion pairs which cause a change in physical state, and thereby forming a polymer network. In some instances, a photoinitiated polymer may include a polymer segment bound to one or more chemical moieties capable of crosslinking covalently, forming specific covalent bonds, changing regiochemistry around a rigidified chemical motif, or forming ion pairs which cause a change in physical state. In some instances, a photoinitiated polymer may require a photoactivatable radical initiator to initiate formation of the polymer network (e.g., via polymerization of the polymer).

As used herein in reference to a fluidic medium, "diffuse" and "diffusion" refer to thermodynamic movement of a component of the fluidic medium down a concentration gradient.

The phrase "flow of a medium" means bulk movement of a fluidic medium primarily due to any mechanism other than diffusion. For example, flow of a medium can involve movement of the fluidic medium from one point to another point due to a pressure differential between the points. Such flow can include a continuous, pulsed, periodic, random, intermittent, or reciprocating flow of the liquid, or any combination thereof. When one fluidic medium flows into another fluidic medium, turbulence and mixing of the media can result.

The phrase "substantially no flow" refers to a rate of flow of a fluidic medium that, averaged over time, is less than the rate of diffusion of components of a material (e.g., an analyte of interest) into or within the fluidic medium. The rate of diffusion of components of such a material can depend on, for example, temperature, the size of the components, and the strength of interactions between the components and the fluidic medium.

As used herein in reference to different regions within a microfluidic device, the phrase "fluidically connected" means that, when the different regions are substantially filled with fluid, such as fluidic media, the fluid in each of the regions is connected so as to form a single body of fluid. This does not mean that the fluids (or fluidic media) in the different regions are necessarily identical in composition. Rather, the fluids in different fluidically connected regions of a microfluidic device can have different compositions (e.g., different concentrations of solutes, such as proteins, carbohydrates, ions, or other molecules) which are in flux as solutes move down their respective concentration gradients and/or fluids flow through the microfluidic device.

As used herein, a "flow path" refers to one or more fluidically connected circuit elements (e.g. channel(s), region(s), chamber(s) and the like) that define, and are subject to, the trajectory of a flow of medium. A flow path is thus an example of a swept region of a microfluidic device. Other circuit elements (e.g., unswept regions) may be fluidically connected with the circuit elements that comprise the flow path without being subject to the flow of medium in the flow path.

As used herein, "isolating a micro-object" confines a micro-object to a defined area within the microfluidic device.

A microfluidic (or nanofluidic) device can comprise "swept" regions and "unswept" regions. As used herein, a "swept" region is comprised of one or more fluidically interconnected circuit elements of a microfluidic circuit, each of which experiences a flow of medium when fluid is flowing through the microfluidic circuit. The circuit elements of a swept region can include, for example, regions, channels, and all or parts of chambers. As used herein, an "unswept" region is comprised of one or more fluidically interconnected circuit element of a microfluidic circuit, each of which experiences substantially no flux of fluid when fluid is flowing through the microfluidic circuit. An unswept region can be fluidically connected to a swept region, provided the fluidic connections are structured to enable diffusion but substantially no flow of media between the swept region and the unswept region. The microfluidic device can thus be structured to substantially isolate an unswept region from a flow of medium in a swept region, while enabling substantially only diffusive fluidic communication between the swept region and the unswept region. For example, a flow channel of a microfluidic device is an example of a swept region while an isolation region (described in further detail below) of a microfluidic device is an example of an unswept region.

The capability of biological micro-objects (e.g., biological cells) to produce specific biological materials (e.g., proteins, such as antibodies) can be assayed in such a microfluidic device. In a specific embodiment of an assay, sample material comprising biological micro-objects (e.g., cells) to be assayed for production of an analyte of interest can be loaded into a swept region of the microfluidic device. Ones of the biological micro-objects (e.g., mammalian cells, such as human cells) can be selected for particular characteristics and disposed in unswept regions. The remaining sample material can then be flowed out of the swept region and an assay material flowed into the swept region. Because the selected biological micro-objects are in unswept regions, the selected biological micro-objects are not substantially affected by the flowing out of the remaining sample material or the flowing in of the assay material. The selected biological micro-objects can be allowed to produce the analyte of interest, which can diffuse from the unswept regions into the swept region, where the analyte of interest can react with the assay material to produce localized detectable reactions, each of which can be correlated to a particular unswept region. Any unswept region associated with a detected reaction can be analyzed to determine which, if any, of the biological micro-objects in the unswept region are sufficient producers of the analyte of interest.

Microfluidic devices and systems for operating and observing such devices. FIG. 1A illustrates an example of a microfluidic device 100 and a system 150 which can be used for maintaining, isolating, assaying or culturing biological micro-objects. A perspective view of the microfluidic device 100 is shown having a partial cut-away of its cover 110 to provide a partial view into the microfluidic device 100. The microfluidic device 100 generally comprises a microfluidic circuit 120 comprising a flow path 106 through which a fluidic medium 180 can flow, optionally carrying one or more micro-objects (not shown) into and/or through the microfluidic circuit 120. Although a single microfluidic circuit 120 is illustrated in FIG. 1A, suitable microfluidic devices can include a plurality (e.g., 2 or 3) of such microfluidic circuits. Regardless, the microfluidic device 100 can be configured to be a nanofluidic device. As illustrated in FIG. 1A, the microfluidic circuit 120 may include a plurality of microfluidic sequestration pens 124, 126, 128, and 130, where each sequestration pens may have one or more openings in fluidic communication with flow path 106. In some embodiments of the device of FIG. 1A, the sequestration pens may have only a single opening in fluidic communication with the flow path 106. As discussed further below, the microfluidic sequestration pens comprise various features and structures that have been optimized for retaining micro-objects in the microfluidic device, such as microfluidic device 100, even when a medium 180 is flowing through the flow path 106. Before turning to the foregoing, however, a brief description of microfluidic device 100 and system 150 is provided.

As generally illustrated in FIG. 1A, the microfluidic circuit 120 is defined by an enclosure 102. Although the enclosure 102 can be physically structured in different configurations, in the example shown in FIG. 1A the enclosure 102 is depicted as comprising a support structure 104 (e.g., a base), a microfluidic circuit structure 108, and a cover 110. The support structure 104, microfluidic circuit structure 108, and cover 110 can be attached to each other. For example, the microfluidic circuit structure 108 can be disposed on an inner surface 109 of the support structure 104, and the cover 110 can be disposed over the microfluidic circuit structure 108. Together with the support structure 104 and cover 110, the microfluidic circuit structure 108 can define the elements of the microfluidic circuit 120.

The support structure 104 can be at the bottom and the cover 110 at the top of the microfluidic circuit 120 as illustrated in FIG. 1A. Alternatively, the support structure 104 and the cover 110 can be configured in other orientations. For example, the support structure 104 can be at the top and the cover 110 at the bottom of the microfluidic circuit 120. Regardless, there can be one or more ports 107 each comprising a passage into or out of the enclosure 102. Examples of a passage include a valve, a gate, a pass-through hole, or the like. As illustrated, port 107 is a pass-through hole created by a gap in the microfluidic circuit structure 108. However, the port 107 can be situated in other components of the enclosure 102, such as the cover 110. Only one port 107 is illustrated in FIG. 1A but the microfluidic circuit 120 can have two or more ports 107. For example, there can be a first port 107 that functions as an inlet for fluid entering the microfluidic circuit 120, and there can be a second port 107 that functions as an outlet for fluid exiting the microfluidic circuit 120. Whether a port 107 function as an inlet or an outlet can depend upon the direction that fluid flows through flow path 106.

The support structure 104 can comprise one or more electrodes (not shown) and a substrate or a plurality of interconnected substrates. For example, the support structure 104 can comprise one or more semiconductor substrates, each of which is electrically connected to an electrode (e.g., all or a subset of the semiconductor substrates can be electrically connected to a single electrode). The support structure 104 can further comprise a printed circuit board assembly ("PCBA"). For example, the semiconductor substrate(s) can be mounted on a PCBA.

The microfluidic circuit structure 108 can define circuit elements of the microfluidic circuit 120. Such circuit elements can comprise spaces or regions that can be fluidly interconnected when microfluidic circuit 120 is filled with fluid, such as flow regions (which may include or be one or more flow channels), chambers, pens, traps, and the like. In the microfluidic circuit 120 illustrated in FIG. 1A, the microfluidic circuit structure 108 comprises a frame 114 and a microfluidic circuit material 116. The frame 114 can partially or completely enclose the microfluidic circuit material 116. The frame 114 can be, for example, a relatively rigid structure substantially surrounding the microfluidic circuit material 116. For example, the frame 114 can comprise a metal material.

The microfluidic circuit material 116 can be patterned with cavities or the like to define circuit elements and interconnections of the microfluidic circuit 120. The microfluidic circuit material 116 can comprise a flexible material, such as a flexible polymer (e.g. rubber, plastic, elastomer, silicone, polydimethylsiloxane ("PDMS"), or the like), which can be gas permeable. Other examples of materials that can compose microfluidic circuit material 116 include molded glass, an etchable material such as silicone (e.g. photo-patternable silicone or "PPS"), photo-resist (e.g., SU8), or the like. In some embodiments, such materials—and thus the microfluidic circuit material 116—can be rigid and/or substantially impermeable to gas. Regardless, microfluidic circuit material 116 can be disposed on the support structure 104 and inside the frame 114.

The cover 110 can be an integral part of the frame 114 and/or the microfluidic circuit material 116. Alternatively, the cover 110 can be a structurally distinct element, as illustrated in FIG. 1A. The cover 110 can comprise the same or different materials than the frame 114 and/or the microfluidic circuit material 116. Similarly, the support structure 104 can be a separate structure from the frame 114 or microfluidic circuit material 116 as illustrated, or an integral part of the frame 114 or microfluidic circuit material 116. Likewise, the frame 114 and microfluidic circuit material 116 can be separate structures as shown in FIG. 1A or integral portions of the same structure.

In some embodiments, the cover 110 can comprise a rigid material. The rigid material may be glass or a material with similar properties. In some embodiments, the cover 110 can comprise a deformable material. The deformable material can be a polymer, such as PDMS. In some embodiments, the cover 110 can comprise both rigid and deformable materials. For example, one or more portions of cover 110 (e.g., one or more portions positioned over sequestration pens 124, 126, 128, 130) can comprise a deformable material that interfaces with rigid materials of the cover 110. In some embodiments, the cover 110 can further include one or more electrodes. The one or more electrodes can comprise a conductive oxide, such as indium-tin-oxide (ITO), which may be coated on glass or a similarly insulating material. Alternatively, the one or more electrodes can be flexible electrodes, such as single-walled nanotubes, multi-walled nanotubes, nanowires, clusters of electrically conductive nanoparticles, or combinations thereof, embedded in a deformable material, such as a polymer (e.g., PDMS). Flexible electrodes that can be used in microfluidic devices have been described, for example, in U.S. 2012/0325665 (Chiou et al.), the contents of which are incorporated herein by reference. In some embodiments, the cover 110 can be modified (e.g., by conditioning all or part of a surface that faces inward toward the microfluidic circuit 120) to support cell adhesion, viability and/or growth. The modification may include a coating of a synthetic or natural polymer. In some embodiments, the cover 110 and/or the support structure 104 can be transparent to light. The cover 110 may also include at least one material that is gas permeable (e.g., PDMS or PPS).

FIG. 1A also shows a system 150 for operating and controlling microfluidic devices, such as microfluidic device 100. System 150 includes an electrical power source 192, an imaging device 194 (incorporated within imaging module 164, where device 194 is not illustrated in FIG. 1A, per se), and a tilting device 190 (part of tilting module 166, where device 190 is not illustrated in FIG. 1A).

The electrical power source 192 can provide electric power to the microfluidic device 100 and/or tilting device 190, providing biasing voltages or currents as needed. The electrical power source 192 can, for example, comprise one or more alternating current (AC) and/or direct current (DC) voltage or current sources. The imaging device 194 (part of imaging module 164, discussed below) can comprise a device, such as a digital camera, for capturing images inside microfluidic circuit 120. In some instances, the imaging device 194 further comprises a detector having a fast frame rate and/or high sensitivity (e.g. for low light applications). The imaging device 194 can also include a mechanism for directing stimulating radiation and/or light beams into the microfluidic circuit 120 and collecting radiation and/or light beams reflected or emitted from the microfluidic circuit 120 (or micro-objects contained therein). The emitted light beams may be in the visible spectrum and may, e.g., include fluorescent emissions. The reflected light beams may include reflected emissions originating from an LED or a wide spectrum lamp, such as a mercury lamp (e.g. a high pressure mercury lamp) or a Xenon arc lamp. As discussed with respect to FIG. 3B, the imaging device 194 may further include a microscope (or an optical train), which may or may not include an eyepiece.

System 150 further comprises a tilting device 190 (part of tilting module 166, discussed below) configured to rotate a microfluidic device 100 about one or more axes of rotation. In some embodiments, the tilting device 190 is configured to support and/or hold the enclosure 102 comprising the microfluidic circuit 120 about at least one axis such that the microfluidic device 100 (and thus the microfluidic circuit 120) can be held in a level orientation (i.e. at 0° relative to x- and y-axes), a vertical orientation (i.e. at 90° relative to the x-axis and/or the y-axis), or any orientation therebetween. The orientation of the microfluidic device 100 (and the microfluidic circuit 120) relative to an axis is referred to herein as the "tilt" of the microfluidic device 100 (and the microfluidic circuit 120). For example, the tilting device 190 can tilt the microfluidic device 100 at 0.1°, 0.2°, 0.3°, 0.4°, 0.5°, 0.6°, 0.7°, 0.8°, 0.9°, 1°, 2°, 3°, 4°, 5°, 10°, 15°, 20°, 25°, 30°, 35°, 40°, 45°, 50°, 55°, 60°, 65°, 70°, 75°, 80°, 90° relative to the x-axis or any degree therebetween. The level orientation (and thus the x- and y-axes) is defined as normal to a vertical axis defined by the force of gravity. The tilting device can also tilt the microfluidic device 100 (and the microfluidic circuit 120) to any degree greater than 90° relative to the x-axis and/or y-axis, or tilt the microfluidic device 100 (and the microfluidic circuit 120) 180° relative to the x-axis or the y-axis in order to fully invert the microfluidic device 100 (and the microfluidic circuit 120). Similarly, in some embodiments, the tilting device 190 tilts the microfluidic device 100 (and the microfluidic circuit 120)

about an axis of rotation defined by flow path 106 or some other portion of microfluidic circuit 120.

In some instances, the microfluidic device 100 is tilted into a vertical orientation such that the flow path 106 is positioned above or below one or more sequestration pens. The term "above" as used herein denotes that the flow path 106 is positioned higher than the one or more sequestration pens on a vertical axis defined by the force of gravity (i.e. an object in a sequestration pen above a flow path 106 would have a higher gravitational potential energy than an object in the flow path). The term "below" as used herein denotes that the flow path 106 is positioned lower than the one or more sequestration pens on a vertical axis defined by the force of gravity (i.e. an object in a sequestration pen below a flow path 106 would have a lower gravitational potential energy than an object in the flow path).

In some instances, the tilting device 190 tilts the microfluidic device 100 about an axis that is parallel to the flow path 106. Moreover, the microfluidic device 100 can be tilted to an angle of less than 90° such that the flow path 106 is located above or below one or more sequestration pens without being located directly above or below the sequestration pens. In other instances, the tilting device 190 tilts the microfluidic device 100 about an axis perpendicular to the flow path 106. In still other instances, the tilting device 190 tilts the microfluidic device 100 about an axis that is neither parallel nor perpendicular to the flow path 106.

System 150 can further include a media source 178. The media source 178 (e.g., a container, reservoir, or the like) can comprise multiple sections or containers, each for holding a different fluidic medium 180. Thus, the media source 178 can be a device that is outside of and separate from the microfluidic device 100, as illustrated in FIG. 1A. Alternatively, the media source 178 can be located in whole or in part inside the enclosure 102 of the microfluidic device 100. For example, the media source 178 can comprise reservoirs that are part of the microfluidic device 100.

FIG. 1A also illustrates simplified block diagram depictions of examples of control and monitoring equipment 152 that constitute part of system 150 and can be utilized in conjunction with a microfluidic device 100. As shown, examples of such control and monitoring equipment 152 include a master controller 154 comprising a media module 160 for controlling the media source 178, a motive module 162 for controlling movement and/or selection of micro-objects (not shown) and/or medium (e.g., droplets of medium) in the microfluidic circuit 120, an imaging module 164 for controlling an imaging device 194 (e.g., a camera, microscope, light source or any combination thereof) for capturing images (e.g., digital images), and a tilting module 166 for controlling a tilting device 190. The control equipment 152 can also include other modules 168 for controlling, monitoring, or performing other functions with respect to the microfluidic device 100. As shown, the equipment 152 can further include a display device 170 and an input/output device 172.

The master controller 154 can comprise a control module 156 and a digital memory 158. The control module 156 can comprise, for example, a digital processor configured to operate in accordance with machine executable instructions (e.g., software, firmware, source code, or the like) stored as non-transitory data or signals in the memory 158. Alternatively, or in addition, the control module 156 can comprise hardwired digital circuitry and/or analog circuitry. The media module 160, motive module 162, imaging module 164, tilting module 166, and/or other modules 168 can be similarly configured. Thus, functions, processes acts, actions, or steps of a process discussed herein as being performed with respect to the microfluidic device 100 or any other microfluidic apparatus can be performed by any one or more of the master controller 154, media module 160, motive module 162, imaging module 164, tilting module 166, and/or other modules 168 configured as discussed above. Similarly, the master controller 154, media module 160, motive module 162, imaging module 164, tilting module 166, and/or other modules 168 may be communicatively coupled to transmit and receive data used in any function, process, act, action or step discussed herein.

The media module 160 controls the media source 178. For example, the media module 160 can control the media source 178 to input a selected fluidic medium 180 into the enclosure 102 (e.g., through an inlet port 107). The media module 160 can also control removal of media from the enclosure 102 (e.g., through an outlet port (not shown)). One or more media can thus be selectively input into and removed from the microfluidic circuit 120. The media module 160 can also control the flow of fluidic medium 180 in the flow path 106 inside the microfluidic circuit 120. For example, in some embodiments media module 160 stops the flow of media 180 in the flow path 106 and through the enclosure 102 prior to the tilting module 166 causing the tilting device 190 to tilt the microfluidic device 100 to a desired angle of incline.

The motive module 162 can be configured to control selection, trapping, and movement of micro-objects (not shown) in the microfluidic circuit 120. As discussed below with respect to FIGS. 1B and 1C, the enclosure 102 can comprise a dielectrophoresis (DEP), optoelectronic tweezers (OET) and/or opto-electrowetting (OEW) configuration (not shown in FIG. 1A), and the motive module 162 can control the activation of electrodes and/or transistors (e.g., phototransistors) to select and move micro-objects (not shown) and/or droplets of medium (not shown) in the flow path 106 and/or sequestration pens 124, 126, 128, 130.

The imaging module 164 can control the imaging device 194. For example, the imaging module 164 can receive and process image data from the imaging device 194. Image data from the imaging device 194 can comprise any type of information captured by the imaging device 194 (e.g., the presence or absence of micro-objects, droplets of medium, accumulation of label, such as fluorescent label, etc.). Using the information captured by the imaging device 194, the imaging module 164 can further calculate the position of objects (e.g., micro-objects, droplets of medium) and/or the rate of motion of such objects within the microfluidic device 100.

The tilting module 166 can control the tilting motions of tilting device 190. Alternatively, or in addition, the tilting module 166 can control the tilting rate and timing to optimize transfer of micro-objects to the one or more sequestration pens via gravitational forces. The tilting module 166 is communicatively coupled with the imaging module 164 to receive data describing the motion of micro-objects and/or droplets of medium in the microfluidic circuit 120. Using this data, the tilting module 166 may adjust the tilt of the microfluidic circuit 120 in order to adjust the rate at which micro-objects and/or droplets of medium move in the microfluidic circuit 120. The tilting module 166 may also use this data to iteratively adjust the position of a micro-object and/or droplet of medium in the microfluidic circuit 120.

In the example shown in FIG. 1A, the microfluidic circuit 120 is illustrated as comprising a microfluidic channel 122 and sequestration pens 124, 126, 128, 130. Each pen comprises an opening to channel 122, but otherwise is enclosed such that the pens can substantially isolate micro-objects inside the pen from fluidic medium 180 and/or micro-objects in the flow path 106 of channel 122 or in other pens. The walls of the sequestration pen extend from the inner surface 109 of the base to the inside surface of the cover 110 to provide enclosure. The opening of the pen to the microfluidic channel 122 is oriented at an angle to the flow 106 of fluidic medium 180 such that flow 106 is not directed into the pens. The flow may be tangential or orthogonal to the plane of the opening of the pen. In some instances, pens 124, 126, 128, 130 are configured to physically corral one or more micro-objects within the microfluidic circuit 120. Sequestration pens in accordance with the present disclosure can comprise various shapes, surfaces and features that are optimized for use with DEP, OET, OEW, fluid flow, and/or gravitational forces, as will be discussed and shown in detail below.

The microfluidic circuit 120 may comprise any number of microfluidic sequestration pens. Although five sequestration pens are shown, microfluidic circuit 120 may have fewer or more sequestration pens. As shown, microfluidic sequestration pens 124, 126, 128, and 130 of microfluidic circuit 120 each comprise differing features and shapes which may provide one or more benefits useful for maintaining, isolating, assaying or culturing biological micro-objects. In some embodiments, the microfluidic circuit 120 comprises a plurality of identical microfluidic sequestration pens.

In the embodiment illustrated in FIG. 1A, a single channel 122 and flow path 106 is shown. However, other embodiments may contain multiple channels 122, each configured to comprise a flow path 106. The microfluidic circuit 120 further comprises an inlet valve or port 107 in fluid communication with the flow path 106 and fluidic medium 180, whereby fluidic medium 180 can access channel 122 via the inlet port 107. In some instances, the flow path 106 comprises a single path. In some instances, the single path is arranged in a zigzag pattern whereby the flow path 106 travels across the microfluidic device 100 two or more times in alternating directions.

In some instances, microfluidic circuit 120 comprises a plurality of parallel channels 122 and flow paths 106, wherein the fluidic medium 180 within each flow path 106 flows in the same direction. In some instances, the fluidic medium within each flow path 106 flows in at least one of a forward or reverse direction. In some instances, a plurality of sequestration pens is configured (e.g., relative to a channel 122) such that the sequestration pens can be loaded with target micro-objects in parallel.

In some embodiments, microfluidic circuit 120 further comprises one or more micro-object traps 132. The traps 132 are generally formed in a wall forming the boundary of a channel 122, and may be positioned opposite an opening of one or more of the microfluidic sequestration pens 124, 126, 128, 130. In some embodiments, the traps 132 are configured to receive or capture a single micro-object from the flow path 106. In some embodiments, the traps 132 are configured to receive or capture a plurality of micro-objects from the flow path 106. In some instances, the traps 132 comprise a volume approximately equal to the volume of a single target micro-object.

The traps 132 may further comprise an opening which is configured to assist the flow of targeted micro-objects into the traps 132. In some instances, the traps 132 comprise an opening having a height and width that is approximately equal to the dimensions of a single target micro-object, whereby larger micro-objects are prevented from entering into the micro-object trap. The traps 132 may further comprise other features configured to assist in retention of targeted micro-objects within the trap 132. In some instances, the trap 132 is aligned with and situated on the opposite side of a channel 122 relative to the opening of a microfluidic sequestration pen, such that upon tilting the microfluidic device 100 about an axis parallel to the microfluidic channel 122, the trapped micro-object exits the trap 132 at a trajectory that causes the micro-object to fall into the opening of the sequestration pen. In some instances, the trap 132 comprises a side passage 134 that is smaller than the target micro-object in order to facilitate flow through the trap 132 and thereby increase the likelihood of capturing a micro-object in the trap 132.

In some embodiments, dielectrophoretic (DEP) forces are applied across the fluidic medium 180 (e.g., in the flow path and/or in the sequestration pens) via one or more electrodes (not shown) to manipulate, transport, separate and sort micro-objects located therein. For example, in some embodiments, DEP forces are applied to one or more portions of microfluidic circuit 120 in order to transfer a single micro-object from the flow path 106 into a desired microfluidic sequestration pen. In some embodiments, DEP forces are used to prevent a micro-object within a sequestration pen (e.g., sequestration pen 124, 126, 128, or 130) from being displaced therefrom. Further, in some embodiments, DEP forces are used to selectively remove a micro-object from a sequestration pen that was previously collected in accordance with the embodiments of the current disclosure. In some embodiments, the DEP forces comprise optoelectronic tweezer (OET) forces.

In other embodiments, optoelectrowetting (OEW) forces are applied to one or more positions in the support structure 104 (and/or the cover 110) of the microfluidic device 100 (e.g., positions helping to define the flow path and/or the sequestration pens) via one or more electrodes (not shown) to manipulate, transport, separate and sort droplets located in the microfluidic circuit 120. For example, in some embodiments, OEW forces are applied to one or more positions in the support structure 104 (and/or the cover 110) in order to transfer a single droplet from the flow path 106 into a desired microfluidic sequestration pen. In some embodiments, OEW forces are used to prevent a droplet within a sequestration pen (e.g., sequestration pen 124, 126, 128, or 130) from being displaced therefrom. Further, in some embodiments, OEW forces are used to selectively remove a droplet from a sequestration pen that was previously collected in accordance with the embodiments of the current disclosure.

In some embodiments, DEP and/or OEW forces are combined with other forces, such as flow and/or gravitational force, so as to manipulate, transport, separate and sort micro-objects and/or droplets within the microfluidic circuit 120. For example, the enclosure 102 can be tilted (e.g., by tilting device 190) to position the flow path 106 and micro-objects located therein above the microfluidic sequestration pens, and the force of gravity can transport the micro-objects and/or droplets into the pens. In some embodiments, the DEP and/or OEW forces can be applied prior to the other forces. In other embodiments, the DEP and/or OEW forces can be applied after the other forces. In still other instances, the DEP and/or OEW forces can be applied at the same time as the other forces or in an alternating manner with the other forces.

Figure 1B:
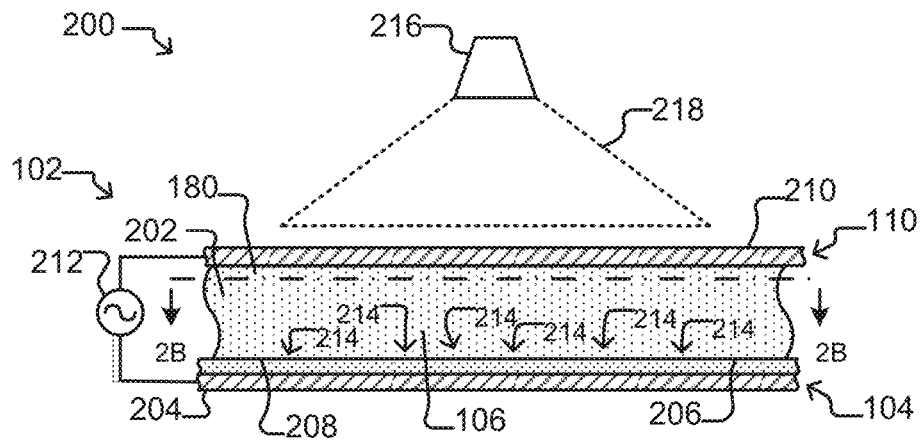
FIGS. 1B and 1C illustrate a microfluidic device according to some embodiments of the disclosure.

FIGS. 1B, 1C, and 2A-2H illustrates various embodiments of microfluidic devices that can be used in the practice of the embodiments of the present disclosure. FIG. 1B depicts an embodiment in which the microfluidic device 200 is configured as an optically-actuated electrokinetic device. A variety of optically-actuated electrokinetic devices are known in the art, including devices having an optoelectronic tweezer (OET) configuration and devices having an opto-electrowetting (OEW) configuration. Examples of suitable OET configurations are illustrated in the following U.S. patent documents, each of which is incorporated herein by reference in its entirety: U.S. Pat. No. RE 44,711 (Wu et al.) (originally issued as U.S. Pat. No. 7,612,355); and U.S. Pat. No. 7,956,339 (Ohta et al.). Examples of OEW configurations are illustrated in U.S. Pat. No. 6,958,132 (Chiou et al.) and U.S. Patent Application Publication No. 2012/0024708 (Chiou et al.), both of which are incorporated by reference herein in their entirety. Yet another example of an optically-actuated electrokinetic device includes a combined OET/OEW configuration, examples of which are shown in U.S. Patent Publication Nos. 20150306598 (Khandros et al.) and 20150306599 (Khandros et al.) and their corresponding PCT Publications WO2015/164846 and WO2015/164847, all of which are incorporated herein by reference in their entirety.

Examples of microfluidic devices having pens in which biological micro-objects can be placed, cultured, and/or monitored have been described, for example, in US 2014/0116881 (application Ser. No. 14/060,117, filed Oct. 22, 2013), US 2015/0151298 (application Ser. No. 14/520,568, filed Oct. 22, 2014), and US 2015/0165436 (application Ser. No. 14/521,447, filed Oct. 22, 2014), each of which is incorporated herein by reference in its entirety. US application Ser. Nos. 14/520,568 and 14/521,447 also describe exemplary methods of analyzing secretions of cells cultured in a microfluidic device. Each of the foregoing applications further describes microfluidic devices configured to produce dielectrophoretic (DEP) forces, such as optoelectronic tweezers (OET) or configured to provide opto-electro wetting (OEW). For example, the optoelectronic tweezers device illustrated in FIG. 2 of US 2014/0116881 is an example of a device that can be utilized in embodiments of the present disclosure to select and move an individual biological micro-object or a group of biological micro-objects.

Microfluidic device motive configurations. As described above, the control and monitoring equipment of the system can comprise a motive module for selecting and moving objects, such as micro-objects or droplets, in the microfluidic circuit of a microfluidic device. The microfluidic device can have a variety of motive configurations, depending upon the type of object being moved and other considerations. For example, a dielectrophoresis (DEP) configuration can be utilized to select and move micro-objects in the microfluidic circuit. Thus, the support structure 104 and/or cover 110 of the microfluidic device 100 can comprise a DEP configuration for selectively inducing DEP forces on micro-objects in a fluidic medium 180 in the microfluidic circuit 120 and thereby select, capture, and/or move individual micro-objects or groups of micro-objects. Alternatively, the support structure 104 and/or cover 110 of the microfluidic device 100 can comprise an electrowetting (EW) configuration for selectively inducing EW forces on droplets in a fluidic medium 180 in the microfluidic circuit 120 and thereby select, capture, and/or move individual droplets or groups of droplets.

Figure 1C:
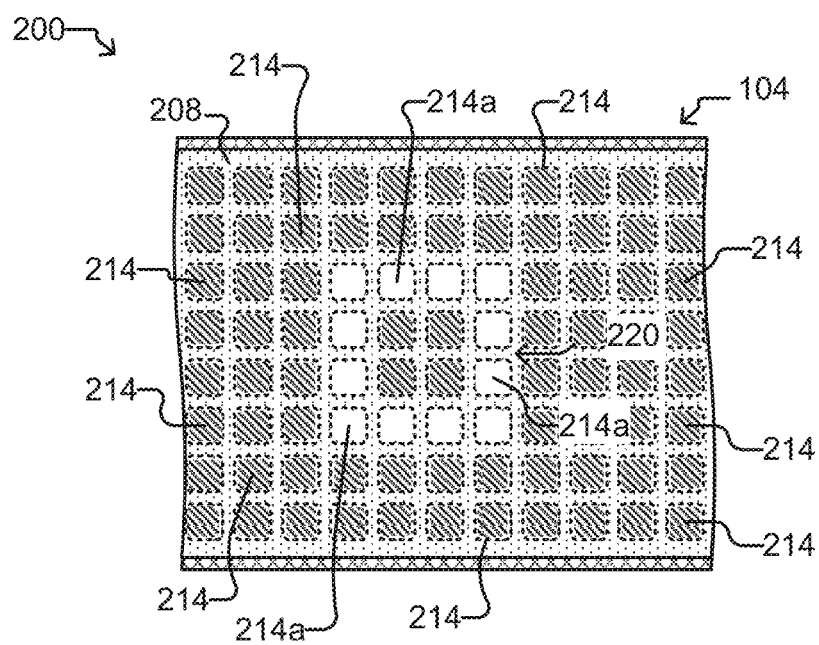

One example of a microfluidic device 200 comprising a DEP configuration is illustrated in FIGS. 1B and 1C. While for purposes of simplicity FIGS. 1B and 1C show a side cross-sectional view and a top cross-sectional view, respectively, of a portion of an enclosure 102 of the microfluidic device 200 having a region/chamber 202, it should be understood that the region/chamber 202 may be part of a fluidic circuit element having a more detailed structure, such as a growth chamber, a sequestration pen, a flow region, or a flow channel. Furthermore, the microfluidic device 200 may include other fluidic circuit elements. For example, the microfluidic device 200 can include a plurality of growth chambers or sequestration pens and/or one or more flow regions or flow channels, such as those described herein with respect to microfluidic device 100. A DEP configuration may be incorporated into any such fluidic circuit elements of the microfluidic device 200, or select portions thereof. It should be further appreciated that any of the above or below described microfluidic device components and system components may be incorporated in and/or used in combination with the microfluidic device 200. For example, system 150 including control and monitoring equipment 152, described above, may be used with microfluidic device 200, including one or more of the media module 160, motive module 162, imaging module 164, tilting module 166, and other modules 168.

As seen in FIG. 1B, the microfluidic device 200 includes a support structure 104 having a bottom electrode 204 and an electrode activation substrate 206 overlying the bottom electrode 204, and a cover 110 having a top electrode 210, with the top electrode 210 spaced apart from the bottom electrode 204. The top electrode 210 and the electrode activation substrate 206 define opposing surfaces of the region/chamber 202. A medium 180 contained in the region/chamber 202 thus provides a resistive connection between the top electrode 210 and the electrode activation substrate 206. A power source 212 configured to be connected to the bottom electrode 204 and the top electrode 210 and create a biasing voltage between the electrodes, as required for the generation of DEP forces in the region/chamber 202, is also shown. The power source 212 can be, for example, an alternating current (AC) power source.

In certain embodiments, the microfluidic device 200 illustrated in FIGS. 1B and 1C can have an optically-actuated DEP configuration. Accordingly, changing patterns of light 218 from the light source 216, which may be controlled by the motive module 162, can selectively activate and deactivate changing patterns of DEP electrodes at regions 214 of the inner surface 208 of the electrode activation substrate 206. (Hereinafter the regions 214 of a microfluidic device having a DEP configuration are referred to as "DEP electrode regions.") As illustrated in FIG. 1C, a light pattern 218 directed onto the inner surface 208 of the electrode activation substrate 206 can illuminate select DEP electrode regions 214a (shown in white) in a pattern, such as a square. The non-illuminated DEP electrode regions 214 (cross-hatched) are hereinafter referred to as "dark" DEP electrode regions 214. The relative electrical impedance through the DEP electrode activation substrate 206 (i.e., from the bottom electrode 204 up to the inner surface 208 of the electrode activation substrate 206 which interfaces with the medium 180 in the flow region 106) is greater than the relative electrical impedance through the medium 180 in the region/chamber 202 (i.e., from the inner surface 208 of the electrode activation substrate 206 to the top electrode 210 of the cover 110) at each dark DEP electrode region 214. An illuminated DEP electrode region 214a, however, exhibits a reduced relative impedance through the electrode activation substrate 206 that is less than the relative impedance through the medium 180 in the region/chamber 202 at each illuminated DEP electrode region 214a.

With the power source 212 activated, the foregoing DEP configuration creates an electric field gradient in the fluidic medium 180 between illuminated DEP electrode regions 214a and adjacent dark DEP electrode regions 214, which in turn creates local DEP forces that attract or repel nearby micro-objects (not shown) in the fluidic medium 180. DEP electrodes that attract or repel micro-objects in the fluidic medium 180 can thus be selectively activated and deactivated at many different such DEP electrode regions 214 at the inner surface 208 of the region/chamber 202 by changing light patterns 218 projected from a light source 216 into the microfluidic device 200. Whether the DEP forces attract or repel nearby micro-objects can depend on such parameters as the frequency of the power source 212 and the dielectric properties of the medium 180 and/or micro-objects (not shown).

The square pattern 220 of illuminated DEP electrode regions 214a illustrated in FIG. 1C is an example only. Any pattern of the DEP electrode regions 214 can be illuminated (and thereby activated) by the pattern of light 218 projected into the microfluidic device 200, and the pattern of illuminated/activated DEP electrode regions 214 can be repeatedly changed by changing or moving the light pattern 218.

In some embodiments, the electrode activation substrate 206 can comprise or consist of a photoconductive material. In such embodiments, the inner surface 208 of the electrode activation substrate 206 can be featureless. For example, the electrode activation substrate 206 can comprise or consist of a layer of hydrogenated amorphous silicon (a-Si:H). The a-Si:H can comprise, for example, about 8% to 40% hydrogen (calculated as 100*the number of hydrogen atoms/the total number of hydrogen and silicon atoms). The layer of a-Si:H can have a thickness of about 500 nm to about 2.0 µm. In such embodiments, the DEP electrode regions 214 can be created anywhere and in any pattern on the inner surface 208 of the electrode activation substrate 206, in accordance with the light pattern 218. The number and pattern of the DEP electrode regions 214 thus need not be fixed, but can correspond to the light pattern 218. Examples of microfluidic devices having a DEP configuration comprising a photoconductive layer such as discussed above have been described, for example, in U.S. Pat. No. RE 44,711 (Wu et al.) (originally issued as U.S. Pat. No. 7,612,355), the entire contents of which are incorporated herein by reference.

In other embodiments, the electrode activation substrate 206 can comprise a substrate comprising a plurality of doped layers, electrically insulating layers (or regions), and electrically conductive layers that form semiconductor integrated circuits, such as is known in semiconductor fields. For example, the electrode activation substrate 206 can comprise a plurality of phototransistors, including, for example, lateral bipolar phototransistors, each phototransistor corresponding to a DEP electrode region 214. Alternatively, the electrode activation substrate 206 can comprise electrodes (e.g., conductive metal electrodes) controlled by phototransistor switches, with each such electrode corresponding to a DEP electrode region 214. The electrode activation substrate 206 can include a pattern of such phototransistors or phototransistor-controlled electrodes. The pattern, for example, can be an array of substantially square phototransistors or phototransistor-controlled electrodes arranged in rows and columns, such as shown in FIG. 2B. Alternatively, the pattern can be an array of substantially hexagonal phototransistors or phototransistor-controlled electrodes that form a hexagonal lattice. Regardless of the pattern, electric circuit elements can form electrical connections between the DEP electrode regions 214 at the inner surface 208 of the electrode activation substrate 206 and the bottom electrode 210, and those electrical connections (i.e., phototransistors or electrodes) can be selectively activated and deactivated by the light pattern 218. When not activated, each electrical connection can have high impedance such that the relative impedance through the electrode activation substrate 206 (i.e., from the bottom electrode 204 to the inner surface 208 of the electrode activation substrate 206 which interfaces with the medium 180 in the region/chamber 202) is greater than the relative impedance through the medium 180 (i.e., from the inner surface 208 of the electrode activation substrate 206 to the top electrode 210 of the cover 110) at the corresponding DEP electrode region 214. When activated by light in the light pattern 218, however, the relative impedance through the electrode activation substrate 206 is less than the relative impedance through the medium 180 at each illuminated DEP electrode region 214, thereby activating the DEP electrode at the corresponding DEP electrode region 214 as discussed above. DEP electrodes that attract or repel micro-objects (not shown) in the medium 180 can thus be selectively activated and deactivated at many different DEP electrode regions 214 at the inner surface 208 of the electrode activation substrate 206 in the region/chamber 202 in a manner determined by the light pattern 218.

Examples of microfluidic devices having electrode activation substrates that comprise phototransistors have been described, for example, in U.S. Pat. No. 7,956,339 (Ohta et al.) (see, e.g., device 300 illustrated in FIGS. 21 and 22, and descriptions thereof), the entire contents of which are incorporated herein by reference. Examples of microfluidic devices having electrode activation substrates that comprise electrodes controlled by phototransistor switches have been described, for example, in U.S. Patent Publication No. 2014/0124370 (Short et al.) (see, e.g., devices 200, 400, 500, 600, and 900 illustrated throughout the drawings, and descriptions thereof), the entire contents of which are incorporated herein by reference.

In some embodiments of a DEP configured microfluidic device, the top electrode 210 is part of a first wall (or cover 110) of the enclosure 102, and the electrode activation substrate 206 and bottom electrode 204 are part of a second wall (or support structure 104) of the enclosure 102. The region/chamber 202 can be between the first wall and the second wall. In other embodiments, the electrode 210 is part of the second wall (or support structure 104) and one or both of the electrode activation substrate 206 and/or the electrode 210 are part of the first wall (or cover 110). Moreover, the light source 216 can alternatively be used to illuminate the enclosure 102 from below.

With the microfluidic device 200 of FIGS. 1B-1C having a DEP configuration, the motive module 162 can select a micro-object (not shown) in the medium 180 in the region/chamber 202 by projecting a light pattern 218 into the microfluidic device 200 to activate a first set of one or more DEP electrodes at DEP electrode regions 214a of the inner surface 208 of the electrode activation substrate 206 in a pattern (e.g., square pattern 220) that surrounds and captures the micro-object. The motive module 162 can then move the in situ-generated captured micro-object by moving the light pattern 218 relative to the microfluidic device 200 to activate a second set of one or more DEP electrodes at DEP electrode regions 214. Alternatively, the microfluidic device 200 can be moved relative to the light pattern 218.

In other embodiments, the microfluidic device 200 can have a DEP configuration that does not rely upon light activation of DEP electrodes at the inner surface 208 of the electrode activation substrate 206. For example, the electrode activation substrate 206 can comprise selectively addressable and energizable electrodes positioned opposite to a surface including at least one electrode (e.g., cover 110). Switches (e.g., transistor switches in a semiconductor substrate) may be selectively opened and closed to activate or inactivate DEP electrodes at DEP electrode regions 214, thereby creating a net DEP force on a micro-object (not shown) in region/chamber 202 in the vicinity of the activated DEP electrodes. Depending on such characteristics as the frequency of the power source 212 and the dielectric properties of the medium (not shown) and/or micro-objects in the region/chamber 202, the DEP force can attract or repel a nearby micro-object. By selectively activating and deactivating a set of DEP electrodes (e.g., at a set of DEP electrodes regions 214 that forms a square pattern 220), one or more micro-objects in region/chamber 202 can be trapped and moved within the region/chamber 202. The motive module 162 in FIG. 1A can control such switches and thus activate and deactivate individual ones of the DEP electrodes to select, trap, and move particular micro-objects (not shown) around the region/chamber 202. Microfluidic devices having a DEP configuration that includes selectively addressable and energizable electrodes are known in the art and have been described, for example, in U.S. Pat. No. 6,294,063 (Becker et al.) and U.S. Pat. No. 6,942,776 (Medoro), the entire contents of which are incorporated herein by reference.

As yet another example, the microfluidic device 200 can have an electrowetting (EW) configuration, which can be in place of the DEP configuration or can be located in a portion of the microfluidic device 200 that is separate from the portion which has the DEP configuration. The EW configuration can be an opto-electrowetting configuration or an electrowetting on dielectric (EWOD) configuration, both of which are known in the art. In some EW configurations, the support structure 104 has an electrode activation substrate 206 sandwiched between a dielectric layer (not shown) and the bottom electrode 204. The dielectric layer can comprise a hydrophobic material and/or can be coated with a hydrophobic material, as described below. For microfluidic devices 200 that have an EW configuration, the inner surface 208 of the support structure 104 is the inner surface of the dielectric layer or its hydrophobic coating.

The dielectric layer (not shown) can comprise one or more oxide layers, and can have a thickness of about 50 nm to about 250 nm (e.g., about 125 nm to about 175 nm). In certain embodiments, the dielectric layer may comprise a layer of oxide, such as a metal oxide (e.g., aluminum oxide or hafnium oxide). In certain embodiments, the dielectric layer can comprise a dielectric material other than a metal oxide, such as silicon oxide or a nitride. Regardless of the exact composition and thickness, the dielectric layer can have an impedance of about 10 kOhms to about 50 kOhms.

In some embodiments, the surface of the dielectric layer that faces inward toward region/chamber 202 is coated with a hydrophobic material. The hydrophobic material can comprise, for example, fluorinated carbon molecules. Examples of fluorinated carbon molecules include perfluoro-polymers such as polytetrafluoroethylene (e.g., TEFLON®) or poly (2,3-difluoromethylenyl-perfluorotetrahydrofuran) (e.g., CYTOP™). Molecules that make up the hydrophobic material can be covalently bonded to the surface of the dielectric layer. For example, molecules of the hydrophobic material can be covalently bound to the surface of the dielectric layer by means of a linker such as a siloxane group, a phosphonic acid group, or a thiol group. Thus, in some embodiments, the hydrophobic material can comprise alkyl-terminated siloxane, alkyl-termination phosphonic acid, or alkyl-terminated thiol. The alkyl group can be long-chain hydrocarbons (e.g., having a chain of at least 10 carbons, or at least 16, 18, 20, 22, or more carbons). Alternatively, fluorinated (or perfluorinated) carbon chains can be used in place of the alkyl groups. Thus, for example, the hydrophobic material can comprise fluoroalkyl-terminated siloxane, fluoroalkyl-terminated phosphonic acid, or fluoroalkyl-terminated thiol. In some embodiments, the hydrophobic coating has a thickness of about 10 nm to about 50 nm. In other embodiments, the hydrophobic coating has a thickness of less than 10 nm (e.g., less than 5 nm, or about 1.5 to 3.0 nm).

In some embodiments, the cover 110 of a microfluidic device 200 having an electrowetting configuration is coated with a hydrophobic material (not shown) as well. The hydrophobic material can be the same hydrophobic material used to coat the dielectric layer of the support structure 104, and the hydrophobic coating can have a thickness that is substantially the same as the thickness of the hydrophobic coating on the dielectric layer of the support structure 104. Moreover, the cover 110 can comprise an electrode activation substrate 206 sandwiched between a dielectric layer and the top electrode 210, in the manner of the support structure 104. The electrode activation substrate 206 and the dielectric layer of the cover 110 can have the same composition and/or dimensions as the electrode activation substrate 206 and the dielectric layer of the support structure 104. Thus, the microfluidic device 200 can have two electrowetting surfaces.

In some embodiments, the electrode activation substrate 206 can comprise a photoconductive material, such as described above. Accordingly, in certain embodiments, the electrode activation substrate 206 can comprise or consist of a layer of hydrogenated amorphous silicon (a-Si:H). The a-Si:H can comprise, for example, about 8% to 40% hydrogen (calculated as 100*the number of hydrogen atoms/the total number of hydrogen and silicon atoms). The layer of a-Si:H can have a thickness of about 500 nm to about 2.0 µm. Alternatively, the electrode activation substrate 206 can comprise electrodes (e.g., conductive metal electrodes) controlled by phototransistor switches, as described above. Microfluidic devices having an opto-electrowetting configuration are known in the art and/or can be constructed with electrode activation substrates known in the art. For example, U.S. Pat. No. 6,958,132 (Chiou et al.), the entire contents of which are incorporated herein by reference, discloses opto-electrowetting configurations having a photoconductive material such as a-Si:H, while U.S. Patent Publication No. 2014/0124370 (Short et al.), referenced above, discloses electrode activation substrates having electrodes controlled by phototransistor switches.

The microfluidic device 200 thus can have an opto-electrowetting configuration, and light patterns 218 can be used to activate photoconductive EW regions or photoresponsive EW electrodes in the electrode activation substrate 206. Such activated EW regions or EW electrodes of the electrode activation substrate 206 can generate an electrowetting force at the inner surface 208 of the support structure 104 (i.e., the inner surface of the overlaying dielectric layer or its hydrophobic coating). By changing the light patterns 218 (or moving microfluidic device 200 relative to the light source 216) incident on the electrode activation substrate 206, droplets (e.g., containing an aqueous medium, solution, or solvent) contacting the inner surface 208 of the support structure 104 can be moved through an immiscible fluid (e.g., an oil medium) present in the region/chamber 202.

In other embodiments, microfluidic devices 200 can have an EWOD configuration, and the electrode activation substrate 206 can comprise selectively addressable and energizable electrodes that do not rely upon light for activation. The electrode activation substrate 206 thus can include a pattern of such electrowetting (EW) electrodes. The pattern, for example, can be an array of substantially square EW electrodes arranged in rows and columns, such as shown in FIG. 2B. Alternatively, the pattern can be an array of substantially hexagonal EW electrodes that form a hexagonal lattice. Regardless of the pattern, the EW electrodes can be selectively activated (or deactivated) by electrical switches (e.g., transistor switches in a semiconductor substrate). By selectively activating and deactivating EW electrodes in the electrode activation substrate 206, droplets (not shown) contacting the inner surface 208 of the overlaying dielectric layer or its hydrophobic coating can be moved within the region/chamber 202. The motive module 162 in FIG. 1A can control such switches and thus activate and deactivate individual EW electrodes to select and move particular droplets around region/chamber 202. Microfluidic devices having a EWOD configuration with selectively addressable and energizable electrodes are known in the art and have been described, for example, in U.S. Pat. No. 8,685,344 (Sundarsan et al.), the entire contents of which are incorporated herein by reference.

Regardless of the configuration of the microfluidic device 200, a power source 212 can be used to provide a potential (e.g., an AC voltage potential) that powers the electrical circuits of the microfluidic device 200. The power source 212 can be the same as, or a component of, the power source 192 referenced in FIG. 1. Power source 212 can be configured to provide an AC voltage and/or current to the top electrode 210 and the bottom electrode 204. For an AC voltage, the power source 212 can provide a frequency range and an average or peak power (e.g., voltage or current) range sufficient to generate net DEP forces (or electrowetting forces) strong enough to trap and move individual micro-objects (not shown) in the region/chamber 202, as discussed above, and/or to change the wetting properties of the inner surface 208 of the support structure 104 (i.e., the dielectric layer and/or the hydrophobic coating on the dielectric layer) in the region/chamber 202, as also discussed above. Such frequency ranges and average or peak power ranges are known in the art. See, e.g., U.S. Pat. No. 6,958,132 (Chiou et al.), US Patent No. RE 44,711 (Wu et al.) (originally issued as U.S. Pat. No. 7,612,355), and US Patent Application Publication Nos. US2014/0124370 (Short et al.), US 2015/0306598 (Khandros et al.), and US 2015/0306599 (Khandros et al.).

Sequestration pens. Non-limiting examples of generic sequestration pens 224, 226, and 228 are shown within the microfluidic device 230 depicted in FIGS. 2A-2C. Each sequestration pen 224, 226, and 228 can comprise an isolation structure 232 defining an isolation region 240 and a connection region 236 fluidically connecting the isolation region 240 to a channel 122. The connection region 236 can comprise a proximal opening 234 to the microfluidic channel 122 and a distal opening 238 to the isolation region 240. The connection region 236 can be configured so that the maximum penetration depth of a flow of a fluidic medium (not shown) flowing from the microfluidic channel 122 into the sequestration pen 224, 226, 228 does not extend into the isolation region 240. Thus, due to the connection region 236, a micro-object (not shown) or other material (not shown) disposed in an isolation region 240 of a sequestration pen 224, 226, 228 can thus be isolated from, and not substantially affected by, a flow of medium 180 in the microfluidic channel 122.

Figure 2A:
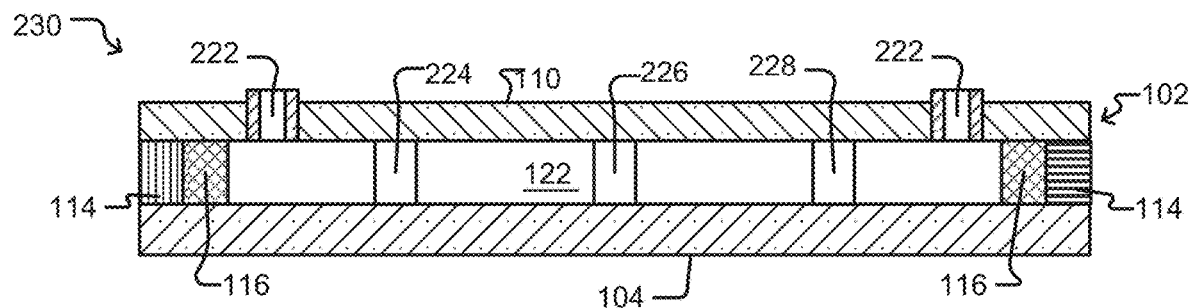
FIGS. 2A and 2B illustrate isolation pens according to some embodiments of the disclosure.
Figure 2B:
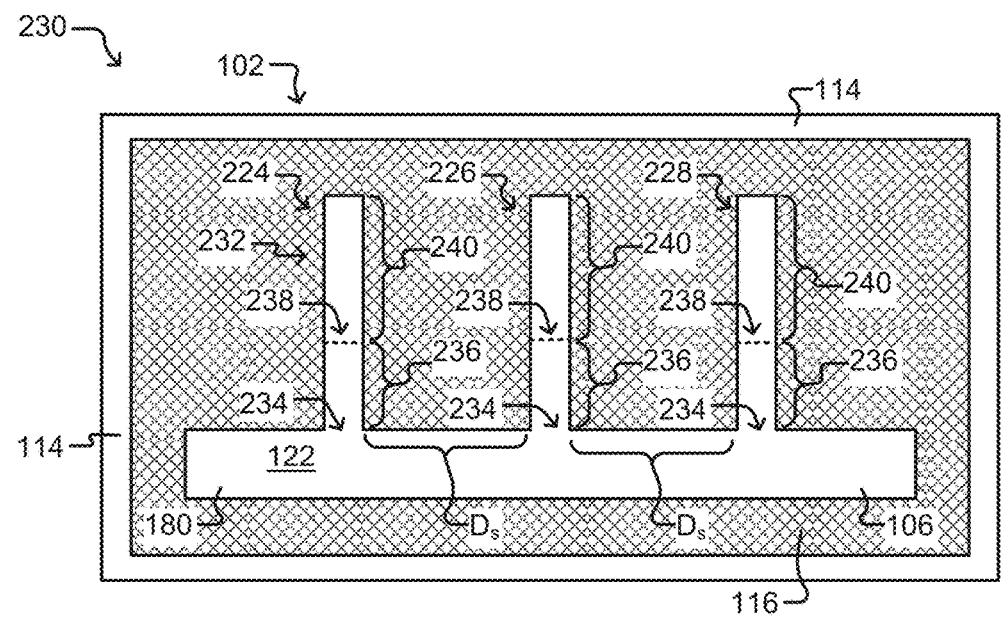
Figure 2C:
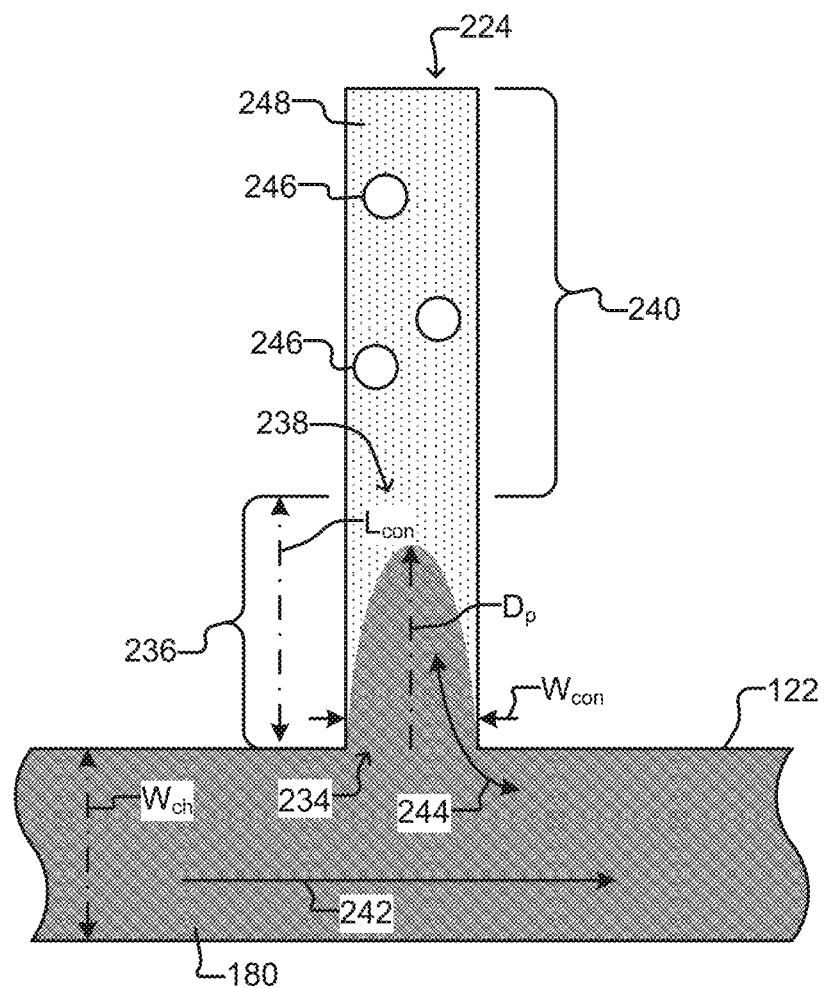
FIG. 2C illustrates a detailed sequestration pen according to some embodiments of the disclosure.

The sequestration pens 224, 226, and 228 of FIGS. 2A-2C each have a single opening which opens directly to the microfluidic channel 122. The opening of the sequestration pen opens laterally from the microfluidic channel 122. The electrode activation substrate 206 underlays both the microfluidic channel 122 and the sequestration pens 224, 226, and 228. The upper surface of the electrode activation substrate 206 within the enclosure of a sequestration pen, forming the floor of the sequestration pen, is disposed at the same level or substantially the same level of the upper surface the of electrode activation substrate 206 within the microfluidic channel 122 (or flow region if a channel is not present), forming the floor of the flow channel (or flow region, respectively) of the microfluidic device. The electrode activation substrate 206 may be featureless or may have an irregular or patterned surface that varies from its highest elevation to its lowest depression by less than about 3 microns, 2.5 microns, 2 microns, 1.5 microns, 1 micron, 0.9 microns, 0.5 microns, 0.4 microns, 0.2 microns, 0.1 microns or less. The variation of elevation in the upper surface of the substrate across both the microfluidic channel 122 (or flow region) and sequestration pens may be less than about 3%, 2%, 1%, 0.9%, 0.8%, 0.5%, 0.3% or 0.1% of the height of the walls of the sequestration pen or walls of the microfluidic device. While described in detail for the microfluidic device 200, this also applies to any of the microfluidic devices 100, 230, 250, 280, 290, 320, 400, 450, 500, 700 described herein.

The microfluidic channel 122 can thus be an example of a swept region, and the isolation regions 240 of the sequestration pens 224, 226, 228 can be examples of unswept regions. As noted, the microfluidic channel 122 and sequestration pens 224, 226, 228 can be configured to contain one or more fluidic media 180. In the example shown in FIGS. 2A-2B, the ports 222 are connected to the microfluidic channel 122 and allow a fluidic medium 180 to be introduced into or removed from the microfluidic device 230. Prior to introduction of the fluidic medium 180, the microfluidic device may be primed with a gas such as carbon dioxide gas. Once the microfluidic device 230 contains the fluidic medium 180, the flow 242 of fluidic medium 180 in the microfluidic channel 122 can be selectively generated and stopped. For example, as shown, the ports 222 can be disposed at different locations (e.g., opposite ends) of the microfluidic channel 122, and a flow 242 of medium can be created from one port 222 functioning as an inlet to another port 222 functioning as an outlet.

FIG. 2C illustrates a detailed view of an example of a sequestration pen 224 according to the present disclosure. Examples of micro-objects 246 are also shown.

As is known, a flow 242 of fluidic medium 180 in a microfluidic channel 122 past a proximal opening 234 of sequestration pen 224 can cause a secondary flow 244 of the medium 180 into and/or out of the sequestration pen 224. To isolate micro-objects 246 in the isolation region 240 of a sequestration pen 224 from the secondary flow 244, the length $L_{con}$ of the connection region 236 of the sequestration pen 224 (i.e., from the proximal opening 234 to the distal opening 238) should be greater than the penetration depth $D_p$ of the secondary flow 244 into the connection region 236. The penetration depth $D_p$ of the secondary flow 244 depends upon the velocity of the fluidic medium 180 flowing in the microfluidic channel 122 and various parameters relating to the configuration of the microfluidic channel 122 and the proximal opening 234 of the connection region 236 to the microfluidic channel 122. For a given microfluidic device, the configurations of the microfluidic channel 122 and the opening 234 will be fixed, whereas the rate of flow 242 of fluidic medium 180 in the microfluidic channel 122 will be variable. Accordingly, for each sequestration pen 224, a maximal velocity $V_{max}$ for the flow 242 of fluidic medium 180 in channel 122 can be identified that ensures that the penetration depth $D_p$ of the secondary flow 244 does not exceed the length $L_{con}$ of the connection region 236. As long as the rate of the flow 242 of fluidic medium 180 in the microfluidic channel 122 does not exceed the maximum velocity $V_{max}$, the resulting secondary flow 244 can be limited to the microfluidic channel 122 and the connection region 236 and kept out of the isolation region 240. The flow 242 of medium 180 in the microfluidic channel 122 will thus not draw micro-objects 246 out of the isolation region 240. Rather, micro-objects 246 located in the isolation region 240 will stay in the isolation region 240 regardless of the flow 242 of fluidic medium 180 in the microfluidic channel 122.

Moreover, as long as the rate of flow 242 of medium 180 in the microfluidic channel 122 does not exceed $V_{max}$, the flow 242 of fluidic medium 180 in the microfluidic channel 122 will not move miscellaneous particles (e.g., microparticles and/or nanoparticles) from the microfluidic channel 122 into the isolation region 240 of a sequestration pen 224. Having the length $L_{con}$ of the connection region 236 be greater than the maximum penetration depth $D_p$ of the secondary flow 244 can thus prevent contamination of one sequestration pen 224 with miscellaneous particles from the microfluidic channel 122 or another sequestration pen (e.g., sequestration pens 226, 228 in FIG. 2D).

Because the microfluidic channel 122 and the connection regions 236 of the sequestration pens 224, 226, 228 can be affected by the flow 242 of medium 180 in the microfluidic channel 122, the microfluidic channel 122 and connection regions 236 can be deemed swept (or flow) regions of the microfluidic device 230. The isolation regions 240 of the sequestration pens 224, 226, 228, on the other hand, can be deemed unswept (or non-flow) regions. For example, components (not shown) in a first fluidic medium 180 in the microfluidic channel 122 can mix with a second fluidic medium 248 in the isolation region 240 substantially only by diffusion of components of the first medium 180 from the microfluidic channel 122 through the connection region 236 and into the second fluidic medium 248 in the isolation region 240. Similarly, components (not shown) of the second medium 248 in the isolation region 240 can mix with the first medium 180 in the microfluidic channel 122 substantially only by diffusion of components of the second medium 248 from the isolation region 240 through the connection region 236 and into the first medium 180 in the microfluidic channel 122. In some embodiments, the extent of fluidic medium exchange between the isolation region of a sequestration pen and the flow region by diffusion is greater than about 90%, 91%, 92%, 93%, 94% 95%, 96%, 97%, 98%, or greater than about 99% of fluidic exchange. The first medium 180 can be the same medium or a different medium than the second medium 248. Moreover, the first medium 180 and the second medium 248 can start out being the same, then become different (e.g., through conditioning of the second medium 248 by one or more cells in the isolation region 240, or by changing the medium 180 flowing through the microfluidic channel 122).

The maximum penetration depth $D_p$ of the secondary flow 244 caused by the flow 242 of fluidic medium 180 in the microfluidic channel 122 can depend on a number of parameters, as mentioned above. Examples of such parameters include: the shape of the microfluidic channel 122 (e.g., the microfluidic channel can direct medium into the connection region 236, divert medium away from the connection region 236, or direct medium in a direction substantially perpendicular to the proximal opening 234 of the connection region 236 to the microfluidic channel 122); a width $W_{ch}$ (or cross-sectional area) of the microfluidic channel 122 at the proximal opening 234; and a width $W_{con}$ (or cross-sectional area) of the connection region 236 at the proximal opening 234; the velocity V of the flow 242 of fluidic medium 180 in the microfluidic channel 122; the viscosity of the first medium 180 and/or the second medium 248, or the like.

In some embodiments, the dimensions of the microfluidic channel 122 and sequestration pens 224, 226, 228 can be oriented as follows with respect to the vector of the flow 242 of fluidic medium 180 in the microfluidic channel 122: the microfluidic channel width $W_{ch}$ (or cross-sectional area of the microfluidic channel 122) can be substantially perpendicular to the flow 242 of medium 180; the width $W_{con}$ (or cross-sectional area) of the connection region 236 at opening 234 can be substantially parallel to the flow 242 of medium 180 in the microfluidic channel 122; and/or the length $L_{con}$ of the connection region can be substantially perpendicular to the flow 242 of medium 180 in the microfluidic channel 122. The foregoing are examples only, and the relative position of the microfluidic channel 122 and sequestration pens 224, 226, 228 can be in other orientations with respect to each other.

As illustrated in FIG. 2C, the width $W_{con}$ of the connection region 236 can be uniform from the proximal opening 234 to the distal opening 238. The width $W_{con}$ of the connection region 236 at the distal opening 238 can thus be in any of the ranges identified herein for the width $W_{con}$ of the connection region 236 at the proximal opening 234. Alternatively, the width $W_{con}$ of the connection region 236 at the distal opening 238 can be larger than the width $W_{con}$ of the connection region 236 at the proximal opening 234.

As illustrated in FIG. 2C, the width of the isolation region 240 at the distal opening 238 can be substantially the same as the width $W_{con}$ of the connection region 236 at the proximal opening 234. The width of the isolation region 240 the distal opening 238 can thus be in any of the ranges identified herein for the width $W_{con}$ of the connection region 236 at the proximal opening 234. Alternatively, the width of the isolation region 240 at the distal opening 238 can be larger or smaller than the width $W_{con}$ of the connection region 236 at the proximal opening 234. Moreover, the distal opening 238 may be smaller than the proximal opening 234 and the width $W_{con}$ of the connection region 236 may be narrowed between the proximal opening 234 and distal opening 238. For example, the connection region 236 may be narrowed between the proximal opening and the distal opening, using a variety of different geometries (e g chamfering the connection region, beveling the connection region). Further, any part or subpart of the connection region 236 may be narrowed (e.g. a portion of the connection region adjacent to the proximal opening 234).

Figure 2D:
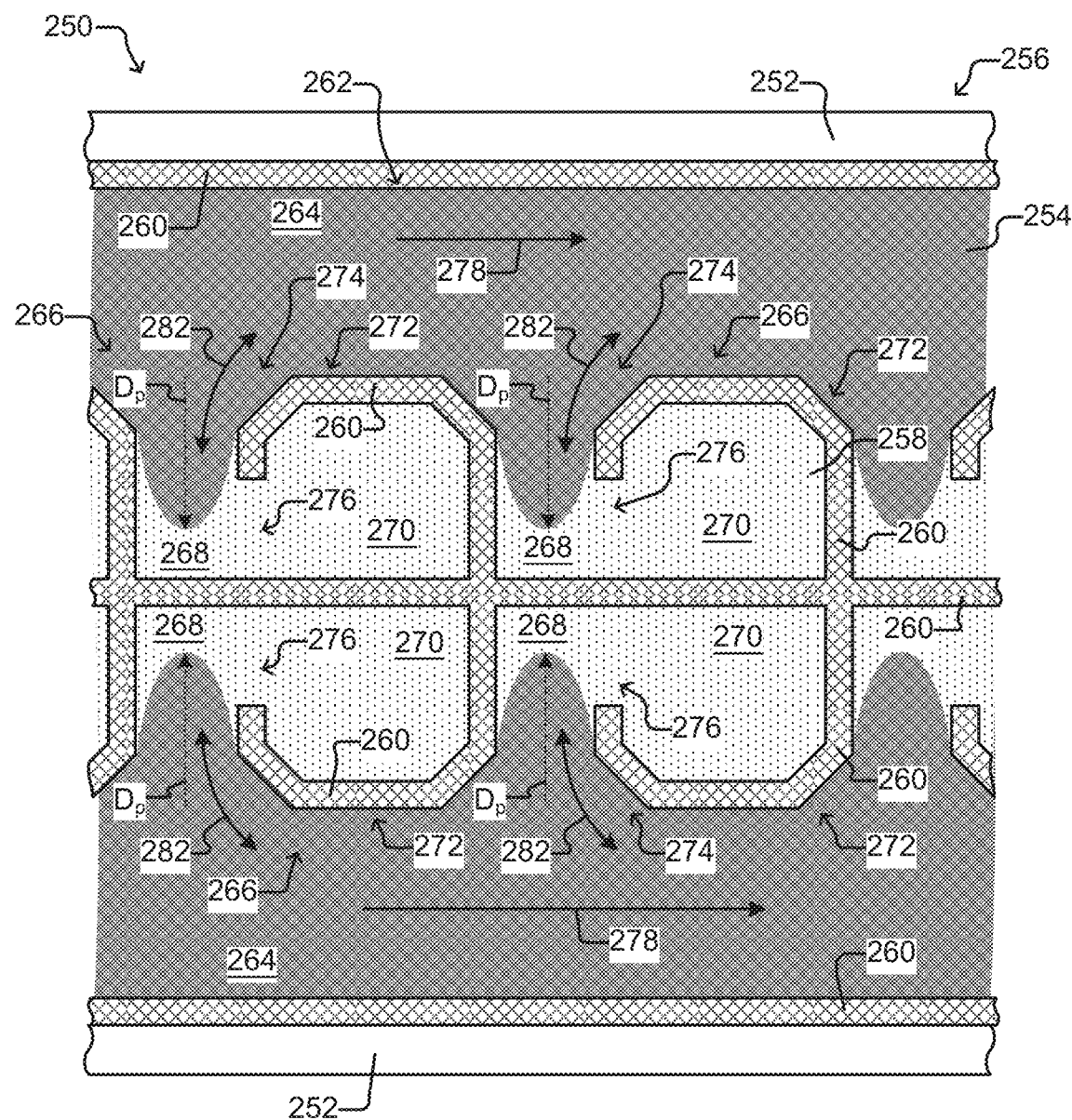
FIGS. 2D-F illustrate sequestration pens according to some other embodiments of the disclosure.
Figure 2E:
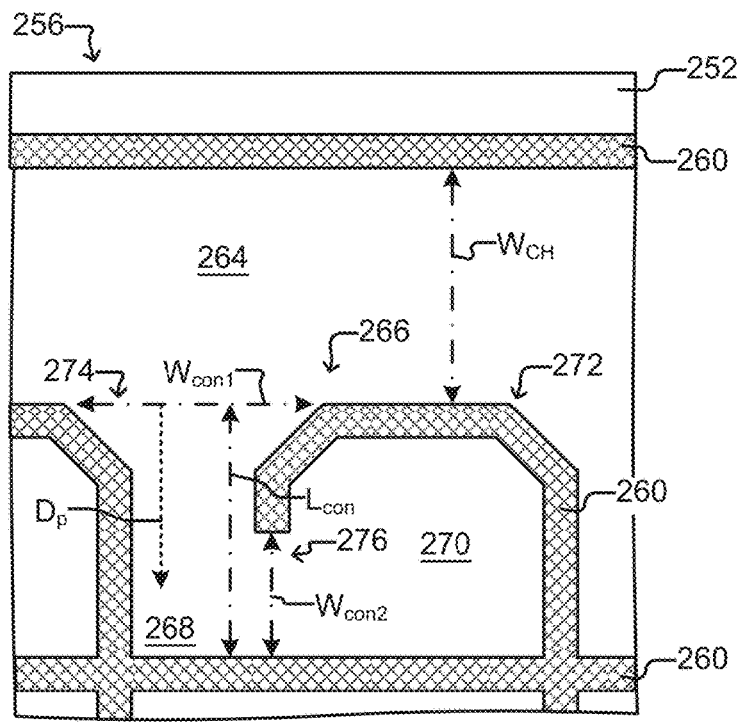
Figure 2F:
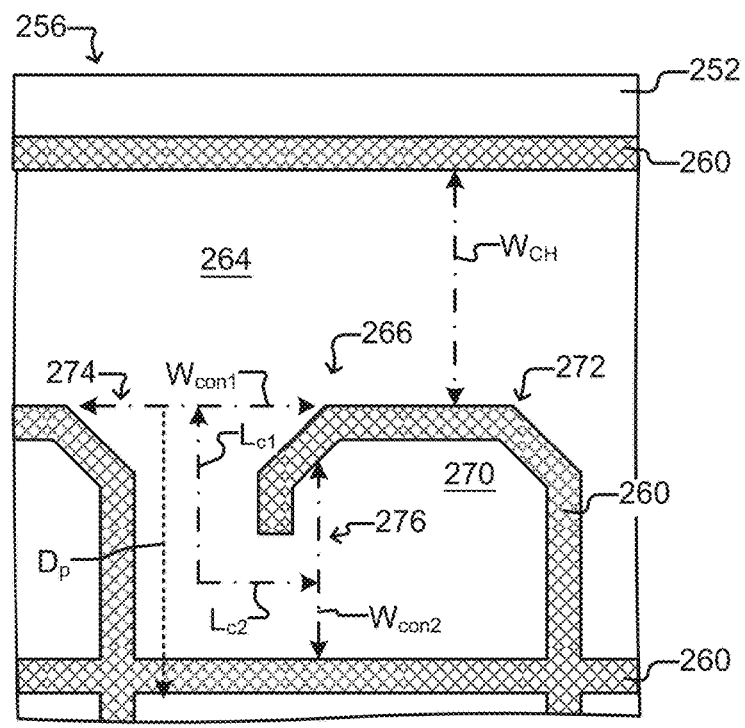

FIGS. 2D-2F depict another exemplary embodiment of a microfluidic device 250 containing a microfluidic circuit 262 and flow channels 264, which are variations of the respective microfluidic device 100, circuit 132 and channel 134 of FIG. 1A. The microfluidic device 250 also has a plurality of sequestration pens 266 that are additional variations of the above-described sequestration pens 124, 126, 128, 130, 224, 226 or 228. In particular, it should be appreciated that the sequestration pens 266 of device 250 shown in FIGS. 2D-2F can replace any of the above-described sequestration pens 124, 126, 128, 130, 224, 226 or 228 in devices 100, 200, 230, 280, 290, 300. Likewise, the microfluidic device 250 is another variant of the microfluidic device 100, and may also have the same or a different DEP configuration as the above-described microfluidic device 100, 200, 230, 280, 290, 300 as well as any of the other microfluidic system components described herein.

The microfluidic device 250 of FIGS. 2D-2F comprises a support structure (not visible in FIGS. 2D-2F, but can be the same or generally similar to the support structure 104 of device 100 depicted in FIG. 1A), a microfluidic circuit structure 256, and a cover (not visible in FIGS. 2D-2F, but can be the same or generally similar to the cover 122 of device 100 depicted in FIG. 1A). The microfluidic circuit structure 256 includes a frame 252 and microfluidic circuit material 260, which can be the same as or generally similar to the frame 114 and microfluidic circuit material 116 of device 100 shown in FIG. 1A. As shown in FIG. 2D, the microfluidic circuit 262 defined by the microfluidic circuit material 260 can comprise multiple channels 264 (two are shown but there can be more) to which multiple sequestration pens 266 are fluidically connected.

Each sequestration pen 266 can comprise an isolation structure 272, an isolation region 270 within the isolation structure 272, and a connection region 268. From a proximal opening 274 at the microfluidic channel 264 to a distal opening 276 at the isolation structure 272, the connection region 268 fluidically connects the microfluidic channel 264 to the isolation region 270. Generally, in accordance with the above discussion of FIGS. 2B and 2C, a flow 278 of a first fluidic medium 254 in a channel 264 can create secondary flows 282 of the first medium 254 from the microfluidic channel 264 into and/or out of the respective connection regions 268 of the sequestration pens 266.

As illustrated in FIG. 2E, the connection region 268 of each sequestration pen 266 generally includes the area extending between the proximal opening 274 to a channel 264 and the distal opening 276 to an isolation structure 272. The length $L_{con}$ of the connection region 268 can be greater than the maximum penetration depth $D_p$ of secondary flow 282, in which case the secondary flow 282 will extend into the connection region 268 without being redirected toward the isolation region 270 (as shown in FIG. 2D). Alternatively, at illustrated in FIG. 2F, the connection region 268 can have a length $L_{con}$ that is less than the maximum penetration depth $D_p$, in which case the secondary flow 282 will extend through the connection region 268 and be redirected toward the isolation region 270. In this latter situation, the sum of lengths $L_{c1}$ and $L_{c2}$ of connection region 268 is greater than the maximum penetration depth $D_p$, so that secondary flow 282 will not extend into isolation region 270. Whether length $L_{con}$ of connection region 268 is greater than the penetration depth $D_p$, or the sum of lengths $L_{c1}$ and $L_{c2}$ of connection region 268 is greater than the penetration depth $D_p$, a flow 278 of a first medium 254 in channel 264 that does not exceed a maximum velocity $V_{max}$ will produce a secondary flow having a penetration depth $D_p$, and micro-objects (not shown but can be the same or generally similar to the micro-objects 246 shown in FIG. 2C) in the isolation region 270 of a sequestration pen 266 will not be drawn out of the isolation region 270 by a flow 278 of first medium 254 in channel 264. Nor will the flow 278 in channel 264 draw miscellaneous materials (not shown) from channel 264 into the isolation region 270 of a sequestration pen 266. As such, diffusion is the only mechanism by which components in a first medium 254 in the microfluidic channel 264 can move from the microfluidic channel 264 into a second medium 258 in an isolation region 270 of a sequestration pen 266. Likewise, diffusion is the only mechanism by which components in a second medium 258 in an isolation region 270 of a sequestration pen 266 can move from the isolation region 270 to a first medium 254 in the microfluidic channel 264. The first medium 254 can be the same medium as the second medium 258, or the first medium 254 can be a different medium than the second medium 258. Alternatively, the first medium 254 and the second medium 258 can start out being the same, then become different, e.g., through conditioning of the second medium by one or more cells in the isolation region 270, or by changing the medium flowing through the microfluidic channel 264.

As illustrated in FIG. 2E, the width $W_{ch}$ of the microfluidic channels 264 (i.e., taken transverse to the direction of a fluid medium flow through the microfluidic channel indicated by arrows 278 in FIG. 2D) in the microfluidic channel 264 can be substantially perpendicular to a width $W_{con1}$ of the proximal opening 274 and thus substantially parallel to a width $W_{con2}$ of the distal opening 276. The width $W_{con1}$ of the proximal opening 274 and the width $W_{con2}$ of the distal opening 276, however, need not be substantially perpendicular to each other. For example, an angle between an axis (not shown) on which the width $W_{con1}$ of the proximal opening 274 is oriented and another axis on which the width $W_{con2}$ of the distal opening 276 is oriented can be other than perpendicular and thus other than 90°. Examples of alternatively oriented angles include angles in any of the following ranges: from about 30° to about 90°, from about 45° to about 90°, from about 60° to about 90°, or the like.

In various embodiments of sequestration pens (e.g. 124, 126, 128, 130, 224, 226, 228, or 266), the isolation region (e.g. 240 or 270) is configured to contain a plurality of micro-objects. In other embodiments, the isolation region can be configured to contain only one, two, three, four, five, or a similar relatively small number of micro-objects. Accordingly, the volume of an isolation region can be, for example, at least $1\times10^6$, $2\times10^6$, $4\times10^6$, $6\times10^6$ cubic microns, or more.

In various embodiments of sequestration pens, the width $W_{ch}$ of the microfluidic channel (e.g., 122) at a proximal opening (e.g. 234) can be within any of the following ranges: about 50-1000 microns, 50-500 microns, 50-400 microns, 50-300 microns, 50-250 microns, 50-200 microns, 50-150 microns, 50-100 microns, 70-500 microns, 70-400 microns, 70-300 microns, 70-250 microns, 70-200 microns, 70-150 microns, 90-400 microns, 90-300 microns, 90-250 microns, 90-200 microns, 90-150 microns, 100-300 microns, 100-250 microns, 100-200 microns, 100-150 microns, and 100-120 microns. In some other embodiments, the width $W_{ch}$ of the microfluidic channel (e.g., 122) at a proximal opening (e.g. 234) can be about 200-800 microns, 200-700 microns, or 200-600 microns. The foregoing are examples only, and the width $W_{ch}$ of the microfluidic channel 122 can be in other ranges (e.g., a range defined by any of the endpoints listed above). Moreover, the $W_{ch}$ of the microfluidic channel 122 can be selected to be in any of these ranges in regions of the microfluidic channel other than at a proximal opening of a sequestration pen.

In some embodiments, a sequestration pen has a height of about 30 to about 200 microns, or about 50 to about 150 microns. In some embodiments, the sequestration pen has a cross-sectional area of about $1\times10^4$-$3\times10^6$ square microns, $2\times10^4$-$2\times10^6$ square microns, $4\times10^4$-$1\times10^6$ square microns, $2\times10^4$-$5\times10^5$ square microns, $2\times10^4$-$1\times10^5$ square microns or about $2\times10^5$-$2\times10^6$ square microns.

In various embodiments of sequestration pens, the height $H_{ch}$ of the microfluidic channel (e.g., 122) at a proximal opening (e.g., 234) can be within any of the following ranges: 20-100 microns, 20-90 microns, 20-80 microns, 20-70 microns, 20-60 microns, 20-50 microns, 30-100 microns, 30-90 microns, 30-80 microns, 30-70 microns, 30-60 microns, 30-50 microns, 40-100 microns, 40-90 microns, 40-80 microns, 40-70 microns, 40-60 microns, or 40-50 microns. The foregoing are examples only, and the height $H_{ch}$ of the microfluidic channel (e.g., 122) can be in other ranges (e.g., a range defined by any of the endpoints listed above). The height $H_{ch}$ of the microfluidic channel 122 can be selected to be in any of these ranges in regions of the microfluidic channel other than at a proximal opening of a sequestration pen.

In various embodiments of sequestration pens a cross-sectional area of the microfluidic channel (e.g., 122) at a proximal opening (e.g., 234) can be within any of the following ranges: 500-50,000 square microns, 500-40,000 square microns, 500-30,000 square microns, 500-25,000 square microns, 500-20,000 square microns, 500-15,000 square microns, 500-10,000 square microns, 500-7,500 square microns, 500-5,000 square microns, 1,000-25,000 square microns, 1,000-20,000 square microns, 1,000-15,000 square microns, 1,000-10,000 square microns, 1,000-7,500 square microns, 1,000-5,000 square microns, 2,000-20,000 square microns, 2,000-15,000 square microns, 2,000-10,000 square microns, 2,000-7,500 square microns 2,000-6,000 square microns, 3,000-20,000 square microns, 3,000-15,000 square microns, 3,000-10,000 square microns, 3,000-7,500 square microns, or 3,000 to 6,000 square microns. The foregoing are examples only, and the cross-sectional area of the microfluidic channel (e.g., 122) at a proximal opening (e.g., 234) can be in other ranges (e.g., a range defined by any of the endpoints listed above).

In various embodiments of sequestration pens, the length $L_{con}$ of the connection region (e.g., 236) can be in any of the following ranges: about 1-600 microns, 5-550 microns, 10-500 microns, 15-400 microns, 20-300 microns, 20-500 microns, 40-400 microns, 60-100 microns, 80-200 microns, or about 100-150 microns. The foregoing are examples only, and length $L_{con}$ of a connection region (e.g., 236) can be in a different range than the foregoing examples (e.g., a range defined by any of the endpoints listed above).

In various embodiments of sequestration pens the width $W_{con}$ of a connection region (e.g., 236) at a proximal opening (e.g., 234) can be in any of the following ranges: 20-500 microns, 20-400 microns, 20-300 microns, 20-200 microns, 20-150 microns, 20-100 microns, 20-80 microns, 20-60 microns, 30-400 microns, 30-300 microns, 30-200 microns, 30-150 microns, 30-100 microns, 30-80 microns, 30-60 microns, 40-300 microns, 40-200 microns, 40-150 microns, 40-100 microns, 40-80 microns, 40-60 microns, 50-250 microns, 50-200 microns, 50-150 microns, 50-100 microns, 50-80 microns, 60-200 microns, 60-150 microns, 60-100 microns, 60-80 microns, 70-150 microns, 70-100 microns, and 80-100 microns. The foregoing are examples only, and the width $W_{ch}$ of a connection region (e.g., 236) at a proximal opening (e.g., 234) can be different than the foregoing examples (e.g., a range defined by any of the endpoints listed above).

In various embodiments of sequestration pens, the width $W_{con}$ of a connection region (e.g., 236) at a proximal opening (e.g., 234) can be at least as large as the largest dimension of a micro-object (e.g., biological cell which may be a T cell, B cell, or an ovum or embryo) that the sequestration pen is intended for. The foregoing are examples only, and the width $W_{con}$ of a connection region (e.g., 236) at a proximal opening (e.g., 234) can be different than the foregoing examples (e.g., a range defined by any of the endpoints listed above).

In various embodiments of sequestration pens, the width $W_{pr}$ of a proximal opening of a connection region may be at least as large as the largest dimension of a micro-object (e.g., a biological micro-object such as a cell) that the sequestration pen is intended for. For example, the width $W_{pr}$ may be about 50 microns, about 60 microns, about 100 microns, about 200 microns, about 300 microns or may be about 50-300 microns, about 50-200 microns, about 50-100 microns, about 75-150 microns, about 75-100 microns, or about 200-300 microns In various embodiments of sequestration pens, a ratio of the length $L_{con}$ of a connection region (e.g., 236) to a width $W_{con}$ of the connection region (e.g., 236) at the proximal opening 234 can be greater than or equal to any of the following ratios: 0.5, 1.0, 1.5, 2.0, 2.5, 3.0, 3.5, 4.0, 4.5, 5.0, 6.0, 7.0, 8.0, 9.0, 10.0, or more. The foregoing are examples only, and the ratio of the length $L_{con}$ of a connection region 236 to a width $W_{con}$ of the connection region 236 at the proximal opening 234 can be different than the foregoing examples.

In various embodiments of microfluidic devices 100, 200, 23, 250, 280, 290, 300, $V_{max}$ can be set around 0.2, 0.5, 0.7, 1.0, 1.3, 1.5, 2.0, 2.5, 3.0, 3.5, 4.0, 4.5, 5.0, 5.5, 6.0, 6.7, 7.0, 7.5, 8.0, 8.5, 9.0, 10, 11, 12, 13, 14, or 15 microliters/sec.

In various embodiments of microfluidic devices having sequestration pens, the volume of an isolation region (e.g., 240) of a sequestration pen can be, for example, at least $5\times10^5$, $8\times10^5$, $1\times10^6$, $2\times10^6$, $4\times10^6$, $6\times10^6$, $8\times10^6$, $1\times10^7$, $5\times10^7$, $1\times10^8$, $5\times10^8$, or $8\times10^8$ cubic microns, or more. In various embodiments of microfluidic devices having sequestration pens, the volume of a sequestration pen may be about $5\times10^5$, $6\times10^5$, $8\times10^5$, $1\times10^6$, $2\times10^6$, $4\times10^6$, $8\times10^6$, $1\times10^7$, $3\times10^7$, $5\times10^7$, or about $8\times10^7$ cubic microns, or more. In some other embodiments, the volume of a sequestration pen may be about 1 nanoliter to about 50 nanoliters, 2 nanoliters to about 25 nanoliters, 2 nanoliters to about 20 nanoliters, about 2 nanoliters to about 15 nanoliters, or about 2 nanoliters to about 10 nanoliters.

In various embodiment, the microfluidic device has sequestration pens configured as in any of the embodiments discussed herein where the microfluidic device has about 5 to about 10 sequestration pens, about 10 to about 50 sequestration pens, about 100 to about 500 sequestration pens; about 200 to about 1000 sequestration pens, about 500 to about 1500 sequestration pens, about 1000 to about 2000 sequestration pens, about 1000 to about 3500, or about 2500 to about 5000 sequestration pens. The sequestration pens need not all be the same size and may include a variety of configurations (e.g., different widths, different features within the sequestration pen).

Sequestration pens 424, 524, 526, 624, 626, 724, 824, 826, 828, 924, 1024, 1124, 1126, 1127, 1324 described below may have dimensions and properties like that of any of the sequestration pens 124, 126, 128, 130, 224, 226, 228, or 266 as described above, in any combination.

Figure 2G:
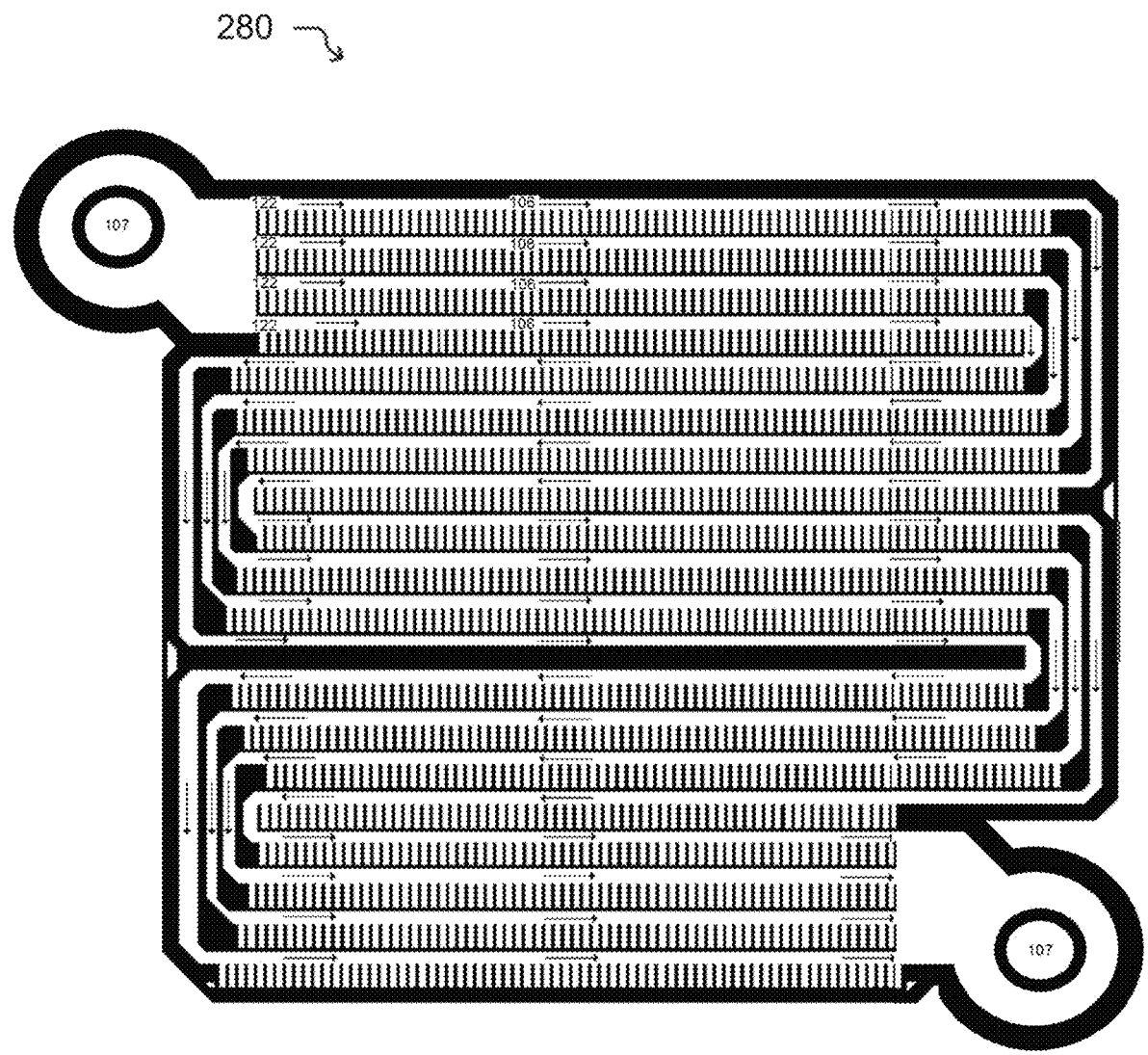
FIG. 2G illustrates a microfluidic device according to an embodiment of the disclosure.

FIG. 2G illustrates a microfluidic device 280 according to one embodiment. The microfluidic device 280 illustrated in FIG. 2G is a stylized diagram of a microfluidic device 100. In practice the microfluidic device 280 and its constituent circuit elements (e.g. channels 122 and sequestration pens 128) would have the dimensions discussed herein. The microfluidic circuit 120 illustrated in FIG. 2G has two ports 107, four distinct channels 122 and four distinct flow paths 106. The microfluidic device 280 further comprises a plurality of sequestration pens opening off of each channel 122. In the microfluidic device illustrated in FIG. 2G, the sequestration pens have a geometry similar to the pens illustrated in FIG. 2C and thus, have both connection regions and isolation regions. Accordingly, the microfluidic circuit 120 includes both swept regions (e g channels 122 and portions of the connection regions 236 within the maximum penetration depth $D_p$ of the secondary flow 244) and non-swept regions (e.g. isolation regions 240 and portions of the connection regions 236 not within the maximum penetration depth $D_p$ of the secondary flow 244).

Figure 3A:
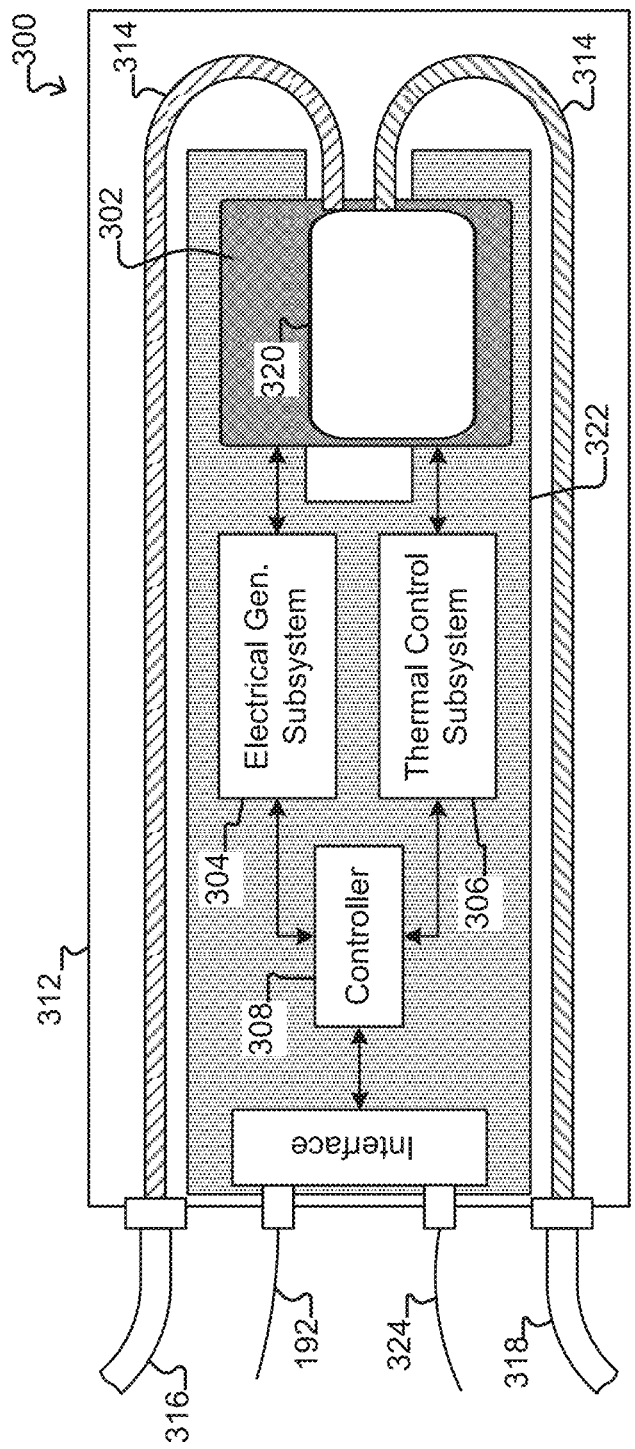
FIG. 3A illustrates a specific example of a system for use with a microfluidic device and associated control equipment according to some embodiments of the disclosure.
Figure 3B:
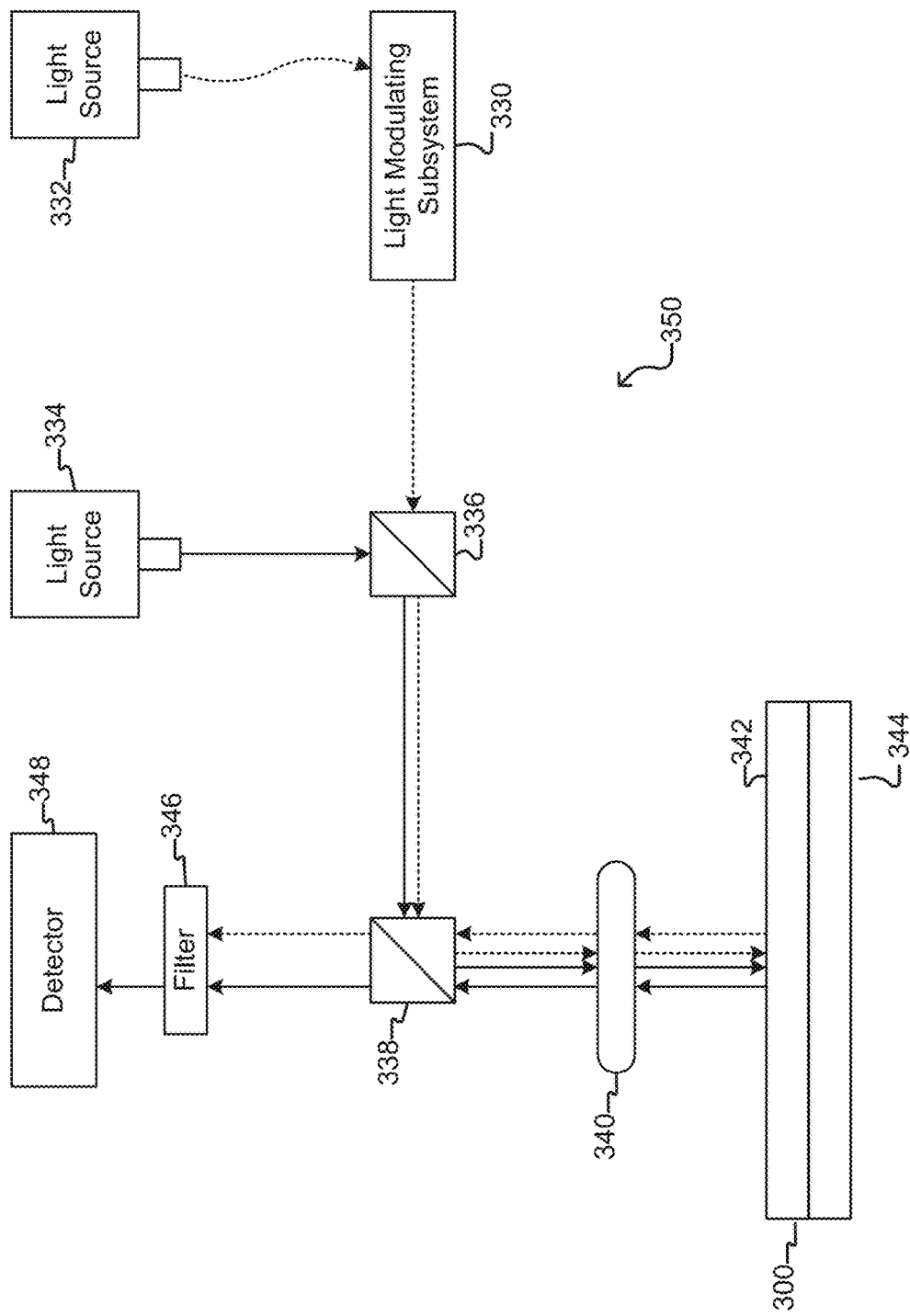
FIG. 3B illustrates an imaging device according to some embodiments of the disclosure.

FIGS. 3A through 3B shows various embodiments of system 150 which can be used to operate and observe microfluidic devices (e.g. 100, 200, 230, 250, 280, 290, 300) according to the present disclosure. As illustrated in FIG. 3A, the system 150 can include a structure ("nest") 300 configured to hold a microfluidic device 100 (not shown), or any other microfluidic device described herein. The nest 300 can include a socket 302 capable of interfacing with the microfluidic device 320 (e.g., an optically-actuated electrokinetic device 100) and providing electrical connections from power source 192 to microfluidic device 320. The nest 300 can further include an integrated electrical signal generation subsystem 304. The electrical signal generation subsystem 304 can be configured to supply a biasing voltage to socket 302 such that the biasing voltage is applied across a pair of electrodes in the microfluidic device 320 when it is being held by socket 302. Thus, the electrical signal generation subsystem 304 can be part of power source 192. The ability to apply a biasing voltage to microfluidic device 320 does not mean that a biasing voltage will be applied at all times when the microfluidic device 320 is held by the socket 302. Rather, in most cases, the biasing voltage will be applied intermittently, e.g., only as needed to facilitate the generation of electrokinetic forces, such as dielectrophoresis or electro-wetting, in the microfluidic device 320.

As illustrated in FIG. 3A, the nest 300 can include a printed circuit board assembly (PCBA) 322. The electrical signal generation subsystem 304 can be mounted on and electrically integrated into the PCBA 322. The exemplary support includes socket 302 mounted on PCBA 322, as well.

Typically, the electrical signal generation subsystem 304 will include a waveform generator (not shown). The electrical signal generation subsystem 304 can further include an oscilloscope (not shown) and/or a waveform amplification circuit (not shown) configured to amplify a waveform received from the waveform generator. The oscilloscope, if present, can be configured to measure the waveform supplied to the microfluidic device 320 held by the socket 302. In certain embodiments, the oscilloscope measures the waveform at a location proximal to the microfluidic device 320 (and distal to the waveform generator), thus ensuring greater accuracy in measuring the waveform actually applied to the device. Data obtained from the oscilloscope measurement can be, for example, provided as feedback to the waveform generator, and the waveform generator can be configured to adjust its output based on such feedback. An example of a suitable combined waveform generator and oscilloscope is the Red Pitaya™.

In certain embodiments, the nest 300 further comprises a controller 308, such as a microprocessor used to sense and/or control the electrical signal generation subsystem 304. Examples of suitable microprocessors include the Arduino™ microprocessors, such as the Arduino Nano™.

The controller 308 may be used to perform functions and analysis or may communicate with an external master controller 154 (shown in FIG. 1A) to perform functions and analysis. In the embodiment illustrated in FIG. 3A the controller 308 communicates with a master controller 154 through an interface 310 (e.g., a plug or connector).

In some embodiments, the nest 300 can comprise an electrical signal generation subsystem 304 comprising a Red Pitaya™ waveform generator/oscilloscope unit ("Red Pitaya unit") and a waveform amplification circuit that amplifies the waveform generated by the Red Pitaya unit and passes the amplified voltage to the microfluidic device 100. In some embodiments, the Red Pitaya unit is configured to measure the amplified voltage at the microfluidic device 320 and then adjust its own output voltage as needed such that the measured voltage at the microfluidic device 320 is the desired value. In some embodiments, the waveform amplification circuit can have a +6.5V to −6.5V power supply generated by a pair of DC-DC converters mounted on the PCBA 322, resulting in a signal of up to 13 Vpp at the microfluidic device 100.

As illustrated in FIG. 3A, the support structure 300 (e.g., nest) can further include a thermal control subsystem 306. The thermal control subsystem 306 can be configured to regulate the temperature of microfluidic device 320 held by the support structure 300. For example, the thermal control subsystem 306 can include a Peltier thermoelectric device (not shown) and a cooling unit (not shown). The Peltier thermoelectric device can have a first surface configured to interface with at least one surface of the microfluidic device 320. The cooling unit can be, for example, a cooling block (not shown), such as a liquid-cooled aluminum block. A second surface of the Peltier thermoelectric device (e.g., a surface opposite the first surface) can be configured to interface with a surface of such a cooling block. The cooling block can be connected to a fluidic path 314 configured to circulate cooled fluid through the cooling block. In the embodiment illustrated in FIG. 3A, the support structure 300 comprises an inlet 316 and an outlet 318 to receive cooled fluid from an external reservoir (not shown), introduce the cooled fluid into the fluidic path 314 and through the cooling block, and then return the cooled fluid to the external reservoir. In some embodiments, the Peltier thermoelectric device, the cooling unit, and/or the fluidic path 314 can be mounted on a casing 312 of the support structure 300. In some embodiments, the thermal control subsystem 306 is configured to regulate the temperature of the Peltier thermoelectric device so as to achieve a target temperature for the microfluidic device 320. Temperature regulation of the Peltier thermoelectric device can be achieved, for example, by a thermoelectric power supply, such as a Pololu™ thermoelectric power supply (Pololu Robotics and Electronics Corp.). The thermal control subsystem 306 can include a feedback circuit, such as a temperature value provided by an analog circuit. Alternatively, the feedback circuit can be provided by a digital circuit.

In some embodiments, the nest 300 can include a thermal control subsystem 306 with a feedback circuit that is an analog voltage divider circuit (not shown) which includes a resistor (e.g., with resistance 1 kOhm+/−0.1%, temperature coefficient+/−0.02 ppm/C0) and a NTC thermistor (e.g., with nominal resistance 1 kOhm+/−0.01%). In some instances, the thermal control subsystem 306 measures the voltage from the feedback circuit and then uses the calculated temperature value as input to an on-board PID control loop algorithm. Output from the PID control loop algorithm can drive, for example, both a directional and a pulse-widthmodulated signal pin on a Pololu™ motor drive (not shown) to actuate the thermoelectric power supply, thereby controlling the Peltier thermoelectric device.

The nest 300 can include a serial port 324 which allows the microprocessor of the controller 308 to communicate with an external master controller 154 via the interface 310 (not shown). In addition, the microprocessor of the controller 308 can communicate (e.g., via a Plink tool (not shown)) with the electrical signal generation subsystem 304 and thermal control subsystem 306. Thus, via the combination of the controller 308, the interface 310, and the serial port 324, the electrical signal generation subsystem 304 and the thermal control subsystem 306 can communicate with the external master controller 154. In this manner, the master controller 154 can, among other things, assist the electrical signal generation subsystem 304 by performing scaling calculations for output voltage adjustments. A Graphical User Interface (GUI) (not shown) provided via a display device 170 coupled to the external master controller 154, can be configured to plot temperature and waveform data obtained from the thermal control subsystem 306 and the electrical signal generation subsystem 304, respectively. Alternatively, or in addition, the GUI can allow for updates to the controller 308, the thermal control subsystem 306, and the electrical signal generation subsystem 304.

As discussed above, system 150 can include an imaging device 194. In some embodiments, the imaging device 194 comprises a light modulating subsystem 330 (See FIG. 3B). The light modulating subsystem 330 can include a digital mirror device (DMD) or a microshutter array system (MSA), either of which can be configured to receive light from a light source 332 and transmits a subset of the received light into an optical train of microscope 350. Alternatively, the light modulating subsystem 330 can include a device that produces its own light (and thus dispenses with the need for a light source 332), such as an organic light emitting diode display (OLED), a liquid crystal on silicon (LCOS) device, a ferroelectric liquid crystal on silicon device (FLCOS), or a transmissive liquid crystal display (LCD). The light modulating subsystem 330 can be, for example, a projector. Thus, the light modulating subsystem 330 can be capable of emitting both structured and unstructured light. In certain embodiments, imaging module 164 and/or motive module 162 of system 150 can control the light modulating subsystem 330.

In certain embodiments, the imaging device 194 further comprises a microscope 350. In such embodiments, the nest 300 and light modulating subsystem 330 can be individually configured to be mounted on the microscope 350. The microscope 350 can be, for example, a standard research-grade light microscope or fluorescence microscope. Thus, the nest 300 can be configured to be mounted on the stage 344 of the microscope 350 and/or the light modulating subsystem 330 can be configured to mount on a port of microscope 350. In other embodiments, the nest 300 and the light modulating subsystem 330 described herein can be integral components of microscope 350.

In certain embodiments, the microscope 350 can further include one or more detectors 348. In some embodiments, the detector 348 is controlled by the imaging module 164. The detector 348 can include an eye piece, a charge-coupled device (CCD), a camera (e.g., a digital camera), or any combination thereof. If at least two detectors 348 are present, one detector can be, for example, a fast-frame-rate camera while the other detector can be a high sensitivity camera. Furthermore, the microscope 350 can include an optical train configured to receive reflected and/or emitted light from the microfluidic device 320 and focus at least a portion of the reflected and/or emitted light on the one or more detectors 348. The optical train of the microscope can also include different tube lenses (not shown) for the different detectors, such that the final magnification on each detector can be different.

In certain embodiments, imaging device 194 is configured to use at least two light sources. For example, a first light source 332 can be used to produce structured light (e.g., via the light modulating subsystem 330) and a second light source 334 can be used to provide unstructured light. The first light source 332 can produce structured light for optically-actuated electrokinesis and/or fluorescent excitation, and the second light source 334 can be used to provide bright field illumination. In these embodiments, the motive module 164 can be used to control the first light source 332 and the imaging module 164 can be used to control the second light source 334. The optical train of the microscope 350 can be configured to (1) receive structured light from the light modulating subsystem 330 and focus the structured light on at least a first region in a microfluidic device, such as an optically-actuated electrokinetic device, when the device is being held by the nest 300, and (2) receive reflected and/or emitted light from the microfluidic device and focus at least a portion of such reflected and/or emitted light onto detector 348. The optical train can be further configured to receive unstructured light from a second light source and focus the unstructured light on at least a second region of the microfluidic device, when the device is held by the nest 300. In certain embodiments, the first and second regions of the microfluidic device can be overlapping regions. For example, the first region can be a subset of the second region. In other embodiments, the second light source 334 may additionally or alternatively include a laser, which may have any suitable wavelength of light. The representation of the optical system shown in FIG. 3B is a schematic representation only, and the optical system may include additional filters, notch filters, lenses and the like. When the second light source 334 includes one or more light source(s) for brightfield and/or fluorescent excitation, as well as laser illumination the physical arrangement of the light source(s) may vary from that shown in FIG. 3B, and the laser illumination may be introduced at any suitable physical location within the optical system. The schematic locations of light source 334 and light source 332/light modulating subsystem 330 may be interchanged as well.

In FIG. 3B, the first light source 332 is shown supplying light to a light modulating subsystem 330, which provides structured light to the optical train of the microscope 350 of system 355 (not shown). The second light source 334 is shown providing unstructured light to the optical train via a beam splitter 336. Structured light from the light modulating subsystem 330 and unstructured light from the second light source 334 travel from the beam splitter 336 through the optical train together to reach a second beam splitter (or dichroic filter 338, depending on the light provided by the light modulating subsystem 330), where the light gets reflected down through the objective 336 to the sample plane 342. Reflected and/or emitted light from the sample plane 342 then travels back up through the objective 340, through the beam splitter and/or dichroic filter 338, and to a dichroic filter 346. Only a fraction of the light reaching dichroic filter 346 passes through and reaches the detector 348.

In some embodiments, the second light source 334 emits blue light. With an appropriate dichroic filter 346, blue light reflected from the sample plane 342 is able to pass through dichroic filter 346 and reach the detector 348. In contrast, structured light coming from the light modulating subsystem 330 gets reflected from the sample plane 342, but does not pass through the dichroic filter 346. In this example, the dichroic filter 346 is filtering out visible light having a wavelength longer than 495 nm. Such filtering out of the light from the light modulating subsystem 330 would only be complete (as shown) if the light emitted from the light modulating subsystem did not include any wavelengths shorter than 495 nm. In practice, if the light coming from the light modulating subsystem 330 includes wavelengths shorter than 495 nm (e.g., blue wavelengths), then some of the light from the light modulating subsystem would pass through filter 346 to reach the detector 348. In such an embodiment, the filter 346 acts to change the balance between the amount of light that reaches the detector 348 from the first light source 332 and the second light source 334. This can be beneficial if the first light source 332 is significantly stronger than the second light source 334. In other embodiments, the second light source 334 can emit red light, and the dichroic filter 346 can filter out visible light other than red light (e.g., visible light having a wavelength shorter than 650 nm).

Figure 3C:
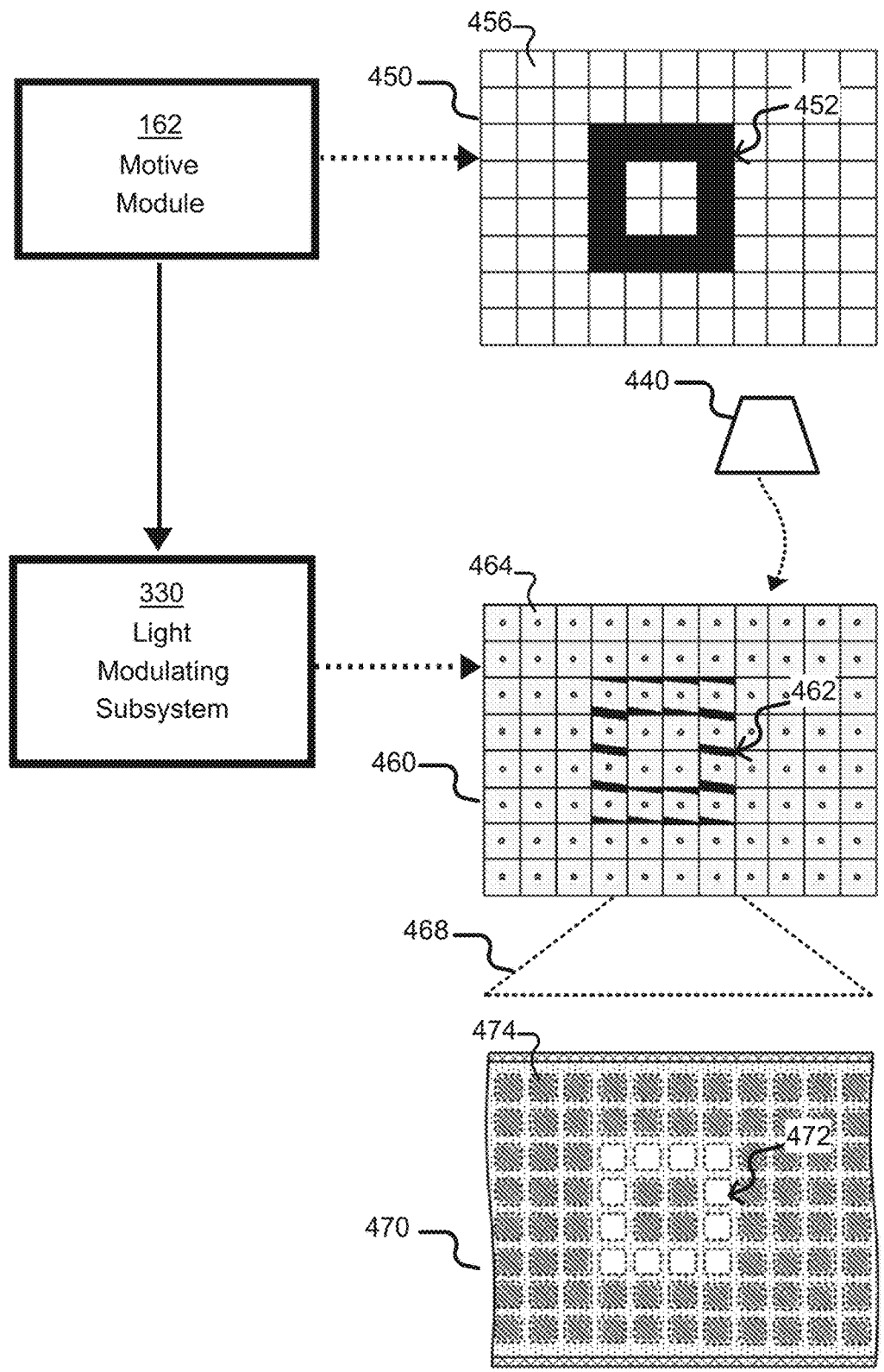
FIG. 3C illustrates the communications between an imaging module and a light modulating subsystem to project patterns of light according to some embodiments of the disclosure.

FIG. 3C illustrates communications between the motive module 162 and the light modulating subsystem 330 to project patterns of light on a microfluidic device according to a specific embodiment of the disclosure. As discussed above with respect to FIG. 3B, the light modulating subsystem 330 may comprise an electrically-addressed spatial light modulator and/or an optically-addressed spatial light modulator. Electrically-addressed spatial light modulators comprise an array of individually-addressable spatial light modulators that are controlled by electrodes. In FIG. 3C, the light modulating subsystem 330 is a Digital Mirror Device (DMD) 460 comprising an array of individually-addressable micro-mirrors 464 that are controlled by one or more electrodes. However, in other embodiments, the light modulating subsystem 330 can be a Liquid Crystal on Silicon (LCoS) device comprising an array of individually-addressable electrodes that correspond to pixels in a liquid crystal display.

In the embodiment illustrated in FIG. 3C, the light modulating subsystem 330 uses a separate light source 440 to receive and modulate light. However, in other embodiments, the light modulating subsystem 330 comprises its own light source.

As illustrated in FIG. 3C, the motive module 162 transmits information 450 specifying a specific light pattern ("pattern information") to the light modulating subsystem 330. In some embodiments, the pattern information 450 can comprise a bitmap (or similar pixel-based data structure), vector data, or any combination thereof. For purposes of illustration, the pattern information 450 in FIG. 3C is illustrated as a bitmap comprising an array of pixels 456 and including a square pattern 452 of pixels. Depending on the embodiment, the pattern information 450 can be binary (i.e. specify whether or not to project a pattern of light) or contain values indicating an intensity of light to project. In instances where the spatial light modulators are micro-mirrors 464, the micro-mirrors 464 may create different intensities of light by rapidly switching the mirrors between an "on" and "off" state (i.e. "dithering" the micro-mirrors).

The light modulating subsystem 330 receives the pattern information 450 from the motive module 162 and uses the pattern information 450 to direct the projection of a light pattern 468 onto DEP electrode regions 474 on the microfluidic device 470. In the embodiment illustrated in FIG. 3C, a DMD 460 rotates a plurality 462 of individually-addressable micro-mirrors 464 corresponding to the square pattern information 450 into an "on state." The square pattern of individual-addressable micro-mirrors 462 modulates the light from the light source 440 to project a light pattern 468 onto the microfluidic device 470 that illuminates a square pattern of DEP electrode regions 472 in the array of DEP electrode regions 474 in the microfluidic device 470.

In some embodiments, there is a one-to-one correspondence between the array of individually-addressable spatial light modulating elements 464 that project light onto the microfluidic device 470 and the array of DEP electrode regions 474 in the microfluidic device 470. In this way, each individually-addressable spatial light modulating element 464 can project light to generate light-actuated DEP force at a corresponding DEP electrode region 474. In these embodiments, the motive module 162 can send pattern information 450 to the light modulating subsystem 330 that specifies the DEP electrode regions 474 to project light onto. For example, instead of sending bitmap and or vector data to the light modulating subsystem 330, the motive module 162 can communicate directly with the individually-addressable spatial light modulators to control which of the DEP electrode regions 474 are illuminated on the microfluidic device 470. Once illuminated the DEP electrode regions 474 may exert OET or OEW force on surrounding micro-objects.

As discussed above, in some embodiments, the spatial light modulating elements 464 can receive pattern information 450 specifying an intensity of light to project. In a specific embodiment, the pattern information 450 may specify a gradation of light to project over adjacent DEP electrode regions 474 in the microfluidic device. In some embodiments, the pattern information 450 may specify a gradation of light that decreases in intensity over adjacent DEP electrode regions 474. For example, the pattern information 450 may specify that about 100% of the maximum light intensity is to be projected at a first DEP electrode region 474, that 70% of the maximum light intensity is to be projected at a second DEP electrode region 474 adjacent to the first DEP electrode region 474, and that 10% of the maximum light intensity is to be projected at a third DEP electrode region 474 adjacent to the second DEP electrode region 474. Various combinations of light intensities may be used to project a gradation over various numbers of DEP electrode regions 474 (e.g. any decreasing combination of about 100%, about 90%, about 80%, about 70%, about 60%, about 50%, about 40%, about 30%, about 20%, and about 10%, and any values therebetween, of the maximum light intensity over any number of DEP electrode regions 474). Similarly, the pattern information 450 may specify a gradation of light that increases in intensity over any number of DEP electrode regions 474 or a gradation of light that both increases and decreases in intensity over any number of DEP electrode regions 474.

Coating solutions and coating agents. Without intending to be limited by theory, maintenance of a biological micro-object (e.g., a biological cell) within a microfluidic device (e.g., a DEP-configured and/or EW-configured microfluidic device) may be facilitated (i.e., the biological micro-object exhibits increased viability, greater expansion and/or greater portability within the microfluidic device) when at least one or more inner surfaces of the microfluidic device have been conditioned or coated so as to present a layer of organic and/or hydrophilic molecules that provides the primary interface between the microfluidic device and biological micro-object(s) maintained therein. In some embodiments, one or more of the inner surfaces of the microfluidic device (e.g. the inner surface of the electrode activation substrate of a DEP-configured microfluidic device, the cover of the microfluidic device, and/or the surfaces of the circuit material) may be treated with or modified by a coating solution and/or coating agent to generate the desired layer of organic and/or hydrophilic molecules.

The coating may be applied before or after introduction of biological micro-object(s), or may be introduced concurrently with the biological micro-object(s). In some embodiments, the biological micro-object(s) may be imported into the microfluidic device in a fluidic medium that includes one or more coating agents. In other embodiments, the inner surface(s) of the microfluidic device (e.g., a DEP-configured microfluidic device) are treated or "primed" with a coating solution comprising a coating agent prior to introduction of the biological micro-object(s) into the microfluidic device.

In some embodiments, at least one surface of the microfluidic device includes a coating material that provides a layer of organic and/or hydrophilic molecules suitable for maintenance and/or expansion of biological micro-object(s) (e.g. provides a conditioned surface as described below). In some embodiments, substantially all the inner surfaces of the microfluidic device include the coating material. The coated inner surface(s) may include the surface of a flow region (e.g., channel), chamber, or sequestration pen, or a combination thereof. In some embodiments, each of a plurality of sequestration pens has at least one inner surface coated with coating materials. In other embodiments, each of a plurality of flow regions or channels has at least one inner surface coated with coating materials. In some embodiments, at least one inner surface of each of a plurality of sequestration pens and each of a plurality of channels is coated with coating materials.

Coating agent/Solution. Any convenient coating agent/coating solution can be used, including but not limited to: serum or serum factors, bovine serum albumin (BSA), polymers, detergents, enzymes, and any combination thereof.

Polymer-based coating materials. The at least one inner surface may include a coating material that comprises a polymer. The polymer may be covalently or non-covalently bound (or may be non-specifically adhered) to the at least one surface. The polymer may have a variety of structural motifs, such as found in block polymers (and copolymers), star polymers (star copolymers), and graft or comb polymers (graft copolymers), all of which may be suitable for the methods disclosed herein.

The polymer may include a polymer including alkylene ether moieties. A wide variety of alkylene ether containing polymers may be suitable for use in the microfluidic devices described herein. One non-limiting exemplary class of alkylene ether containing polymers are amphiphilic nonionic block copolymers which include blocks of polyethylene oxide (PEO) and polypropylene oxide (PPO) subunits in differing ratios and locations within the polymer chain. Pluronic® polymers (BASF) are block copolymers of this type and are known in the art to be suitable for use when in contact with living cells. The polymers may range in average molecular mass $M_w$ from about 2000 Da to about 20 KDa. In some embodiments, the PEO-PPO block copolymer can have a hydrophilic-lipophilic balance (HLB) greater than about 10 (e.g. 12-18). Specific Pluronic® polymers useful for yielding a coated surface include Pluronic® L44, L64, P85, and F127 (including F127NF). Another class of alkylene ether containing polymers is polyethylene glycol (PEG $M_w$<100,000 Da) or alternatively polyethylene oxide (PEO, $M_w$>100,000). In some embodiments, a PEG may have an $M_w$ of about 1000 Da, 5000 Da, 10,000 Da or 20,000 Da.

In other embodiments, the coating material may include a polymer containing carboxylic acid moieties. The carboxylic acid subunit may be an alkyl, alkenyl or aromatic moiety containing subunit. One non-limiting example is polylactic acid (PLA). In other embodiments, the coating material may include a polymer containing phosphate moieties, either at a terminus of the polymer backbone or pendant from the backbone of the polymer. In yet other embodiments, the coating material may include a polymer containing sulfonic acid moieties. The sulfonic acid subunit may be an alkyl, alkenyl or aromatic moiety containing subunit. One non-limiting example is polystyrene sulfonic acid (PSSA) or polyanethole sulfonic acid. In further embodiments, the coating material may include a polymer including amine moieties. The polyamino polymer may include a natural polyamine polymer or a synthetic polyamine polymer. Examples of natural polyamines include spermine, spermidine, and putrescine.

In other embodiments, the coating material may include a polymer containing saccharide moieties. In a non-limiting example, polysaccharides such as xanthan gum or dextran may be suitable to form a material which may reduce or prevent cell sticking in the microfluidic device. For example, a dextran polymer having a size about 3 kDa may be used to provide a coating material for a surface within a microfluidic device.

In other embodiments, the coating material may include a polymer containing nucleotide moieties, i.e. a nucleic acid, which may have ribonucleotide moieties or deoxyribonucleotide moieties, providing a polyelectrolyte surface. The nucleic acid may contain only natural nucleotide moieties or may contain unnatural nucleotide moieties which comprise nucleobase, ribose or phosphate moiety analogs such as 7-deazaadenine, pentose, methyl phosphonate or phosphorothioate moieties without limitation.

In yet other embodiments, the coating material may include a polymer containing amino acid moieties. The polymer containing amino acid moieties may include a natural amino acid containing polymer or an unnatural amino acid containing polymer, either of which may include a peptide, a polypeptide or a protein. In one non-limiting example, the protein may be bovine serum albumin (BSA) and/or serum (or a combination of multiple different sera) comprising albumin and/or one or more other similar proteins as coating agents. The serum can be from any convenient source, including but not limited to fetal calf serum, sheep serum, goat serum, horse serum, and the like. In certain embodiments, BSA in a coating solution is present in a concentration from about 1 mg/mL to about 100 mg/mL, including 5 mg/mL, 10 mg/mL, 20 mg/mL, 30 mg/mL, 40 mg/mL, 50 mg/mL, 60 mg/mL, 70 mg/mL, 80 mg/mL, 90 mg/mL, or more or anywhere in between. In certain embodiments, serum in a coating solution may be present in a concentration of about 20% (v/v) to about 50% v/v, including 25%, 30%, 35%, 40%, 45%, or more or anywhere in between. In some embodiments, BSA may be present as a coating agent in a coating solution at 5 mg/mL, whereas in other embodiments, BSA may be present as a coating agent in a coating solution at 70 mg/mL. In certain embodiments, serum is present as a coating agent in a coating solution at 30%. In some embodiments, an extracellular matrix (ECM) protein may be provided within the coating material for optimized cell adhesion to foster cell growth. A cell matrix protein, which may be included in a coating material, can include, but is not limited to, a collagen, an elastin, an RGD-containing peptide (e.g. a fibronectin), or a laminin. In yet other embodiments, growth factors, cytokines, hormones or other cell signaling species may be provided within the coating material of the microfluidic device.

In some embodiments, the coating material may include a polymer containing more than one of alkylene oxide moieties, carboxylic acid moieties, sulfonic acid moieties, phosphate moieties, saccharide moieties, nucleotide moieties, or amino acid moieties. In other embodiments, the polymer conditioned surface may include a mixture of more than one polymer each having alkylene oxide moieties, carboxylic acid moieties, sulfonic acid moieties, phosphate moieties, saccharide moieties, nucleotide moieties, and/or amino acid moieties, which may be independently or simultaneously incorporated into the coating material.

Covalently linked coating materials. In some embodiments, the at least one inner surface includes covalently linked molecules that provide a layer of organic and/or hydrophilic molecules suitable for maintenance/expansion of biological micro-object(s) within the microfluidic device, providing a conditioned surface for such cells.

The covalently linked molecules include a linking group, wherein the linking group is covalently linked to one or more surfaces of the microfluidic device, as described below. The linking group is also covalently linked to a moiety configured to provide a layer of organic and/or hydrophilic molecules suitable for maintenance/expansion of biological micro-object(s).

In some embodiments, the covalently linked moiety configured to provide a layer of organic and/or hydrophilic molecules suitable for maintenance/expansion of biological micro-object(s) may include alkyl or fluoroalkyl (which includes perfluoroalkyl) moieties; mono- or polysaccharides (which may include but is not limited to dextran); alcohols (including but not limited to propargyl alcohol); polyalcohols, including but not limited to polyvinyl alcohol; alkylene ethers, including but not limited to polyethylene glycol; polyelectrolytes (including but not limited to polyacrylic acid or polyvinyl phosphonic acid); amino groups (including derivatives thereof, such as, but not limited to alkylated amines, hydroxyalkylated amino group, guanidinium, and heterocylic groups containing an unaromatized nitrogen ring atom, such as, but not limited to morpholinyl or piperazinyl); carboxylic acids including but not limited to propiolic acid (which may provide a carboxylate anionic surface); phosphonic acids, including but not limited to ethynyl phosphonic acid (which may provide a phosphonate anionic surface); sulfonate anions; carboxybetaines; sulfobetaines; sulfamic acids; or amino acids.

In various embodiments, the covalently linked moiety configured to provide a layer of organic and/or hydrophilic molecules suitable for maintenance/expansion of biological micro-object(s) in the microfluidic device may include non-polymeric moieties such as an alkyl moiety, a substituted alkyl moiety, such as a fluoroalkyl moiety (including but not limited to a perfluoroalkyl moiety), amino acid moiety, alcohol moiety, amino moiety, carboxylic acid moiety, phosphonic acid moiety, sulfonic acid moiety, sulfamic acid moiety, or saccharide moiety. Alternatively, the covalently linked moiety may include polymeric moieties, which may be any of the moieties described above.

In some embodiments, the covalently linked alkyl moiety may comprises carbon atoms forming a linear chain (e.g., a linear chain of at least 10 carbons, or at least 14, 16, 18, 20, 22, or more carbons) and may be an unbranched alkyl moiety. In some embodiments, the alkyl group may include a substituted alkyl group (e.g., some of the carbons in the alkyl group can be fluorinated or perfluorinated). In some embodiments, the alkyl group may include a first segment, which may include a perfluoroalkyl group, joined to a second segment, which may include a non-substituted alkyl group, where the first and second segments may be joined directly or indirectly (e.g., by means of an ether linkage). The first segment of the alkyl group may be located distal to the linking group, and the second segment of the alkyl group may be located proximal to the linking group.

In other embodiments, the covalently linked moiety may include at least one amino acid, which may include more than one type of amino acid. Thus, the covalently linked moiety may include a peptide or a protein. In some embodiments, the covalently linked moiety may include an amino acid which may provide a zwitterionic surface to support cell growth, viability, portability, or any combination thereof.

In other embodiments, the covalently linked moiety may include at least one alkylene oxide moiety, and may include any alkylene oxide polymer as described above. One useful class of alkylene ether containing polymers is polyethylene glycol (PEG $M_w$<100,000 Da) or alternatively polyethylene oxide (PEO, $M_w$>100,000). In some embodiments, a PEG may have an $M_w$ of about 1000 Da, 5000 Da, 10,000 Da or 20,000 Da.

The covalently linked moiety may include one or more saccharides. The covalently linked saccharides may be mono-, di-, or polysaccharides. The covalently linked saccharides may be modified to introduce a reactive pairing moiety which permits coupling or elaboration for attachment to the surface. Exemplary reactive pairing moieties may include aldehyde, alkyne or halo moieties. A polysaccharide may be modified in a random fashion, wherein each of the saccharide monomers may be modified or only a portion of the saccharide monomers within the polysaccharide are modified to provide a reactive pairing moiety that may be coupled directly or indirectly to a surface. One exemplar may include a dextran polysaccharide, which may be coupled indirectly to a surface via an unbranched linker.

The covalently linked moiety may include one or more amino groups. The amino group may be a substituted amine moiety, guanidine moiety, nitrogen-containing heterocyclic moiety or heteroaryl moiety. The amino containing moieties may have structures permitting pH modification of the environment within the microfluidic device, and optionally, within the sequestration pens and/or flow regions (e.g., channels).

The coating material providing a conditioned surface may comprise only one kind of covalently linked moiety or may include more than one different kind of covalently linked moiety. For example, the fluoroalkyl conditioned surfaces (including perfluoroalkyl) may have a plurality of covalently linked moieties which are all the same, e.g., having the same linking group and covalent attachment to the surface, the same overall length, and the same number of fluoromethylene units comprising the fluoroalkyl moiety. Alternatively, the coating material may have more than one kind of covalently linked moiety attached to the surface. For example, the coating material may include molecules having covalently linked alkyl or fluoroalkyl moieties having a specified number of methylene or fluoromethylene units and may further include a further set of molecules having charged moieties covalently attached to an alkyl or fluoroalkyl chain having a greater number of methylene or fluoromethylene units, which may provide capacity to present bulkier moieties at the coated surface. In this instance, the first set of molecules having different, less sterically demanding termini and fewer backbone atoms can help to functionalize the entire substrate surface and thereby prevent undesired adhesion or contact with the silicon/silicon oxide, hafnium oxide or alumina making up the substrate itself. In another example, the covalently linked moieties may provide a zwitterionic surface presenting alternating charges in a random fashion on the surface.

Conditioned surface properties. Aside from the composition of the conditioned surface, other factors such as physical thickness of the hydrophobic material can impact DEP force. Various factors can alter the physical thickness of the conditioned surface, such as the manner in which the conditioned surface is formed on the substrate (e.g. vapor deposition, liquid phase deposition, spin coating, flooding, and electrostatic coating). In some embodiments, the conditioned surface has a thickness in the range of about 1 nm to about 10 nm; about 1 nm to about 7 nm; about 1 nm to about 5 nm; or any individual value therebetween. In other embodiments, the conditioned surface formed by the covalently linked moieties may have a thickness of about 10 nm to about 50 nm. In various embodiments, the conditioned surface prepared as described herein has a thickness of less than 10 nm. In some embodiments, the covalently linked moieties of the conditioned surface may form a monolayer when covalently linked to the surface of the microfluidic device (e.g., a DEP configured substrate surface) and may have a thickness of less than 10 nm (e.g., less than 5 nm, or about 1.5 to 3.0 nm). These values are in contrast to that of a surface prepared by spin coating, for example, which may typically have a thickness in the range of about 30 nm. In some embodiments, the conditioned surface does not require a perfectly formed monolayer to be suitably functional for operation within a DEP-configured microfluidic device.

In various embodiments, the coating material providing a conditioned surface of the microfluidic device may provide desirable electrical properties. Without intending to be limited by theory, one factor that impacts robustness of a surface coated with a particular coating material is intrinsic charge trapping. Different coating materials may trap electrons, which can lead to breakdown of the coating material. Defects in the coating material may increase charge trapping and lead to further breakdown of the coating material. Similarly, different coating materials have different dielectric strengths (i.e. the minimum applied electric field that results in dielectric breakdown), which may impact charge trapping. In certain embodiments, the coating material can have an overall structure (e.g., a densely-packed monolayer structure) that reduces or limits that amount of charge trapping.

In addition to its electrical properties, the conditioned surface may also have properties that are beneficial in use with biological molecules. For example, a conditioned surface that contains fluorinated (or perfluorinated) carbon chains may provide a benefit relative to alkyl-terminated chains in reducing the amount of surface fouling. Surface fouling, as used herein, refers to the amount of indiscriminate material deposition on the surface of the microfluidic device, which may include permanent or semi-permanent deposition of biomaterials such as protein and its degradation products, nucleic acids and respective degradation products and the like.

Unitary or Multi-part conditioned surface. The covalently linked coating material may be formed by reaction of a molecule which already contains the moiety configured to provide a layer of organic and/or hydrophilic molecules suitable for maintenance/expansion of biological micro-object(s) in the microfluidic device, as is described below. Alternatively, the covalently linked coating material may be formed in a two-part sequence by coupling the moiety configured to provide a layer of organic and/or hydrophilic molecules suitable for maintenance/expansion of biological micro-object(s) to a surface modifying ligand that itself has been covalently linked to the surface.

Methods of preparing a covalently linked coating material. In some embodiments, a coating material that is covalently linked to the surface of a microfluidic device (e.g., including at least one surface of the sequestration pens and/or flow regions) has a structure of Formula 1 or Formula 2. When the coating material is introduced to the surface in one step, it has a structure of Formula 1, while when the coating material is introduced in a multiple step process, it has a structure of Formula 2.

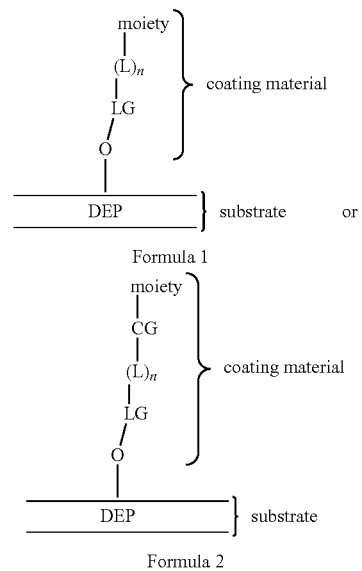

Formula 1

Formula 2

The coating material may be linked covalently to oxides of the surface of a DEP-configured or EW-configured substrate. The DEP- or EW-configured substrate may comprise silicon, silicon oxide, alumina, or hafnium oxide. Oxides may be present as part of the native chemical structure of the substrate or may be introduced as discussed below.

The coating material may be attached to the oxides via a linking group ("LG"), which may be a siloxy or phosphonate ester group formed from the reaction of a siloxane or phosphonic acid group with the oxides. The moiety configured to provide a layer of organic and/or hydrophilic molecules suitable for maintenance/expansion of biological micro-object(s) in the microfluidic device can be any of the moieties described herein. The linking group LG may be directly or indirectly connected to the moiety configured to provide a layer of organic and/or hydrophilic molecules suitable for maintenance/expansion of biological micro-object(s) in the microfluidic device. When the linking group LG is directly connected to the moiety, optional linker ("L") is not present and n is 0. When the linking group LG is indirectly connected to the moiety, linker L is present and n is 1. The linker L may have a linear portion where a backbone of the linear portion may include 1 to 200 non-hydrogen atoms selected from any combination of silicon, carbon, nitrogen, oxygen, sulfur and phosphorus atoms, subject to chemical bonding limitations as is known in the art. It may be interrupted with any combination of one or more moieties, which may be chosen from ether, amino, carbonyl, amido, or phosphonate groups, arylene, heteroarylene, or heterocyclic groups. In some embodiments, the backbone of the linker L may include 10 to 20 atoms. In other embodiments, the backbone of the linker L may include about 5 atoms to about 200 atoms; about 10 atoms to about 80 atoms; about 10 atoms to about 50 atoms; or about 10 atoms to about 40 atoms. In some embodiments, the backbone atoms are all carbon atoms.

In some embodiments, the moiety configured to provide a layer of organic and/or hydrophilic molecules suitable for maintenance/expansion of biological micro-object(s) may be added to the surface of the substrate in a multi-step process, and has a structure of Formula 2, as shown above. The moiety may be any of the moieties described above.

In some embodiments, the coupling group CG represents the resultant group from reaction of a reactive moiety $R_x$ and a reactive pairing moiety $R_{px}$ (i.e., a moiety configured to react with the reactive moiety $R_x$). For example, one typical coupling group CG may include a carboxamidyl group, which is the result of the reaction of an amino group with a derivative of a carboxylic acid, such as an activated ester, an acid chloride or the like. Other CG may include a triazolylene group, a carboxamidyl, thioamidyl, an oxime, a mercaptyl, a disulfide, an ether, or alkenyl group, or any other suitable group that may be formed upon reaction of a reactive moiety with its respective reactive pairing moiety. The coupling group CG may be located at the second end (i.e., the end proximal to the moiety configured to provide a layer of organic and/or hydrophilic molecules suitable for maintenance/expansion of biological micro-object(s) in the microfluidic device) of linker L, which may include any combination of elements as described above. In some other embodiments, the coupling group CG may interrupt the backbone of the linker L. When the coupling group CG is triazolylene, it may be the product resulting from a Click coupling reaction and may be further substituted (e.g., a dibenzocylcooctenyl fused triazolylene group).

In some embodiments, the coating material (or surface modifying ligand) is deposited on the inner surfaces of the microfluidic device using chemical vapor deposition. The vapor deposition process can be optionally improved, for example, by pre-cleaning the cover 110, the microfluidic circuit material 116, and/or the substrate (e.g., the inner surface 208 of the electrode activation substrate 206 of a DEP-configured substrate, or a dielectric layer of the support structure 104 of an EW-configured substrate), by exposure to a solvent bath, sonication or a combination thereof. Alternatively, or in addition, such pre-cleaning can include treating the cover 110, the microfluidic circuit material 116, and/or the substrate in an oxygen plasma cleaner, which can remove various impurities, while at the same time introducing an oxidized surface (e.g. oxides at the surface, which may be covalently modified as described herein). Alternatively, liquid-phase treatments, such as a mixture of hydrochloric acid and hydrogen peroxide or a mixture of sulfuric acid and hydrogen peroxide (e.g., piranha solution, which may have a ratio of sulfuric acid to hydrogen peroxide from about 3:1 to about 7:1) may be used in place of an oxygen plasma cleaner.

In some embodiments, vapor deposition is used to coat the inner surfaces of the microfluidic device 200 after the microfluidic device 200 has been assembled to form an enclosure 102 defining a microfluidic circuit 120. Without intending to be limited by theory, depositing such a coating material on a fully-assembled microfluidic circuit 120 may be beneficial in preventing delamination caused by a weakened bond between the microfluidic circuit material 116 and the electrode activation substrate 206 dielectric layer and/or the cover 110. In embodiments where a two-step process is employed the surface modifying ligand may be introduced via vapor deposition as described above, with subsequent introduction of the moiety configured provide a layer of organic and/or hydrophilic molecules suitable for maintenance/expansion of biological micro-object(s). The subsequent reaction may be performed by exposing the surface modified microfluidic device to a suitable coupling reagent in solution.

Figure 2H:
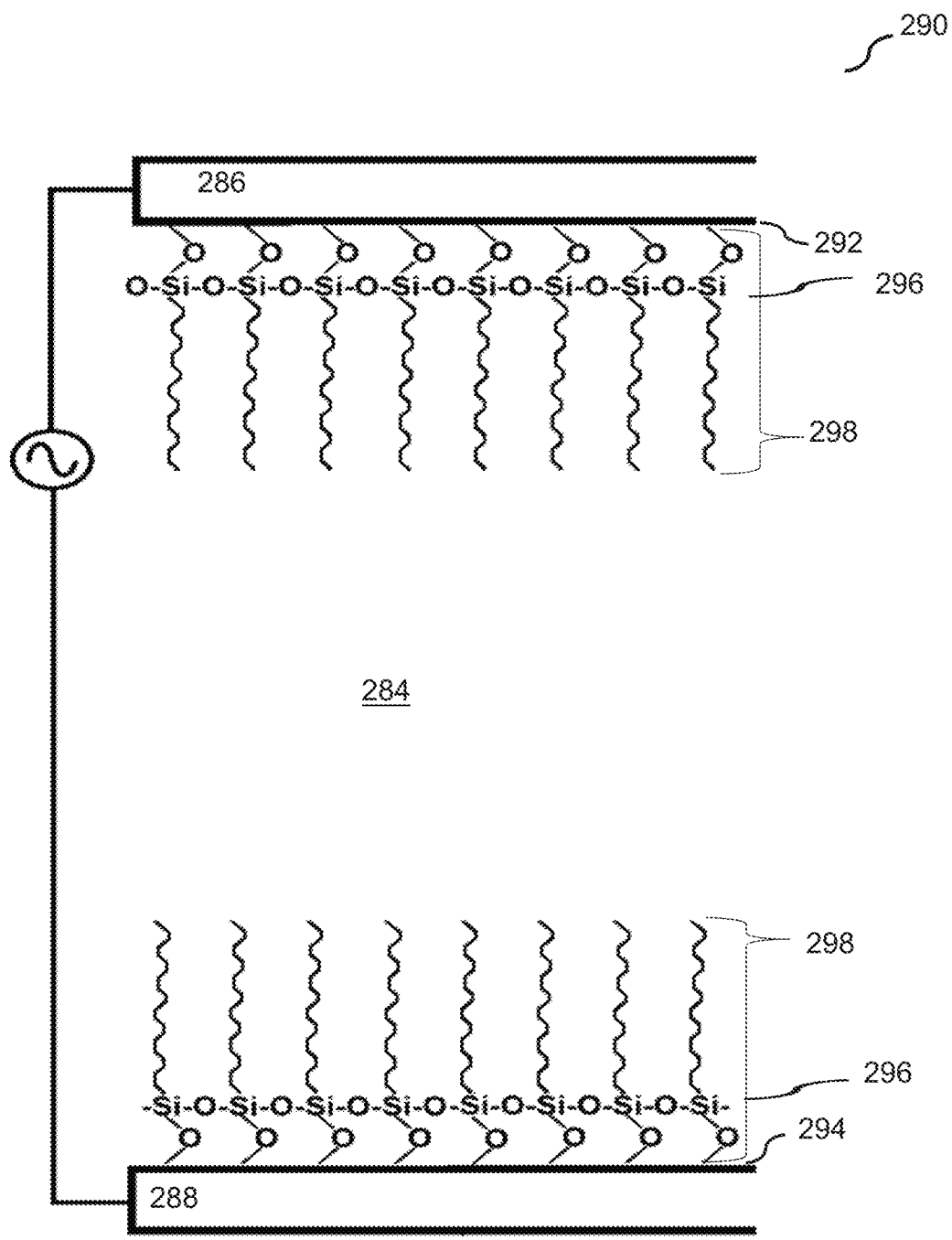
FIG. 2H illustrates a coated surface of the microfluidic device according to an embodiment of the disclosure.

FIG. 2H depicts a cross-sectional view of a microfluidic device 290 having an exemplary covalently linked coating material providing a conditioned surface. As illustrated, the coating materials 298 (shown schematically) can comprise a monolayer of densely-packed molecules covalently bound to both the inner surface 294 of a base 286, which may be a DEP substrate, and the inner surface 292 of a cover 288 of the microfluidic device 290. The coating material 298 can be disposed on substantially all inner surfaces 294, 292 proximal to, and facing inwards towards, the enclosure 284 of the microfluidic device 290, including, in some embodiments and as discussed above, the surfaces of microfluidic circuit material (not shown) used to define circuit elements and/or structures within the microfluidic device 290. In alternate embodiments, the coating material 298 can be disposed on only one or some of the inner surfaces of the microfluidic device 290.

In the embodiment shown in FIG. 2H, the coating material 298 can include a monolayer of organosiloxane molecules, each molecule covalently bonded to the inner surfaces 292, 294 of the microfluidic device 290 via a siloxy linker 296. Any of the above-discussed coating materials 298 can be used (e.g. an alkyl-terminated, a fluoroalkyl terminated moiety, a PEG-terminated moiety, a dextran terminated moiety, or a terminal moiety containing positive or negative charges for the organosiloxy moieties), where the terminal moiety is disposed at its enclosure-facing terminus (i.e. the portion of the monolayer of the coating material 298 that is not bound to the inner surfaces 292, 294 and is proximal to the enclosure 284).

In other embodiments, the coating material 298 used to coat the inner surface(s) 292, 294 of the microfluidic device 290 can include anionic, cationic, or zwitterionic moieties, or any combination thereof. Without intending to be limited by theory, by presenting cationic moieties, anionic moieties, and/or zwitterionic moieties at the inner surfaces of the enclosure 284 of the microfluidic circuit 120, the coating material 298 can form strong hydrogen bonds with water molecules such that the resulting water of hydration acts as a layer (or "shield") that separates the biological micro-objects from interactions with non-biological molecules (e.g., the silicon and/or silicon oxide of the substrate). In addition, in embodiments in which the coating material 298 is used in conjunction with coating agents, the anions, cations, and/or zwitterions of the coating material 298 can form ionic bonds with the charged portions of non-covalent coating agents (e.g. proteins in solution) that are present in a medium 180 (e.g. a coating solution) in the enclosure 284.

In still other embodiments, the coating material may comprise or be chemically modified to present a hydrophilic coating agent at its enclosure-facing terminus. In some embodiments, the coating material may include an alkylene ether containing polymer, such as PEG. In some embodiments, the coating material may include a polysaccharide, such as dextran. Like the charged moieties discussed above (e.g., anionic, cationic, and zwitterionic moieties), the hydrophilic coating agent can form strong hydrogen bonds with water molecules such that the resulting water of hydration acts as a layer (or "shield") that separates the biological micro-objects from interactions with non-biological molecules (e.g., the silicon and/or silicon oxide of the substrate).

Further details of appropriate coating treatments and modifications may be found at U.S. application Ser. No. 15/135,707, filed on Apr. 22, 2016, and is incorporated by reference in its entirety.

Additional system components for maintenance of viability of cells within the sequestration pens of the microfluidic device. In order to promote growth and/or expansion of cell populations, environmental conditions conducive to maintaining functional cells may be provided by additional components of the system. For example, such additional components can provide nutrients, cell growth signaling species, pH modulation, gas exchange, temperature control, and removal of waste products from cells.

Light sequencing and patterns for transport of micro-objects. In some embodiments, the present disclosure is directed to the use of pattern information to project various sequences of light patterns (referred to herein in some embodiments as "light sequences") to move, transport, and/or capture micro-objects. The term "move" as used herein with respect to light sequences refers to a light sequence that is in some embodiments sequentially projected at positions on any surface of the microfluidic device so that it appears to be moved along that surface of the microfluidic device. In some instances, certain light sequences (e.g. light sequences comprising a single light bar that is moved along the surface of the microfluidic device) provide insufficient force to move more than a single micro-object. However, due to the time necessary to move individual micro-objects, it may be necessary and more efficient to move a plurality of micro-objects in series or in parallel. In one aspect, the present disclosure is directed to light sequences that allow for the parallel manipulation of a plurality of micro-objects. In various embodiments, the present disclosure is directed to the use of a light sequence of plurality of moving light bars (referred to herein as a "conveyor light sequence") to move one or more micro-objects.

In various embodiments, the light bars (or a portion of the light bar) will have a substantially rectangular shape with a length that is greater than the width of the light bar. As discussed below, other portions of light bars may be curved, comprise indentations, irregularities, or have an otherwise non-planar or non-flat shape. In some embodiments, the light bars in the conveyor light sequence will be substantially parallel to each other.

Depending on the embodiments and the functionality required, the light bars in the conveyor light sequence may be of varying length and width to illuminate a varying number of DEP electrodes in an array of DEP electrodes, thus providing varying amounts of DEP force. For example, the light bars may illuminate a single row of DEP electrodes or several rows of DEP electrodes. Likewise, the light bars in the conveyor light sequence may vary in length to span different portions of the microfluidic device (e.g. circuit elements within the microfluidic device) depending on the functionality required. For example, in instances where the conveyor light sequence is used to move micro-objects from a sequestration pen to a channel in a microfluidic device, the light bars may have a length sufficient to span a portion (or all) of the length or width of the sequestration pen. Similarly, instances where the conveyor light sequence is used to move micro-objects from the channel in the microfluidic device to one or more sequestration pens, the light bars may span all or part of the channel.

Each conveyor light sequence has a starting position and an end position, as well as intermediate or temporary starting and ending positions. In some embodiments, lights bars in a conveyor light sequence are projected at a starting position and moved to an end position. In this way, the starting position and the end position partially define the trajectory of a micro-object moved using the conveyor light sequence. However, in some instances (e.g. when a light sequence is initially projected on a microfluidic device), some of the plurality of the light bars in a conveyor light sequence are initially projected at a position other than the starting position and moved to the end position. In some embodiments, when a light bar is moved to the end position, a new light bar can be projected at the starting position. The distance between the starting position and the end position (as well as shape, length and width of the light bars) defines the area of the conveyor light sequence and the corresponding portion of the microfluidic device the conveyor light sequence is projected on.

In various embodiments, the conveyor light sequence will comprise a plurality of light bars that are spaced at intervals and move in substantially the same direction towards the end position. The light bars can be spaced at even intervals (i.e. spaced substantially equidistant from each other) or spaced at irregular intervals (i.e. spaced at varying distances from each other). In most embodiments, the conveyor light sequence will comprise light bars that are spaced at intervals ranging from about 20 microns to about 200 microns. In some embodiments, the conveyor light sequence will comprise light bars that are spaced at intervals ranging from about 30 microns to about 100 microns. In some specific embodiments, the conveyor light sequence will comprise light bars that are spaced at intervals ranging from about 40 microns to about 50 microns. However, the intervals at which the light bars in the conveyor light sequence are spaced can vary based on the size of the DEP electrode and the size of the micro-objects that are moved.

Depending on the embodiment, the velocity at which the light bars in the conveyor light sequence are moved can vary according to the size and type of the micro-objects to be moved and speed required for the desired functionality (e.g. time limitations in moving micro-objects to an area of the microfluidic device). In most embodiments, the velocity at which the light bars in the conveyor light sequence move will range from about 1 microns/second to about 50 microns/second. In some embodiments, the velocity at which the light bars in the conveyor light sequence are moved will range from about 5 microns/seconds to about 30 microns/second. In some specific embodiments, the velocity at which the light bars in the conveyor light sequence are moved will range from about 10 microns/second to about 20 microns/second.

Figure 4A:
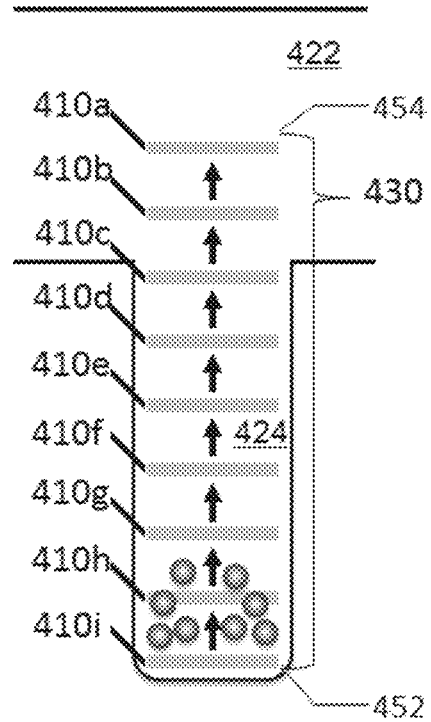
FIGS. 4A-4D provide a schematic illustration of a conveyor light sequence used to move micro-objects from a sequestration pen to a channel according to a specific embodiment of the disclosure.

FIGS. 4A-4D provide a schematic illustration of some embodiments of a conveyor light sequence 430 used to export micro-object(s) from a sequestration pen into a channel 422 adjacent to the sequestration pen at consecutive time points. FIG. 4A depicts the conveyor light sequence 430 at a first time point. As shown in FIG. 4A, the conveyor light sequence 430 comprises nine light bars 410 *a-i* projected on the surface of the microfluidic device to provide a DEP force. The light bars 410*a-i* are positioned substantially parallel to each other and move from their initial positions to an end position 454 in a channel 422 proximal to the sequestration pen. As the light bars are moved from their initial positions to the end position 454, the light bars 410a-i provide DEP force sufficient to move the some of the micro-objects out of the sequestration pen.

Figure 4B:
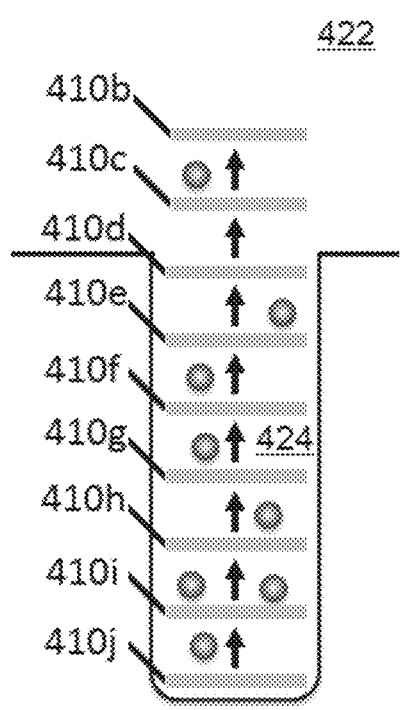

FIG. 4B depicts the same conveyor light sequence 430 at a second consecutive time point, where the light bars 410b-i have advanced from their initial positions towards the end position 454 such that each light bar 410b-i occupies a new position that is closer to the end position 454 than in FIG. 4A. Light bar 410a is no longer projected on the microfluidic device after it reaches the end position 454 and a new light bar 410j is projected at the starting position 452. As illustrated in FIG. 4B, the micro-objects may be moved by different light bars 410b-j as the conveyor light sequences advances and new light bars are projected at the starting position 452. However, as can be appreciated, FIGS. 4A-4D are stylized diagrams and a differing number of micro-objects may be moved by the conveyor light sequence 530 in actual implementation.

Figure 4C:
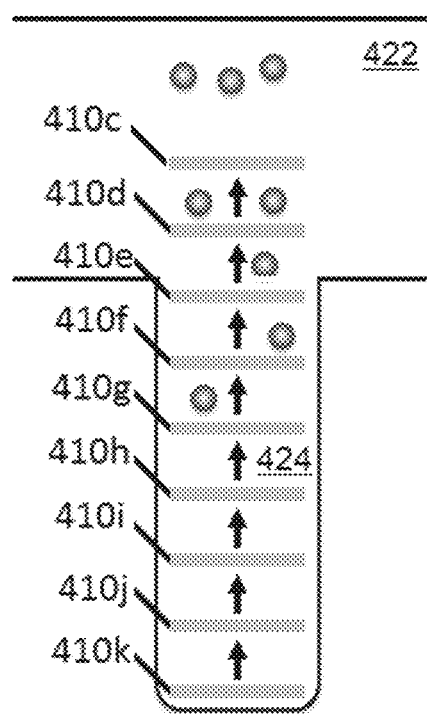

FIG. 4C depicts the same conveyor light sequence 430 at a third consecutive time point, where the light bars 410c-j have again advanced from their positions illustrated in FIG. 4B towards the end position 454. Light bar 410b is no longer projected on the microfluidic device after it reaches the end position 454 and a new light bar 410k is projected at the starting position 452. As illustrated in FIG. 4C, a number of the micro-objects are moved by the conveyor light sequence 430 to the end position 454 where they are located in the channel 422.

Figure 4D:
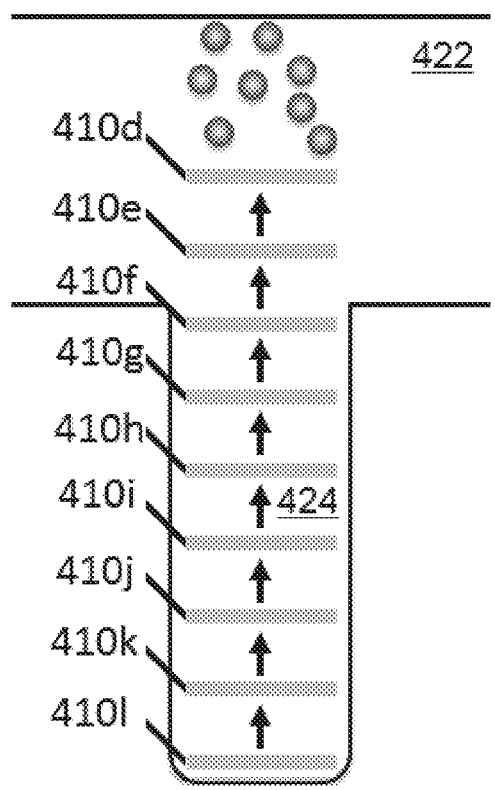

FIG. 4D depicts the same conveyor light sequence 430 at a third consecutive time point, where the light bars 410d-k have advanced from their positions illustrated in FIG. 4C towards the end position 454. Light bar 410c is no longer projected on the microfluidic device after it reaches the end position 454 and a new light bar 410l is projected at the starting position 452. As illustrated in FIG. 4D, all of the micro-objects have been moved from the sequestration pen 424 to the channel 422. Moving micro-objects from a sequestration pen 424 to a channel 422 or other area proximal to a sequestration pen 424 is referred to herein as "exporting" the micro-objects from the sequestration pen 424. As understood by the skilled artisan, the process illustrated in FIGS. 4A-4D can be continued until all of the desired micro-objects are removed from the sequestration pen 424.

Figure 5A:
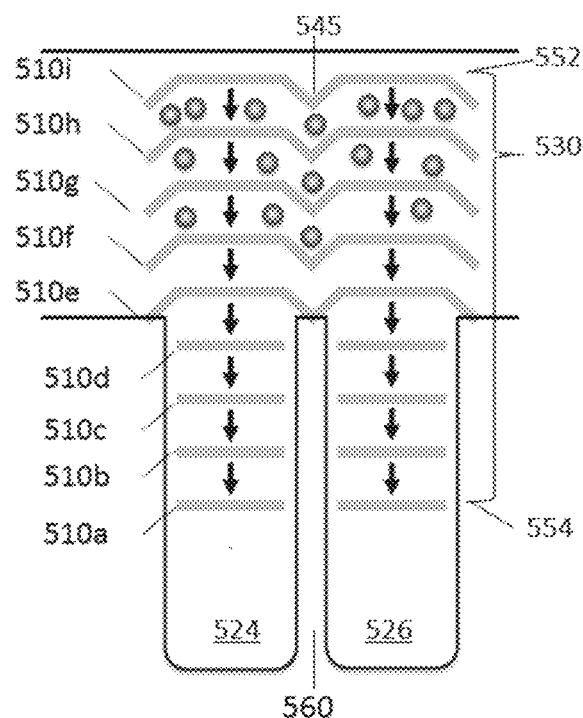
FIGS. 5A-5B provide a schematic illustration of a conveyor light sequence used to move micro-objects from a channel to a sequestration pen according to a specific embodiment of the disclosure.
Figure 5B:
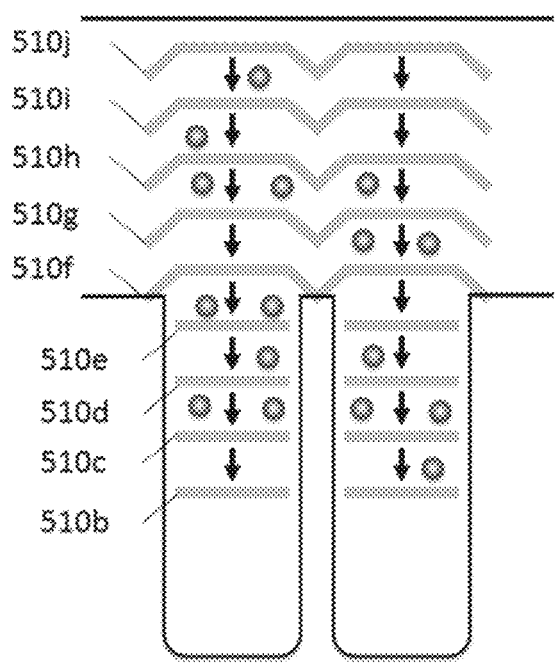

FIGS. 5A and 5B illustrate some embodiments of a conveyor light sequence 530 used to move micro-objects from a channel 522 to one or more sequestration pens 524, 526 at consecutive time points. The conveyor light sequence illustrated in FIGS. 5A and 5B has a starting position 552 in the channel 522 and an end position 554 in the sequestration pens 524, 526. FIG. 5A illustrates the conveyor light sequence 530 at a first time point. As depicted in FIG. 5A, the conveyor light sequence 530 comprises a five light bars 510e-i within the channel 522 and four light bars 510a-d within the sequestration pens 524, 526. In the configurations shown in FIG. 5A, the light bars 510e-i within the channel 522 are contiguous (i.e. are joined to substantially form a single structure) and span a plurality of sequestration pens 524, 526. The light bars 510e-i within the channel further are curved or angled to create a "V-shape" 545 where the point or indentation of the V-shape corresponds to the vertical axis defined by the walls forming the sequestration pens. The indentations function to direct micro-objects away from the walls 560 (or similarly areas) between the sequestration pens 524, 526 and into the sequestration pens 524, 526. As discussed below with respect to FIGS. 14A-14C, in some embodiments, static light bars may be projected on the vertical axis defined by the walls forming sequestration pens (or other area between sequestration pen) in order to direct micro-objects away from the walls (or area between sequestration pens).

As illustrated in FIGS. 5A and 5B, the light bars 510a-d within the sequestration pens 524, 526 are not contiguous (i.e., are disjointed). However, as discussed below, in alternate embodiments, the light bars 510a-d within the sequestration pens 524,526 may be contiguous to form a single line that is projected on several of the sequestration pens 524, 526 at the same time.

FIG. 5B shows the conveyor light sequence 530 at a second consecutive time point in which the light bars have advanced from the starting position 552 to the end position 554. At the time point illustrated in FIG. 5B, a new light bar 510j is protected at the starting position 552. As illustrated in FIG. 5B, light bars may change morphology (i.e. height, width and shape) as they are moved (i.e. advanced) in the conveyor light sequence. Specifically, light bar 510e changes morphology from the curved, contiguous line shown at the time point illustrated in FIG. 5A to the disjointed straight lines in the sequestration pens 524, 526 shown at the time point illustrated in FIG. 5B. As shown in FIG. 5B, the conveyor light sequence 530 moves the micro-objects from the channel into the sequestration pens. As understood by the skilled artisan, the process illustrated in FIGS. 5A-5B can be continued until all of the desired micro-objects are moved the sequestration pen 424.

Figure 6A:
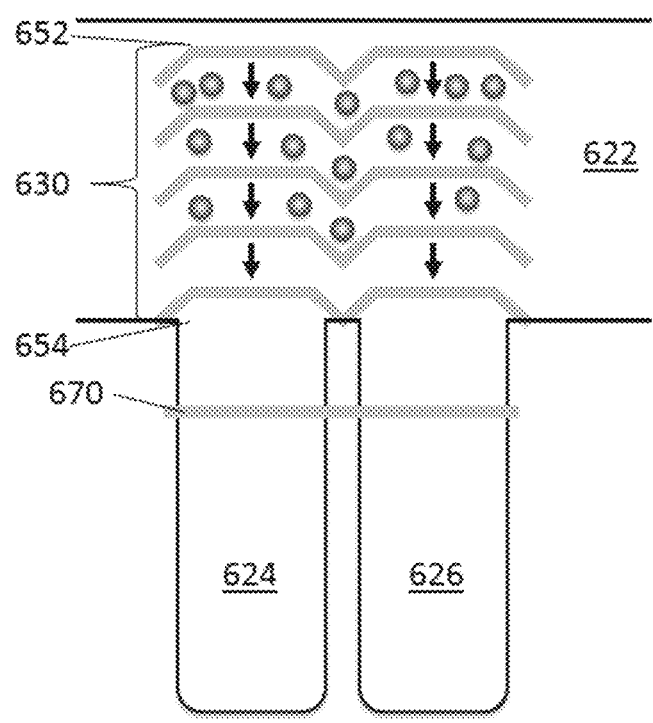
FIGS. 6A-6B provide a schematic illustration of a conveyor light sequence used in conjunction with a barrier light bar according to a specific embodiment of the disclosure.
Figure 6B:
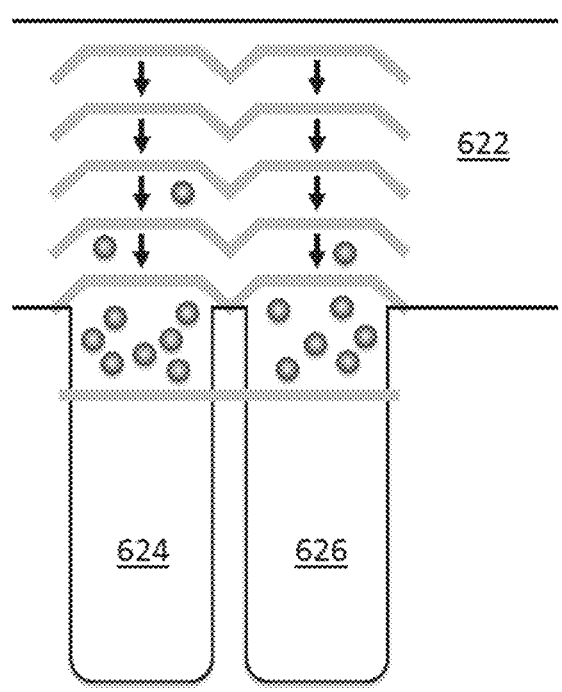

In some embodiments, conveyor light sequences may be combined with other light sequences to move micro-objects from channels to sequestration pens. FIGS. 6A and 6B illustrate some embodiments where a conveyor light sequence 630 is combined with a single static (i.e., unmoving) light bar 670 (referred to herein as a "barrier light bar") used to position micro-objects in a specific portion of the sequestration pen. The conveyor light sequence 630 illustrated in FIGS. 6A and 6B has a starting position 652 in a channel 622 and an end position 654 proximal to the distal openings of the sequestration pens 624, 626. As the conveyor light sequence moves micro-objects from the channel 622 into the sequestration pens 624, 626, the micro-objects are subjected to force from the barrier light bar 670 which functions to prevent most—if not substantially all—of the micro-objects from crossing the barrier light bar 670 to enter the proximal portion of the sequestration pens 624, 626.

As shown in FIGS. 6A and 6B, a barrier light bar 670 is projected at an upper portion of the sequestration pens 624, 626. However, in other embodiments, the barrier light bar can be projected at any portion of the sequestration pen. The use of a barrier light bar may be beneficial in instances where it is desirable to retain micro-objects in a certain portion of the sequestration pen. In some embodiments, it may be desirable to retain micro-objects in a swept portion of a sequestration pen so that micro-objects may be provided the same media as the channel. Similarly, it may be desirable to concentrate micro-objects in a swept portion of a channel using a conveyor light sequence in combination with a barrier light bar. For example, it may be desirable to provide cells in an upper, distal portion of a sequestration pen media used to assay the cells.

Figure 7:
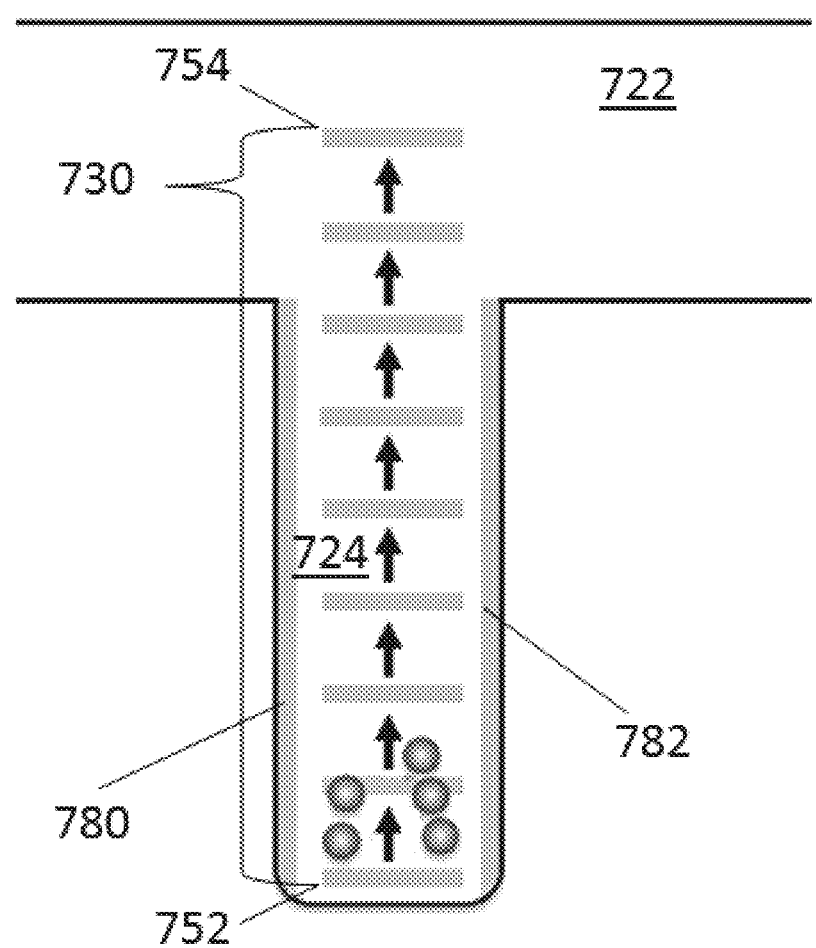
FIG. 7 provides a schematic illustration of a conveyor light sequence used with static light bars according to a specific embodiment of the disclosure.

In some embodiments, conveyor light sequences may be combined with other light sequences used to export micro-objects from sequestration pens into channels. FIG. 7 illustrates some embodiments where a conveyor light sequence 730 is projected near the center of a sequestration pen 724 and has a starting position 752 within the sequestration pen and an end position 754 in the channel 722. The conveyor light sequence 730 is projected in combination with light bars 780, 782 projected near the sides of a sequestration pen and used to direct micro-objects towards the center of the sequestration pen 724 for export into the channel. In the embodiments illustrated in FIGS. 6A and 6B, the light bars 780, 782 are static (i.e., are not moving). However, as discussed below with respect to FIG. 8, the light bars 780, 782 projected near the sides of the sequestration pen 724 may be moved to direct micro-objects towards the conveyor light sequence.

Figure 8:
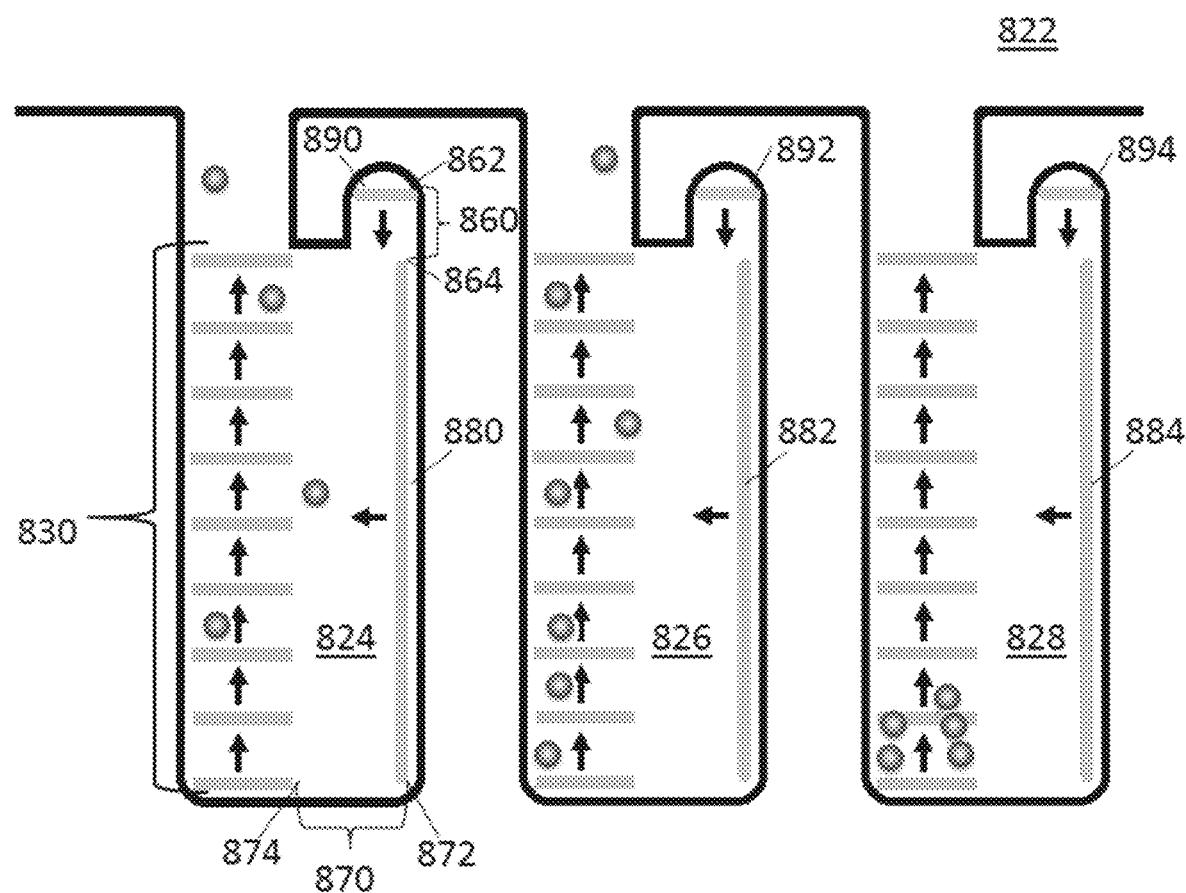
FIG. 8 provides a schematic illustration of a conveyor light sequence used in conjunction with moving light bars using to direct micro-objects on the conveyor light sequence according to a specific embodiment of the disclosure.

FIG. 8 illustrates embodiments where light bars 880, 882, 884 projected near a side of the sequestration pen and near terminus 890, 892, 894 are used to move and direct micro-objects to a conveyor light sequence 830 used to export the micro-objects from sequestration pens 824, 826, 828 to a channel 822. In the embodiments illustrated in FIG. 8, the light bars 880, 882, 824 projected near the side of the sequestration pens 824, 826, 828 move over a trajectory 870 having a starting position 872 near the side of the sequestration pens 824, 826, 828 to an end position 874 proximal to the conveyor light sequence 830.

The light bars projected near the terminus 890, 892, 894 of the sequestration pens move over a trajectory 860 having a starting position 862 near or at the terminus to an end position 864 proximal to the trajectory of the light bars 880, 882, 824 projected near the sides of the sequestration pens 824, 826, 828. As discussed above with respect to conveyor light sequences, the light bars 880, 882, 884 projected near the sides and the light bars 890, 892, 894 projected near the termini of the sequestration pens may follow the same motion from the starting positions to the end positon and be re-projected at the starting position once the light bars reach the end position.

Depending on the embodiments and the shape of the sequestration pen, any combination of light bars may be projected near the sides of the termini of sequestration pens in order to direct micro-objects to a conveyor light sequence used to export micro-objects from the sequestration pen. For example, in embodiments where the sequestration pen has several isolation regions and/or termini, several light bars may be used to move micro-objects from each isolation region and/or terminus.

In the embodiments illustrated in FIG. 8, the light bars 890, 892, 894, 880, 882, 824 are projected near the terminus and near the sides of the sequestration pen concurrently with the conveyor light sequence. However, in other embodiments, light bars 890, 892, 894, 880, 882, 824 are projected near the terminus and near the sides of the sequestration pen are projected and used to move micro-objects prior to the conveyor light sequence being used.

Figure 9:
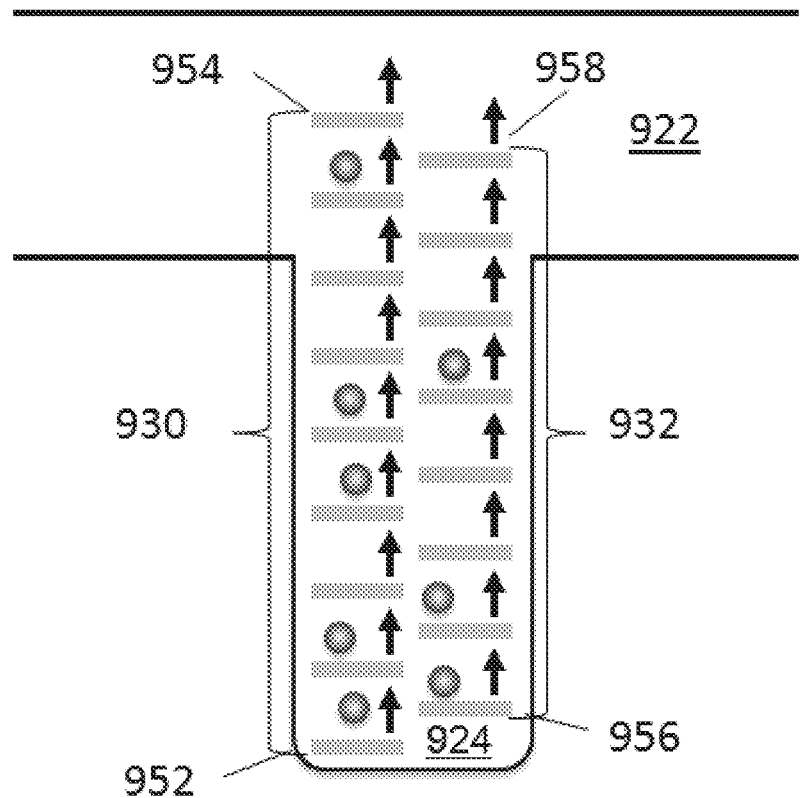
FIG. 9 provides a schematic illustration of the use of multiple, staggered conveyor light sequences according to a specific embodiment of the disclosure.

In some embodiments, multiple conveyor light sequences may be combined to provide various functionalities. FIG. 9 illustrates some embodiments in which two conveyor light sequences 930, 932 are projected proximal to each other in the same sequestration pen 924. The conveyor light sequences 930, 932 have starting positions 952, 956 and end positons 954, 958 that are staggered such that the light bars of the conveyor light sequence are also staggered.

In other embodiments, multiple conveyor light sequences may be combined in different configurations. In addition, the conveyor light sequences need not necessary follow a linear trajectory but instead may contain light bars that are not substantially parallel but instead are angled to move micro-objects along a non-linear trajectory. For example, as discussed below with respect to FIGS. 18A-18E, a conveyor light sequence may include light bars that move micro-objects at right angles relative to other light bars. In other configurations, a conveyor light sequence may include light bars that move micro-objects at obtuse or acute angles relative to other light bars.

In various embodiments, conveyor light sequences may be combined with other light sequences used to separate micro-objects as they are moved to a desired area (e.g. a channel, chamber or sequestration pen). In specific embodiments, conveyor light sequences may be combined with light sequences as they are exported from a sequestration pen to a channel.

Figure 10:
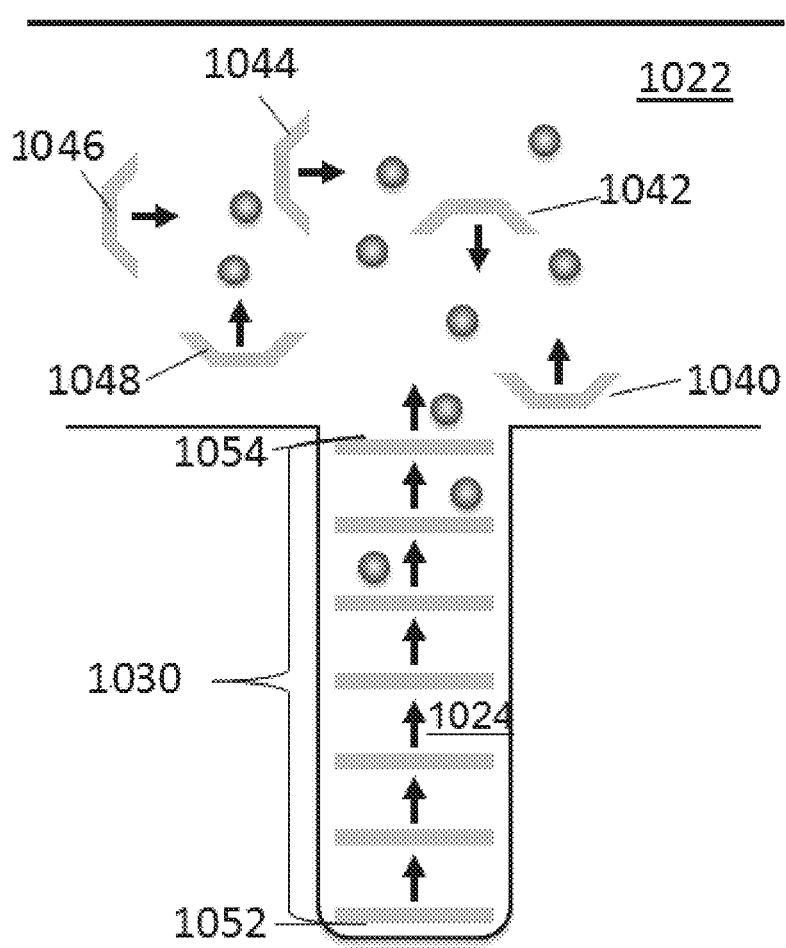
FIG. 10 provides a schematic illustration of a conveyor light sequence used in conjunction with lights sequences to separate cells within a channel according to a specific embodiment of the disclosure.

FIG. 10 illustrates embodiments where a conveyor light sequence 1030 has a starting position 1052 in a sequestration pen 1024 and an end position 1054 at the junction between the sequestration pen 1024 and a channel 1022. The conveyor light sequence 1030 is combined with light bars 1040, 1042, 1044, 1046, 1048 and used to move and/or separate the micro-objects. Each of the light bars 1040, 1042, 1044, 1046, 1048 may have a trajectory that includes a starting position (not shown) and an end position (not shown). In some embodiments, the light bars 1040, 1042, 1044, 1046, 1048 may be positioned to move the micro-objects according to a pre-specified linear or non-linear trajectory. In other embodiments, the light bars 1040, 1042, 1044, 1046, 1048 may be positioned (or repositioned) at random to separate the micro-objects.

While FIG. 10 illustrates the use of light bars to separate the micro-objects, any light sequence, including a light cage, may be used to separate and/or move micro-objects. In some embodiments, the light sequences may separate the micro-object without first determining the positions of the micro-objects. In other embodiments, the positions of the micro-objects may be determined first and then a light sequence used to move the micro-objects in a determined trajectory (i.e., from a fixed starting point to a fixed end point). For example, the micro-objects may be identified using image processing techniques and light cage(s) may be used to separate micro-objects and re-position the micro-objects into new sequestration pens according to a pre-determined trajectory. Methods of using imaging processing techniques to identify micro-objects, separate the micro-objects and re-position the micro-objects are discussed in detail in U.S. patent application Ser. No. 14/963,230, the entirety of which is incorporated herein by reference. In other embodiments, the positions of the micro-objects may be determined and light cage(s) used to move the micro-objects according to a random trajectory (i.e. from a fixed starting point to an unknown end point). As discussed below with respect to FIGS. 19A-19E, after the position of a micro-object(s) has been identified, a light bar(s) may be used to move the micro-object(s) from an initial position determined by automatically identifying the micro-object(s) to an unknown end position.

Figure 11:
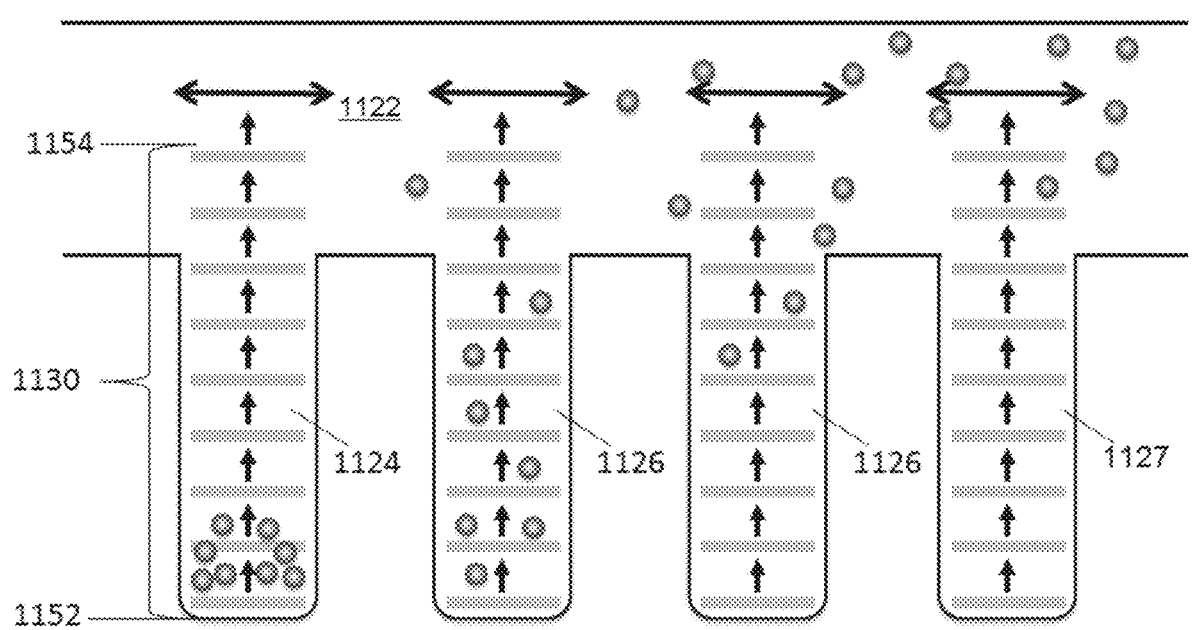
FIG. 11 provides a schematic illustration of a conveyor light sequence used with an oscillatory flow according to a specific embodiment of the disclosure.

In various embodiments, conveyor light sequences may be combined with other types of force aside from light sequences. For example, conveyor light sequences may be combined with a flow in a channel, gravitational, centrifugal, or any other force described herein. In some embodiments, a conveyor light sequence may be combined with an oscillatory (or alternating) flow in a channel used to separate the micro-object(s). FIG. 11 illustrates the use of a conveyor light sequence 1130 combined with an oscillatory flow to separate micro-objects. The conveyor light sequence 1130 has a starting position 1152 within the sequestration pens 1124, 1126, 1127 and an end position 1154 within the channel 1122 proximal to the sequestration pens and is used to export micro-objects from the sequestration pens 1124, 1126, 1126, 1127. Once the micro-objects are exported from the sequestration pens 1124, 1126, 1126, 1127 to the channel 1122, the micro-objects are subject to an oscillatory flow in the channel 1122, which can separate the micro-objects.

In some embodiments, light sequences will be selectively used to export micro-objects from sequestration pens. For example, only micro-objects having a specified characteristic (e.g., cells having a specific assay result) may be exported from sequestration pens using conveyor light sequences.

Figure 12:
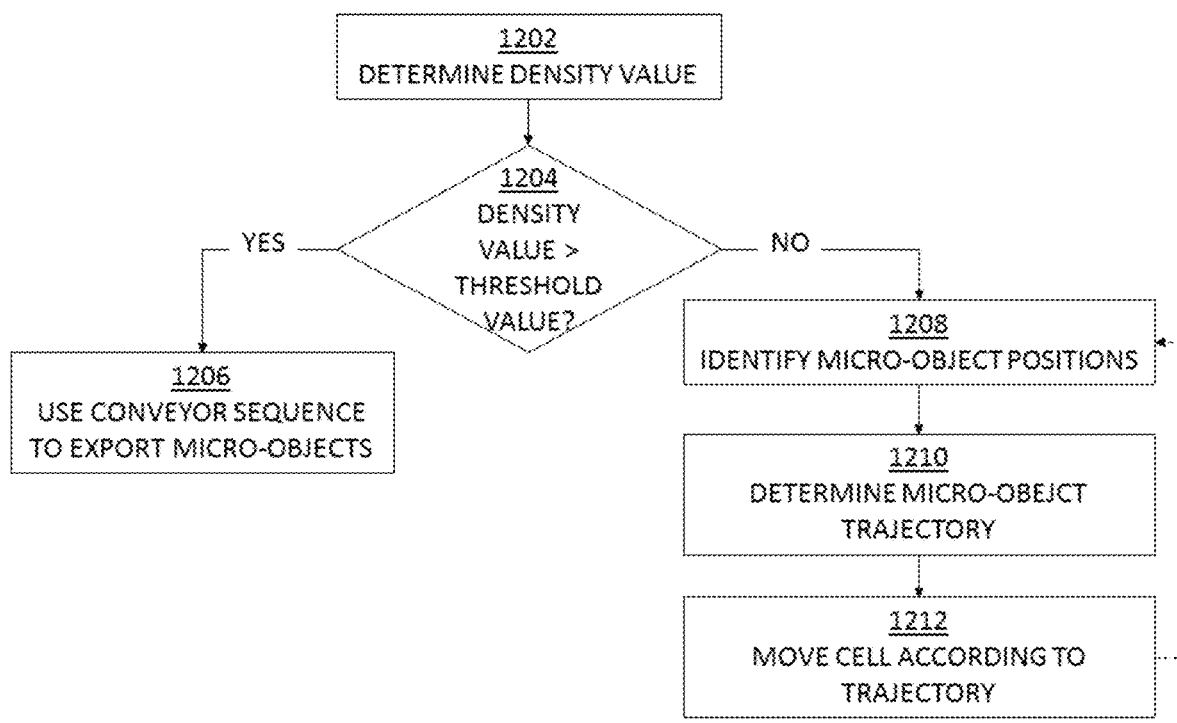
FIG. 12 is a flowchart depicting steps performed to determine whether to use a conveyor light sequence according to a specific embodiment of the disclosure.

In some embodiments, a conveyor light sequence may only be used when there is a sufficient number of micro-objects in the sequestration pen to necessitate the use of a conveyor light sequence. FIG. 12 illustrates processes performed to determine whether to use a conveyor light sequence to export micro-objects from a sequestration pen, according to some embodiments of the disclosure. Those skilled in the art will appreciate that other processes may be performed and the processes illustrated in FIG. 12 may be performed in a different sequence or order.

At box 1202, a density value that represents the actual or approximate number of micro-objects within a sequestration pen is determined. In some embodiments, the density value is equal to the number of micro-objects (e.g. cells or beads) within a sequestration pen or within a specific area of the sequestration pen. In these embodiments, the number of micro-objects within the sequestration pen can be determined by using image processing techniques to identify micro-objects within the sequestration pen. In other embodiments, the density value may be an approximation of the number of micro-objects within a sequestration pen or area thereof. In some embodiments, the density value may be equal to an area of the sequestration pen that is occupied by micro-objects. For example, the intensity of one or more pixels corresponding to an image of a sequestration pen may be used to determine whether the pixel corresponds to an empty portion of the sequestration pen or a portion of the sequestration pen occupied by a micro-object. In this way, the number of pixels corresponding to a portion of the sequestration pen occupied by micro-objects may be used as a density value that approximates the number of micro-objects within the sequestration pen. In various embodiments, other methods of determining the density value may be used alone, or in combination with this process to provide the best approximation of the number of micro-objects within a sequestration pen.

At box 1204, the density value is compared to a pre-specified threshold value. Depending on the embodiments and the method used to determine the density value, the pre-specified threshold value may vary. For example, in embodiments where the density value is equal to the number of automatically-identified micro-objects in a sequestration pen, the pre-specified threshold value could range from 3-10 micro-objects (i.e., at least 3, 4, 5, 6, 7, 8, 9, 10 micro-objects). In other embodiments, such as embodiments with a significantly larger sequestration pen, the density value could range from 10 to 20 micro-objects.

At box 1206, a conveyor light sequence is used to export the micro-objects from the sequestration pen responsive to determining that the density of micro-objects in the sequestration pen is greater than the pre-specified threshold value.

At box 1208, if the density of micro-objects in the sequestration pen is less than the pre-specified threshold value, the position of the one or more micro-objects in the sequestration pen is identified. In those embodiments where automated micro-object detection is used to determine a density value for the sequestration pen, the positions of the one or more micro-objects may be identified during micro-object detection.

At box 1210, a trajectory may be identified for each the micro-object to an area where the micro-object is to be moved. Depending on the embodiments, the type of sequestration pen used and the location of the micro-object, the trajectory can vary. As discussed above, the trajectory can be a random trajectory or a deterministic trajectory and can be linear or non-linear.

At box 1212, the micro-object is moved along its identified trajectory to the area where the micro-object is to be moved. Depending on the embodiments, the micro-object may be moved using any type of light sequence such as the light bars and/or light cages described above.

Figure 13A:
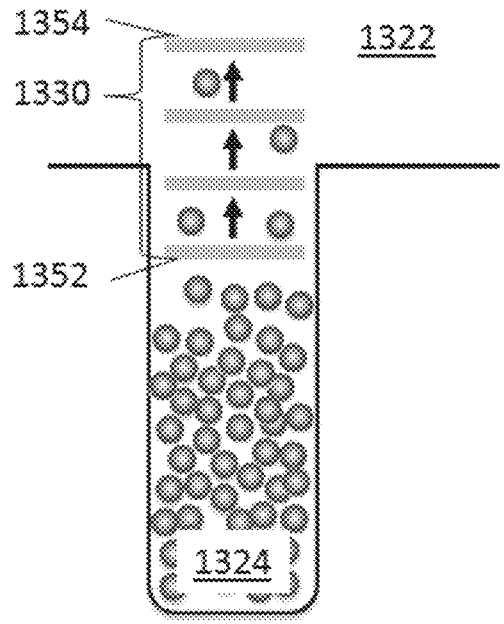
FIGS. 13A-13C provide a schematic illustration of a staged conveyor light sequence according to a specific embodiment of the disclosure.
Figure 13B:
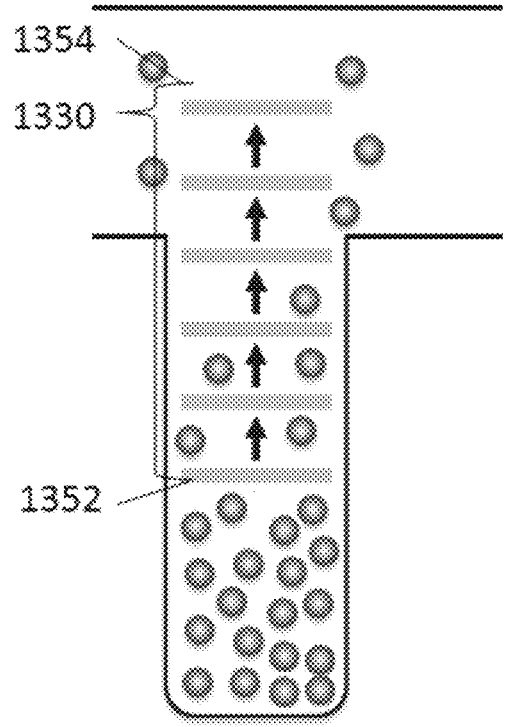
Figure 13C:
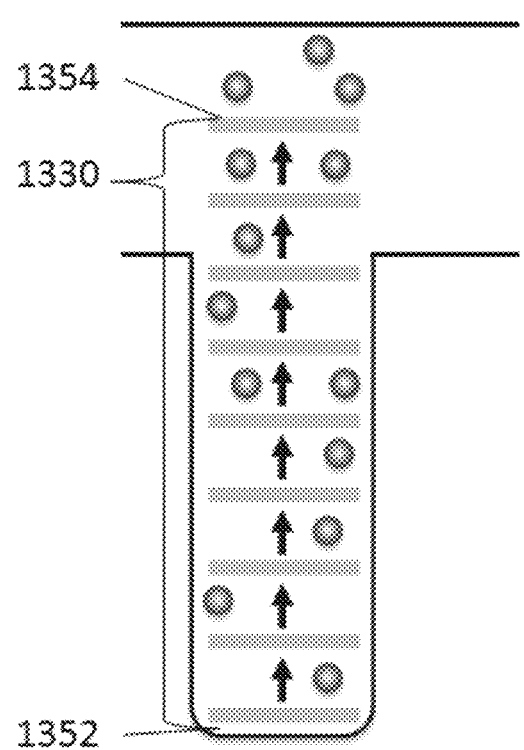

In some instances, the density of micro-objects within a sequestration pen may be too great for a conveyor light sequence to be used. Accordingly, in some instances, it may be beneficial to use a "staged conveyor light sequence" where the starting position of the conveyor light sequence can vary according to the density of the micro-objects. FIGS. 13A-13C illustrate a staged conveyor light sequence at consecutive time points in a sequestration pen. In FIG. 13A, a conveyor light sequence 1430 is illustrated at a first time point. The conveyor light sequence 1330 has a starting position 1352 within a sequestration pen 1324 that has a high density of micro-objects and an end position 1354 in a channel 1322 proximal to the sequestration pen 1324. As illustrated in FIG. 13A, the starting position 1352 of the conveyor light sequence 1330 is located at a position within the distal portion of the sequestration pen 1324 that does not have a high density of micro-objects relative to the other portions of the sequestration pen 1324. By initially moving only the micro-objects in the portion of the sequestration pen 1324 above the starting position 1452, the overall density of the micro-objects in the sequestration pen 1324 is decreased, making it easier to use a conveyor light sequence to move micro-objects in other portions of the sequestration pen.

FIG. 13B illustrates the same conveyor light sequence 1330 at a second consecutive time point. At the second consecutive time point illustrated in FIG. 14B, the starting position 1352 is located further towards the proximal end of the sequestration pen 1324 than at the time point illustrated in FIG. 13A. Specifically, the starting position 1352 is located at a position in the middle portion of the sequestration pen 1324 that does not have a high density of micro-objects relative to the lowest portion of the sequestration pen.

FIG. 13C illustrates the same conveyor light sequence 1330 at a third consecutive time point. At the third consecutive time point illustrated in FIG. 13C, the starting position 1352 is located near the proximal end of the sequestration pen 1324 and thus can be used to move objects in all portions of the sequestration pen 1324. As discussed above, by changing or "staging" the starting position 1352 of the sequestration pen, the density of micro-objects in the sequestration pen is decreased at the third consecutive time point such that conveyor light sequence may be used in the sequestration pen.

In some embodiments, a staged conveyor light sequence will have a number of pre-defined starting positions corresponding to different portions of a sequestration pen or another area of a microfluidic device. In some embodiments, different starting positions used in the staged conveyor light sequence may be determined based on the identified density of micro-objects at different portions of the sequestration pen. As discussed herein, the density in a portion of the sequestration pen may be determined using micro-object identification/counting or other methods.

Light patterns for effective isolation of selected micro-objects. In other aspects of the disclosure, the sequences of light patterns project a shape which can surround one or more micro-objects (including cells), thereby selecting that set of one or more cells specifically. As used herein, such a shape surrounding the one or more micro-objects may be referred to as a "light cage". A light cage may—but does not have to—be a light pattern forming a continuous outlined shape around the one or more micro-objects. In some embodiments, a light cage may be a pattern of light having interruptions or irregularities along its outlined shape. This type of light cage can still function to surround the one or more micro-objects substantially in the same manner as a continuous light cage because the individually activated electrodes or phototransistors create a dielectrophoresis field at each point, and the sum of the collective forces activated can act to surround and capture the one or more selected micro-objects. The dielectrophoresis configuration as may be used herein can repel a micro-object within its field, even if there are visible gaps to the light pattern used to create the light cage to surround the one or more selected micro-objects. The overall effect of a light cage incorporating gaps between illuminated segments of the cage can still provide a force to repel the one or more micro-objects to a desired location within the light cage. The dielectrophoresis forces activated by the light pattern of the light cage can provide sufficient force to transport the one or more selected micro-objects to a selected location.

It can be useful to generate specifically formatted shapes for a light cage to assist with transport of the one or more selected cells, while preventing non-selected micro-objects from being "pushed ahead" of a light cage through its trajectory from one location to a second location. If a light cage has a flat leading aspect to its shape, the repelling forces of the dielectrophoresis field can propel the non-selected micro-object to the location where the selected one or more micro-objects are to be disposed. In some configurations, light cages having a shape including an angled leading edge can provide improved selectivity in moving, delivering and disposing only the one or more selected micro-objects, while repelling non-selected micro-objects away from the transiting selected group.

In some configurations, the light cage with a leading angled edge may have an overall dimension of about 75 microns by about 75 microns in an x-axial and y-axial plane, yielding a bounding box having sufficient interior area to hold sufficient selected numbers of micro-objects. The light cage with a leading angle edge may be generated within the enclosure of the microfluidic device using structured light as described herein, and each segment of the light cage shape may have a width of about 8 microns, about 10 microns, about 12 microns, about 14 microns, or any value therebetween. The width of the segment may be proportional to the number of electrodes/phototransistors activated and may therefore be proportional to the strength of the field surrounding the one or more micro-objects.

This application also describes methods of moving a plurality of micro-objects in a microfluidic device by projecting a plurality of light bars on a portion of the microfluidic device, wherein each light bar has a first position within the portion of the microfluidic device and the plurality of micro-objects are positioned within the portion of the microfluidic device, and moving each of the plurality of light bars of the plurality along a trajectory towards a second position for each light bar, wherein each of the light bars provides sufficient force to move one or more of the plurality of micro-objects. In some embodiments, the plurality of light bars comprises 2-10 light bars. In some embodiments, each of the plurality of light bars is spaced from an adjacent light bar at intervals ranging from about 20 microns to about 200 microns, from about 30 microns to about 100 microns, and even from about 40 microns to about 50 microns.

In some embodiments, each of the plurality of light bars are moved from the first position to the second position at a velocity ranging from about 1 micron/second to about 50 microns/second, from about 5 microns/second to about 30 microns/second, and even from about 10 microns/second to about 20 microns/second. In some embodiments, the plurality of light bars is moved at substantially the same speed.

In some embodiments, the trajectory comprises a linear trajectory. In some embodiments, some or all of the plurality of light bars are positioned substantially parallel to each other. In some embodiments, the trajectory comprises a non-linear trajectory. In some embodiments, one or more of the plurality of light bars is not positioned substantially parallel to another light bar in the plurality of light bars.

In some embodiments, the first position is associated with a starting position that partially defines the trajectory over which some of the light bars of the plurality are moved. In some embodiments, at least one of the plurality of light bars is moved from the starting position to the second position which is associated with an end position.

In some embodiments, a first light bar of the plurality of light bars is no longer projected on the portion of the microfluidic device after the first light bar is moved to the end position. In some embodiments, the methods comprise projecting a second light bar of the plurality of light bars at the starting position when the first light bar reaching the end position.

In some embodiments, the plurality of light bars is associated with a plurality of starting positions or a plurality of end positions. In some embodiments, the plurality of starting positions or the plurality of end positions are determined based on a density value associated with the starting positions. In some embodiments, the density value comprises the number of micro-objects present within a selected portion in an area of the microfluidic device. In some embodiments, the density value represents 3-10 micro-objects present in the area of the microfluidic device.

In some embodiments, a light bar of the plurality of light bars or a portion thereof is substantially rectangular. In some embodiments, a light bar of the plurality of light bars is curved or bent at one or more portions along the length of the light bar.

In some embodiments, the microfluidic device comprises a sequestration pen and a channel proximal to the sequestration pen and one of the plurality of light bars is projected on a first portion of sequestration pen and moved towards the channel. In some embodiments, the methods comprise projecting a first light sequence comprising at least two lights bars that separates micro-objects in the channel or in the sequestration pen. In some embodiments, the first light sequence moves the micro-objects from a known starting position to a known end position. In some embodiments, the known starting position is in the sequestration pen and the known end position is in the channel. In some embodiments, the methods comprise applying an oscillatory flow to the channel.

In some embodiments, the microfluidic device comprises multiple sequestration pens and the first light sequence is moved substantially in parallel along the sequestration pens. In some embodiments, the methods comprise projecting a second light sequence on a second portion of the sequestration pen proximal to the first portion of the sequestration pen, wherein the second light sequence comprises a light bar that moves towards the plurality of light bars projected on the first portion of the sequestration pen. In some embodiments, the microfluidic device comprises one or more sequestration pens and a channel proximal to the one or more sequestration pens and part of the plurality of light bars is projected on a portion of the channel and moved towards the one or more sequestration pens. In some embodiments, the microfluidic device comprises multiple sequestration pens and the plurality of light bars is moved substantially in parallel from the channel towards the sequestration pens.

In some embodiments, the plurality of micro objects comprises a colony of cells. In some embodiments, the plurality of light bars comprise one or more indentations, each indentation corresponding to an axis defined by a wall of a sequestration pen and functioning to direct micro-objects away from the wall of the sequestration pen. In some embodiments, the methods comprise projecting a static light bar on an axis defined by a wall of a sequestration pen, wherein the static light bar functions to direct micro-objects away from the wall of the sequestration pen. In some embodiments, the methods comprise projecting a static light bar on a second portion of the microfluidic device proximal to the first portion of the microfluidic device. In some embodiments, the static light bar maintains the micro-objects in the second portion of the microfluidic device.

This application also describes methods of transporting one or more micro-objects in a microfluidic device by identifying one or more micro-objects disposed within an enclosure of the microfluidic device, wherein the enclosure comprises a flow region and a substrate comprising a dielectrophoresis configuration; generating a light cage having a size configured to partially surround the one or more micro-objects and a shape comprising an angled leading edge, and transporting the one or more micro-objects from a first location to a second location within the enclosure of the microfluidic device. In some embodiments, the methods comprise orienting the angled leading edge of the light cage shape towards a direction of transport of the one or more micro-objects. In some embodiments, generating the light cage comprises activating dielectrophoresis forces within the enclosure of the microfluidic device. In some embodiments, transporting the one or more micro-objects from the first location to the second location comprises activating dielectrophoresis forces along a trajectory from the first location to the second location.

In some embodiments, the dielectrophoresis forces are sufficient to repel at least one micro-object. In some embodiments, the methods comprise repelling at least one non-selected micro-object away from the trajectory from the first location to the second location. In some embodiments, the methods comprise excluding the at least one non-selected micro-object from transport to the second location.

Figure 20A:
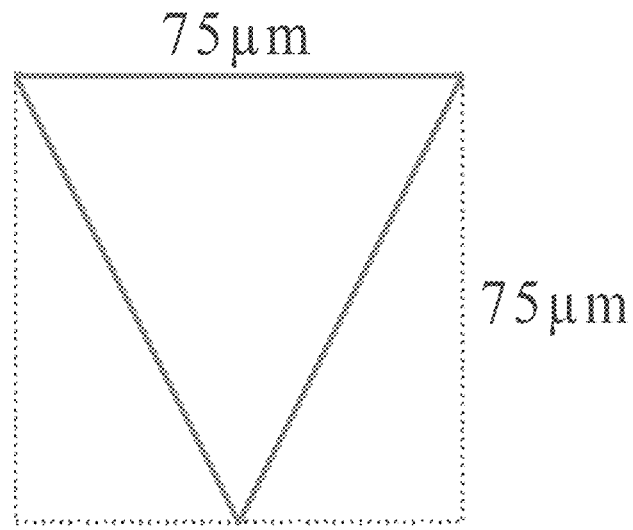
FIGS. 20A-B are graphical representations of two embodiments of light cages for selective transit of micro-object using a light cage having an angled leading edge.
Figure 20B:
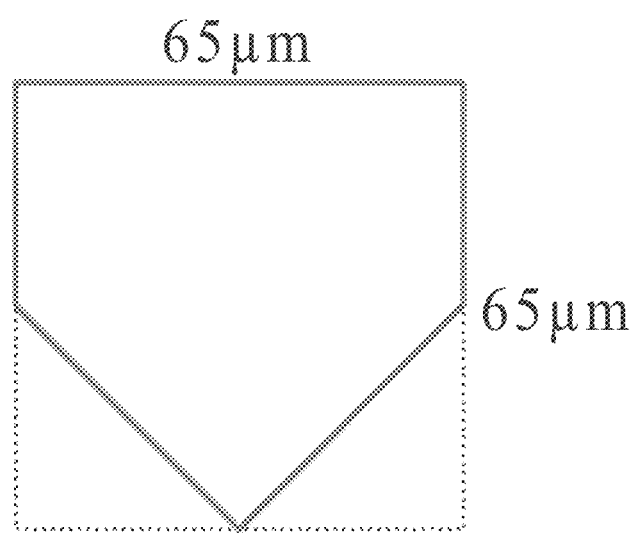

In some embodiments, as shown in FIG. 20B, the shape of the light cage comprises a substantially polygonal shape with the leading angled edge being a vertex of the polygon. In some embodiments, the vertex of the polygon comprises a convex shape. In some embodiments, as shown in FIG. 20A, the polygonal light cage comprises a substantially triangular shape with the leading angled edge being a vertex of the triangle. In some embodiments, the triangular light cage is an equilateral triangular light cage.

In some embodiments, the polygonal light cage comprises more than three sides. In some embodiments, the polygonal light cage comprises five to eight sides.

In some embodiments, the angled leading edge of the light cage comprises a non-linear angled leading edge. In some embodiments, the angled leading edge comprises at least one arc. In some embodiments, the angled leading edge of the light cage comprises a convex vertex.

In some embodiments, the shape of the light cage is an irregular polygon and the leading angled edge comprises a convex vertex of the irregular polygon. In some embodiments, the polygonal light cage comprises more than three sides. In some embodiments, the polygonal light cage comprises five to eight sides.

In some embodiments, the shape of the light cage comprises a substantial teardrop shape with the leading angled edge being the apical point of the teardrop. In some embodiments, the enclosure comprises at least one sequestration pen, wherein an end of the sequestration pen opens to the flow region. In some embodiments, the flow region comprises a microfluidic channel.

In some embodiments, the enclosure comprises a plurality of sequestration pens, wherein an end of each of the sequestration pens opens to the flow region. In some embodiments, the plurality of sequestration pens is disposed in a row adjacent to each other along the length of the flow region.

EXPERIMENTAL

System and device: An OptoSelect™ device, a nanofluidic device manufactured by Berkeley Lights, Inc. and controlled by an optical instrument which was also manufactured by Berkeley Lights, Inc. were employed. The instrument includes: a mounting stage for the chip coupled to a temperature controller; a pump and fluid medium conditioning component; and an optical train including a camera and a structured light source suitable for activating phototransistors within the chip. The OptoSelect device includes a substrate configured with OptoElectroPositioning (OEP™) technology, which provides a phototransistor-activated OET force. The chip also included a plurality of microfluidic channels, each having a plurality of NanoPen™ chambers (or sequestration pens) fluidically connected thereto. The volume of each sequestration pen is around $1 \times 10^6$ cubic microns.

Biological cells. OKT3 cells, a murine myeloma hybridoma cell line, were obtained from the ATCC (ATCC® Cat. #CRL-8001™). In culture, the cells behave as a suspension cell line. Cultures were maintained by seeding about $2 \times 10^4$ to about $5 \times 10^5$ viable cells/mL and incubating at 37° C., in 20 ml Iscove's Modified Dulbecco's Medium (IMDM) with 20% Fetal Bovine Serum (FBS) and 1% penicillin-streptomycin, using 5% carbon dioxide gaseous environment. Cells were split every 2-3 days. OKT3 cell number and viability were counted and cell density was adjusted to $5 \times 10^5$/ml for loading the cells onto the OptoSelect device.

Device priming. 250 microliters of 100% carbon dioxide is flowed in to the OptoSelect device at a rate of 12 microliters/sec, followed by 250 microliters of PBS containing 0.1% Pluronic® F27 (Life Technologies® Cat #P6866) flowed in at 12 microliters/sec, and finally 250 microliters of PBS flowed in at 12 microliters/sec. Introduction of the culture medium follows.

Media perfusion. Medium is perfused through the OptoSelect device according to either of the following two methods:
1. Perfuse at 0.01 microliters/sec for 2 h; perfuse at 2 microliters/sec for 64 sec; and repeat.
2. Perfuse at 0.02 microliters/sec for 100 sec; stop flow 500 sec; perfuse at 2 microliters/sec for 64 sec; and repeat.

Figure 14A:
FIG. 14A-14C depict the use of a conveyor light sequence to move a plurality of micro-objects into sequestration pens in parallel according to a specific embodiment of the disclosure.
Figure 14B:
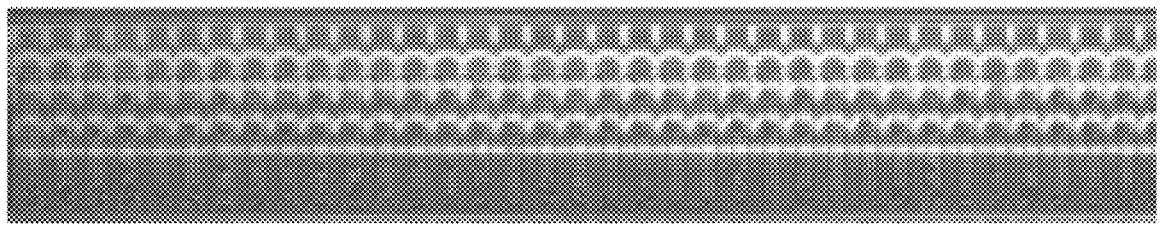
Figure 14C:
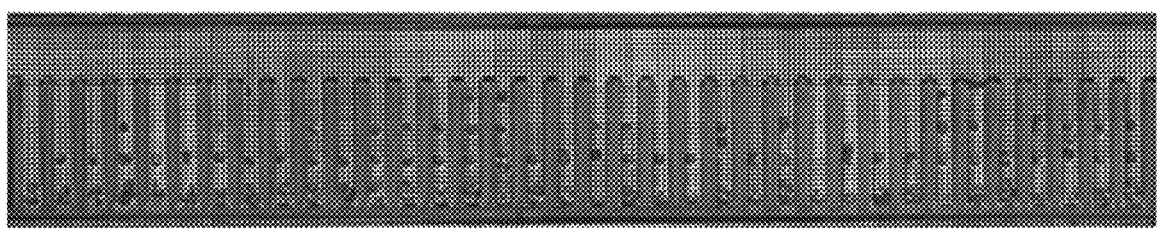

FIGS. 14A-14C depict the use of a conveyor light sequence, inducing dielectrophoretic forces, to move a plurality of micro-objects into NanoPen chambers in parallel. FIG. 14A depicts a channel of a OptoSelect device after OKT3 cells were introduced to the device. As shown in FIG. 14A, some of the cells settled into the NanoPen chambers proximal to the channel but a number of cells remained within the channel. FIG. 14B depicts the conveyor light sequence used to move cells into the NanoPen chambers. The conveyor light sequence comprised a number of curved contiguous light bars with indentations or "V-shapes" that were projected on to the surface of the channel and the NanoPen chambers, as well as a single contiguous straight light bar that was projected onto the NanoPen chambers. The light bars in the conveyor light sequence were substantially parallel and were spaced at a 60 micron intervals (measured between the non-curved sections of the light bars) to have an overall distance between the starting position to the end position of 360 microns. The light bars in the conveyor light sequence were moved at a velocity of 3.23 microns/second. In addition, a number of static light bars were projected on the microfluidic material (here PPS walls) between the NanoPen chambers along with the conveyor light sequence.

FIG. 14C depicts the cells after completion of dielectrophoretic transport from the channel into the NanoPen chambers. Although FIGS. 14A-C depict a single channel, in the example depicted in FIGS. 14A-C, the conveyor light sequence illustrated in FIG. 14B was used to move 70,000 cells into NanoPen chambers within the same OptoSelect device.

Figure 15A:
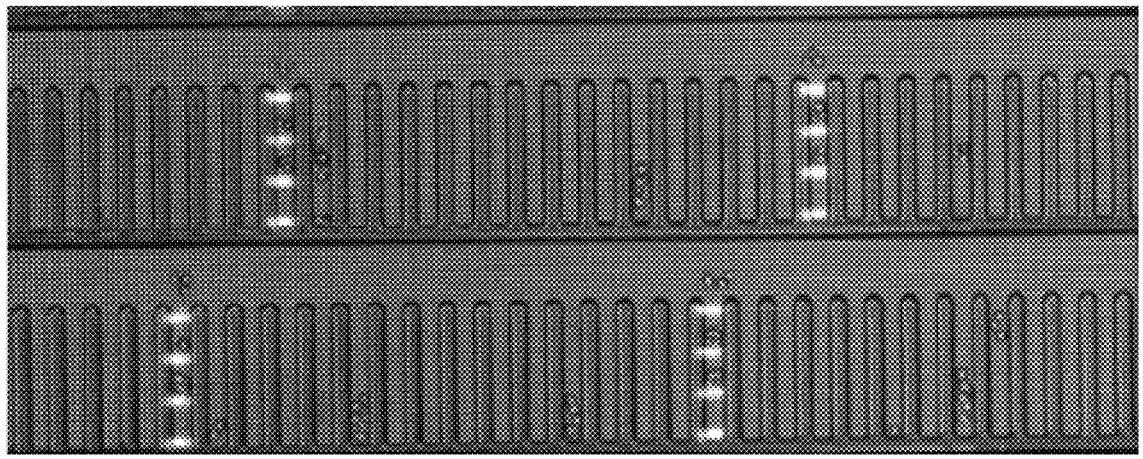
FIGS. 15A and 15B depict a conveyor light sequence used to export select cells from sequestration pens according to a specific embodiment of the disclosure.
Figure 15B:
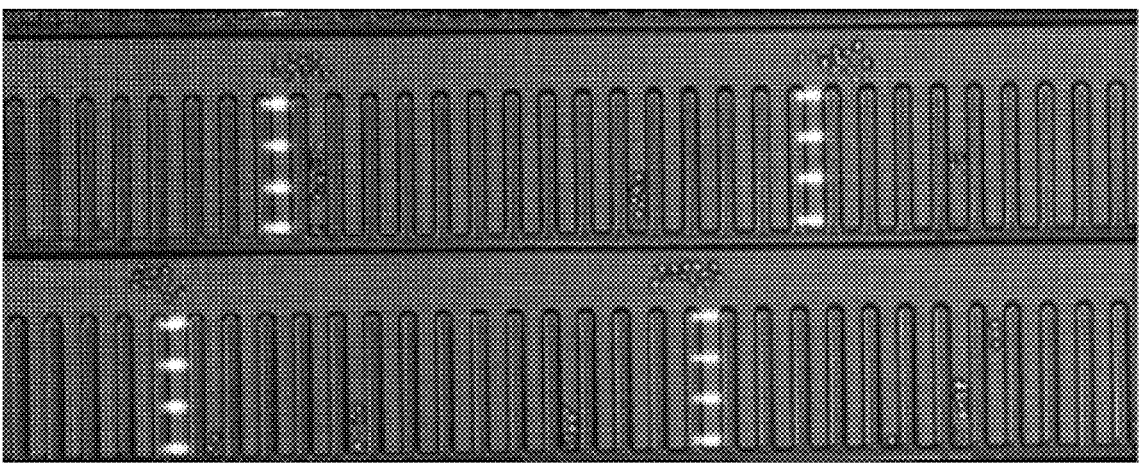

FIGS. 15A and 15B depict a conveyor light sequence inducing dielectrophoretic forces, which was used to export select cells from NanoPen chambers. As illustrated in FIG. 15A, the conveyor light sequence comprised light bars that are straight disjoined lines. The light bars were selectively projected onto NanoPen chambers that contain micro-objects selected for export based on assay results. The conveyor light sequence had a starting position just below the bottom of the NanoPen chambers and an end position at the proximal opening of the NanoPen chambers. The light bars in the conveyor light sequence were spaced at 60 micron intervals and are moved at a velocity of 1.5 microns/second.

Figure 16A:
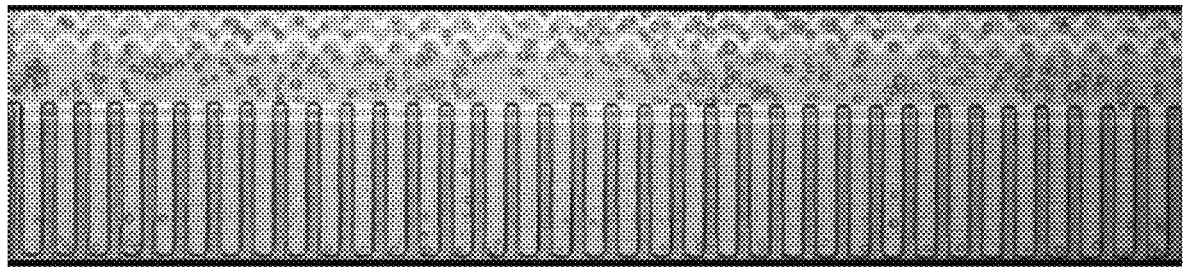
FIGS. 16A-16C depict a conveyor light sequence used to move cells from an upper region of a channel to a lower region of the channel proximal to sequestration pens according to a specific embodiment of the disclosure.
Figure 16B:
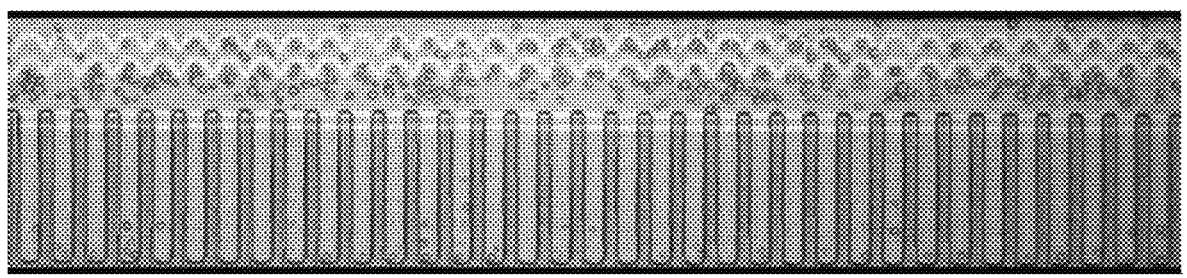
Figure 16C:
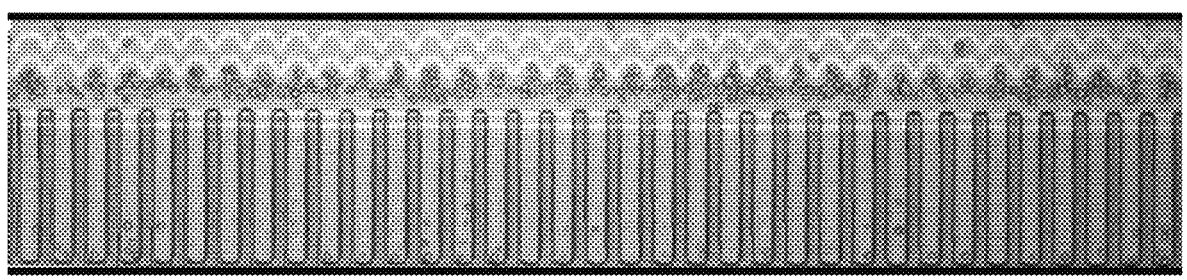

FIGS. 16A-16C depict a conveyor light sequence used to move cells from an upper region of a channel to a lower region of the channel proximal to NanoPen chambers. As shown in FIGS. 16A-16C, the conveyor light sequence comprised two contiguous curved light bars that were moved from a starting position at the top of a channel to an end position at a mid-way point between the top of the channel and the NanoPen chambers beneath the channel. The conveyor light sequence comprised two contiguous curved light bars with indentations or "V-shapes" corresponding to the vertical plane defined by the walls between the NanoPen chambers. The contiguous curved light bars were moved at a velocity of 10 microns/second and are spaced at 60 micron intervals. FIG. 16A depicts the top-most light bar of the conveyor light sequence at its starting position and FIG. 16B depicts the bottom-most light bar of the conveyor light sequence at its end position. FIG. 16C depicts the cells after completion of moving the majority of cells by the conveyor light sequence to the lower region of the channel. As shown in FIGS. 16A-16C, the conveyor light sequence was combined with two static barrier light bars which prevented the cells from moving into the NanoPen chambers proximal to the channel.

FIGS. 17A-17D depict the use of a conveyor light sequence in conjunction with light sequences used to separate cells as they were exported by the conveyor light sequence into a channel. As shown in FIGS. 17A-17D, a conveyor light sequence having a starting position just below the bottom of a NanoPen chamber and an end position at the proximal opening on the NanoPen chamber to the channel was used to export cells. The light bars in the conveyor light sequence were moved at a velocity of 10 microns/second and were spaced at 60 micron intervals. The conveyor light sequence was combined with a light sequence comprising a curved light bar and multiple dots of light that was moved laterally within the channel over the NanoPen chamber (i.e. perpendicular to the light bars in the conveyor belt).

Figure 17A:
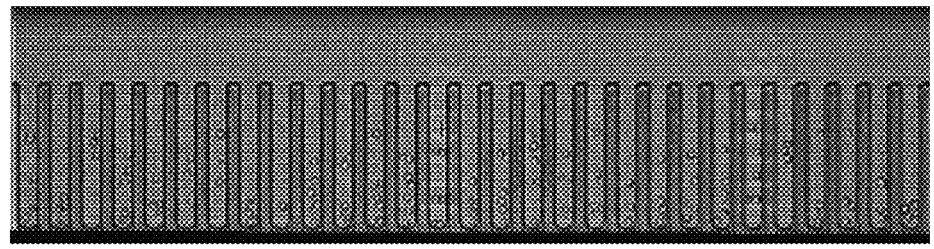
FIGS. 17A-17D depict the use of a conveyor light sequence in conjunction with light sequences used to separate cells as they are exported by the conveyor light sequence into a channel according to a specific embodiment of the disclosure.
Figure 17B:
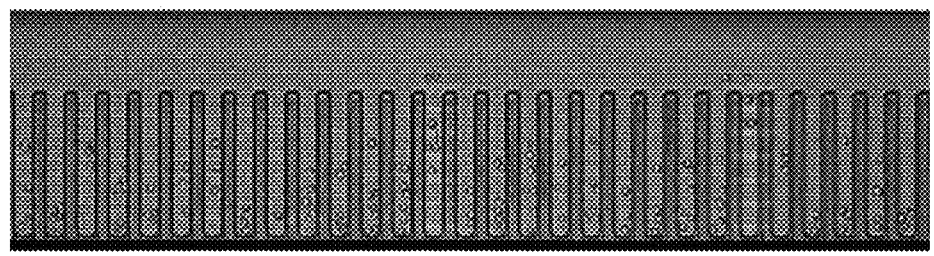
Figure 17C:
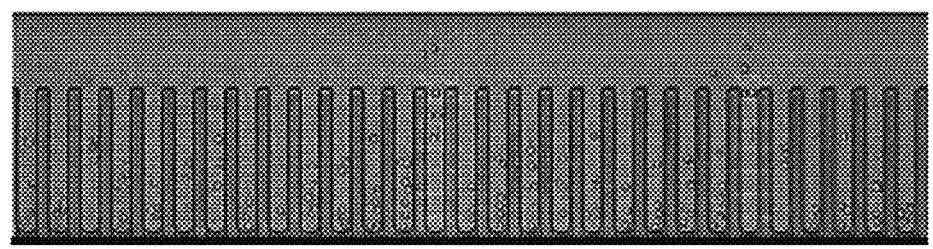
Figure 17D:
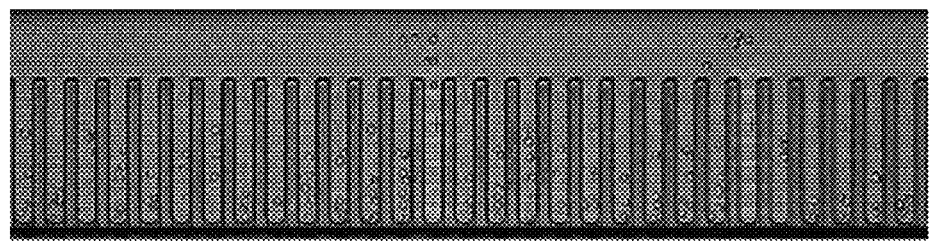
Figure 18A:
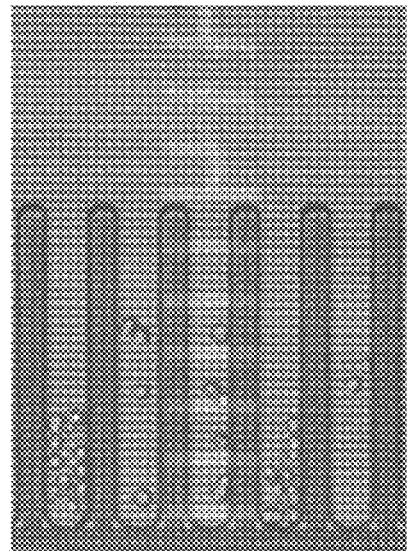
FIGS. 18A-18F depicts a conveyor light sequence that has a non-linear trajectory according to a specific embodiment of the disclosure.
Figure 18B:
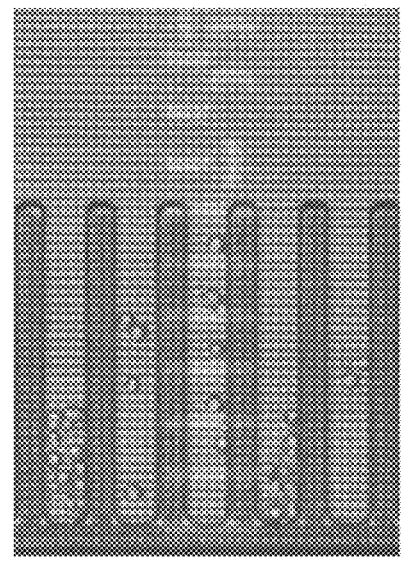
Figure 18C:
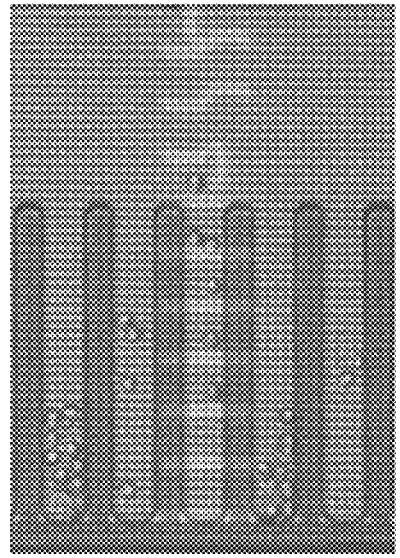
Figure 18D:
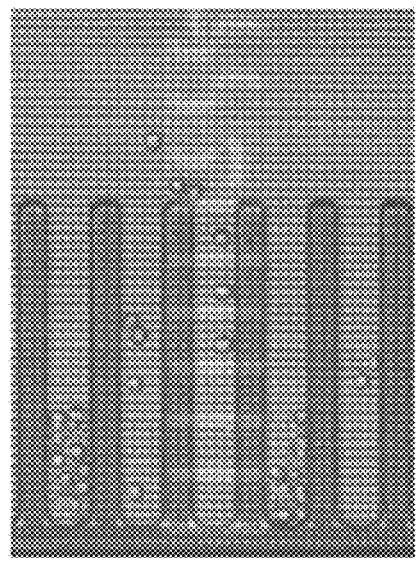
Figure 18E:
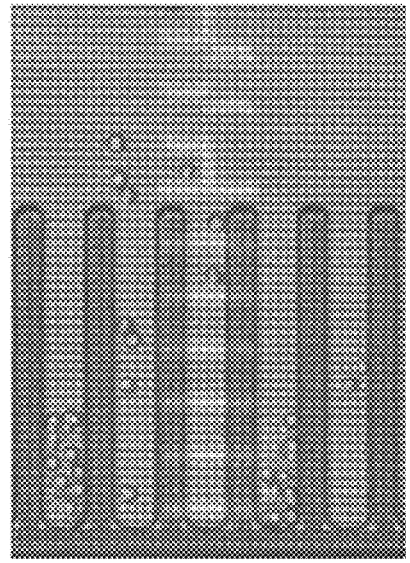
Figure 18F:
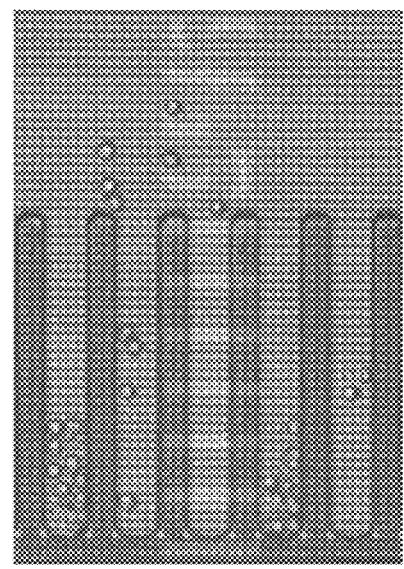

FIG. 17A illustrates the conveyor light sequence at a first time point during cell export. At the time point depicted in FIG. 17A, the light sequence comprising a curved line and dots was projected above the NanoPen chamber. FIG. 17B illustrates the conveyor light sequence at a second time point during cell export. At the time point depicted in FIG. 17B, the light sequence comprising a curved line and dots was projected above and to the left of the NanoPen chamber relative to the light sequence in FIG. 17A. FIG. 17C illustrates the conveyor light sequence at a third consecutive time point at which the light sequence comprising the curved line and dots was projected above and to the left of the NanoPen chamber. FIG. 17D illustrates the conveyor light sequence at a fourth consecutive time point at which the light sequence comprising the curved line and dots was again projected above the NanoPen chamber. As shown in FIGS. 17A-17D, moving the light sequence comprising the dots and the curved light bar laterally within the channel helped to disperse and separate the cells as they were exported from their sequestration pens.

FIGS. 18A-F depict a conveyor light sequence having a non-linear trajectory. The conveyor light sequence depicted in FIGS. 18A-F had a starting position just beneath the bottom of the NanoPen chamber. The light bars within the conveyor light sequence depicted in FIGS. 18A-F were moved at a velocity of 10 microns/second and were spaced at 60 micron intervals. As the light bars entered the channel, the light bars changed morphology from a length that spans the NanoPen chambers to a shorter length. At the top-left of the channel, each light bar was rotated ninety degrees to the right so that it is perpendicular to the light bars projected on the NanoPen chamber. The rotated light bar was moved from left to right. At the top-right of the channel, each light bar was again rotated ninety degrees to the right so that it is parallel with the light bars projected on the NanoPen chamber. However, instead of moving upwards from the NanoPen chamber to the channel, each light bar was moved from the top of the channel towards the NanoPen chamber. Each light bar was again rotated ninety degrees to the right so that is it perpendicular to the light bars projected on the sequestration pen. The light bar was then moved from the right to left.

As shown in FIGS. 18A-F, by rotating the light bars within the conveyor light sequence, the cells were moved and repositioned as they were exported from the NanoPen chamber into a channel. However, as discussed above, in other embodiments, the lights bars within the conveyor light sequence may be rotated at various angles to move micro-objects over a trajectory that is non-linear.

Figure 19A:
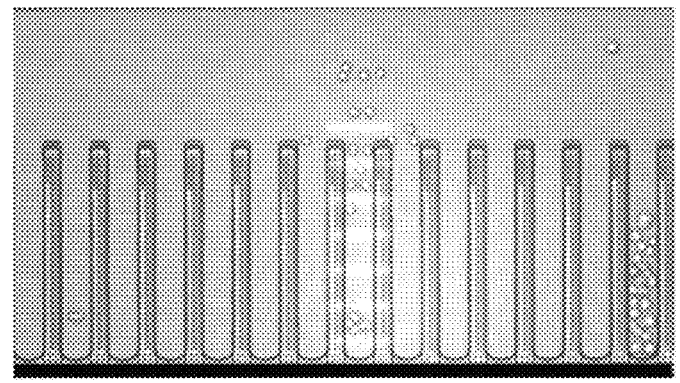
FIGS. 19A-19E depict the use of a conveyor light sequences with light sequences that are used to deterministically separate cells once they enter the channel.
Figure 19B:
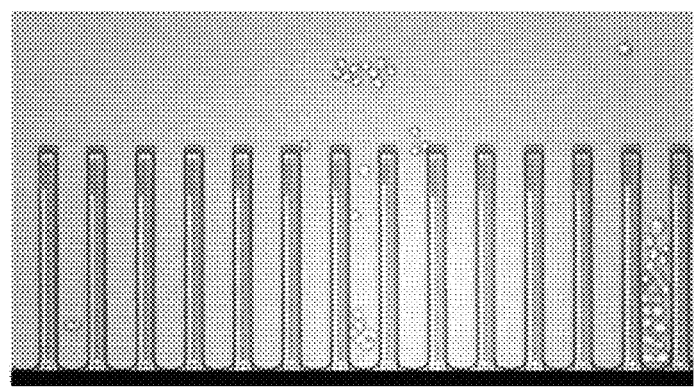

FIGS. 19A-19E depict the use of a conveyor light sequence with light sequences that were used to separate cells once they enter the channel. FIG. 19A depicts a conveyor light sequence with a starting position just beneath the bottom of a NanoPen chamber and an end position in a channel. As depicted in FIG. 19A, the conveyor light sequence was used to move cells into the channel. In the sequence shown in FIGS. 19A and 19B, the light bars in the conveyor light sequence moved at a velocity of 10 microns/second and were spaced at 60 micron intervals. FIG. 19B depicts cells within the channel that were moved by the conveyor light sequence of FIG. 19A.

Figure 19C:
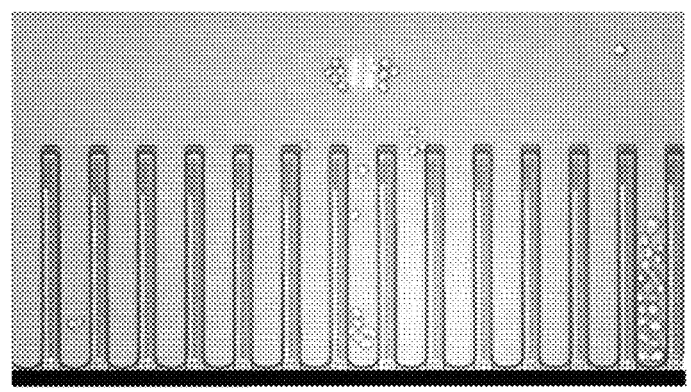

FIG. 19C depicts the cells being moved from a known starting point along a random trajectory using light bars. In the image shown in FIG. 19C, the positions of one set of cells within the channel were identified and the position information of the cells was used to generate a set of light bars that that were used to separate the cells into two sets. Specifically, the light bars were initially projected at a midpoint within the set of cells, and then the light bars were moved apart from each other to separate the cells into two sets. The midpoint position was determined based on the midpoint of the automatically-identified positions of the cells within the selected set. As discussed above, because the light bars merely pushed cells into two sets and do not position each cell at a fixed location, the trajectory that the cells follow has a fixed starting point but not a fixed end point and therefore is a random trajectory. As also discussed above, in alternate embodiments the cells can be moved according to a fixed trajectory.

Figure 19D:
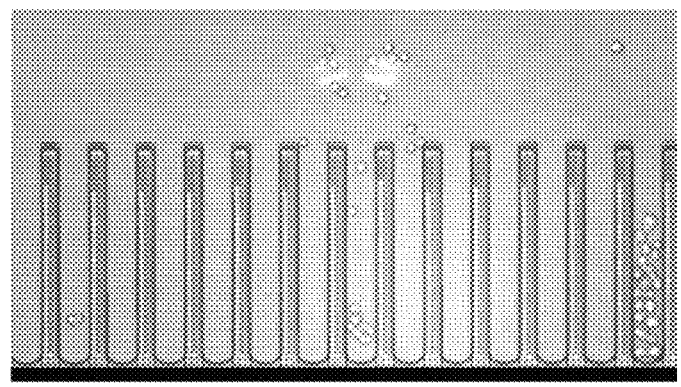
Figure 19E:
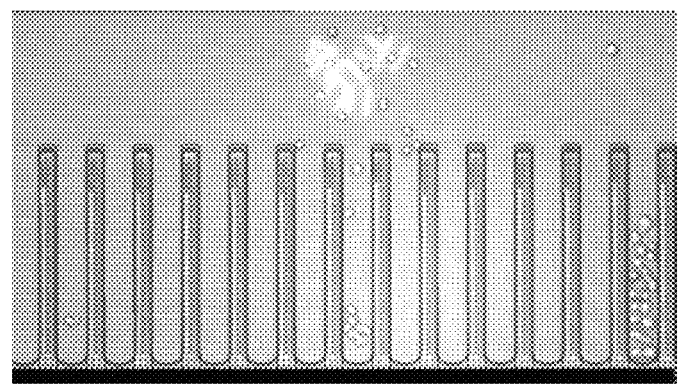

FIG. 19D depicts two sets of cells formed in FIG. 19C again being moved by two sets of light bars that were generated based on the identified mid-point positions of the two sets of cells. The two sets of light bars were used to separate the two sets of cells into four sets of cells by moving the cells along a random trajectory. FIG. 19E depicts the cells again being moved by a plurality of sets of light bars along a random trajectory. As the cells were separated into smaller sets, the mid-point could be identified by drawing a line between individual cells, as opposed to determining the midpoint of a set of cells.

In certain embodiments, the disclosure further provides machine-readable storage devices for storing non-transitory machine readable instructions for carrying out the foregoing methods. The machine-readable instructions can further control the imaging device used to obtain the images.

Although specific embodiments and applications of the disclosure have been described in this specification, these embodiments and applications are exemplary only, and many variations are possible.

What is claimed:

1. A method of disposing a selected micro-object of a plurality of micro-objects within a chamber of a microfluidic device, the method comprising:
    introducing the plurality of micro-objects into a flow path of a microfluidic device, wherein the chamber comprises an opening to the flow path;
    projecting a first light sequence into the microfluidic device, the first light sequence comprising a light bar having a starting position within the chamber, wherein, during the projection of the first light sequence, the light bar moves from the starting position to an ending position in the flow path, thereby excluding micro-objects of the plurality of micro-objects from a chamber portion proximal to the flow path; and
    projecting a second light sequence into the microfluidic device, the second light sequence comprising one or more shapes configured to at least partially surround the selected micro-object, wherein, during the projection of the second light sequence, the one or more shapes move into the chamber, thereby disposing the selected micro-object therein.

2. The method of claim 1, wherein projecting the first light sequence and/or the second light sequence comprises activating dielectrophoresis forces within the microfluidic device.

3. The method of claim 2, wherein the light bar is projected across the chamber, thereby activating DEP electrodes across the chamber.

4. The method of claim 3, wherein the light bar is projected across the chamber in a direction parallel to a width of the opening of the chamber to the flow path.

5. The method of claim 1, wherein the light bar is a single contiguous light bar.

6. The method of claim 1, wherein the chamber opens laterally from the flow path.

7. The method of claim 1, wherein the chamber is a sequestration pen having a single opening to the flow path, the sequestration pen comprising an isolation region and a connection region fluidically connecting the isolation region to the flow path.

8. The method of claim 1, wherein the second light sequence comprises one or more light cages.

9. The method of claim 8, wherein the one or more light cages comprises a shape including an angled leading edge.

10. The method of claim 1, wherein the flow path comprises a channel.

11. A method of disposing a set of selected micro-objects of a plurality of micro-objects within corresponding chambers of a plurality of chambers of a microfluidic device, the method comprising:
    introducing the plurality of micro-objects into a flow path of a microfluidic device, wherein each of the plurality of chambers comprises an opening to the flow path;
    projecting a first light sequence into the microfluidic device, the first light sequence comprising a light bar having a starting position within each of the plurality of chambers, wherein, during the projection of the first light sequence, the light bar moves from the starting position to an ending position in the flow path, thereby excluding micro-objects of the plurality of micro-objects from a chamber portion proximal to the flow path of each chamber of the plurality of chambers; and
    projecting a plurality of second light sequences into the microfluidic device, each second light sequence comprising one or more shapes configured to at least partially surround a selected micro-object of the set of selected micro-objects, wherein, during the projection of the plurality of second light sequences, the one or more shapes of each second light sequence move into a corresponding chamber of the plurality of chambers, thereby disposing the selected micro-object of the set of selected micro-objects therein.

12. The method of claim 11, wherein projecting the first light sequence and/or the plurality of second light sequences comprises activating dielectrophoresis forces within the enclosure of the microfluidic device.

13. The method of claim 12, wherein the light bar is projected across each of the plurality of chambers, thereby activating DEP electrodes across each of the plurality of chambers.

14. The method of claim 13, wherein the light bar is projected across each of the plurality of chambers in a direction parallel to a width of the opening of each of the plurality of chambers to the flow path.

15. The method of claim 11, wherein the light bar is a single contiguous light bar.

16. The method of claim 11, wherein each of the plurality of chambers opens laterally from the flow path.

17. The method of claim 11, wherein each of the plurality of chambers is a sequestration pen having a single opening to the flow region, wherein each sequestration pen has an isolation region and a connection region fluidically connecting the isolation region to the flow path.

18. The method of claim 11, wherein each second light sequence of the plurality of second light sequences comprises one or more light cages.

19. The method of claim 18, wherein each of the one or more light cages comprises a shape including an angled leading edge.

20. The method of claim 11, wherein the flow path comprises a channel.

* * * * *